(12) United States Patent
Muff

(10) Patent No.: US 11,778,940 B2
(45) Date of Patent: *Oct. 10, 2023

(54) LIQUID DISPENSING SYSTEM

(71) Applicant: 360 Yield Center, LLC, Morton, IL (US)

(72) Inventor: Dan Muff, Garner, IA (US)

(73) Assignee: 360 Yield Center, LLC, Morton, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,573

(22) Filed: Sep. 13, 2021

(65) Prior Publication Data

US 2021/0400866 A1    Dec. 30, 2021

Related U.S. Application Data

(63) Continuation of application No. 16/231,299, filed on Dec. 21, 2018, now Pat. No. 11,116,129, which is a continuation of application No. 15/286,258, filed on Oct. 5, 2016, now Pat. No. 10,159,178, which is a continuation of application No. PCT/US2015/024342, filed on Apr. 3, 2015, said application No. 15/286,258 is a continuation-in-part of application No. 14/245,339, filed on Apr. 4, 2014, (Continued)

(51) Int. Cl.
| | |
|---|---|
| *A01G 25/09* | (2006.01) |
| *B05B 1/20* | (2006.01) |
| *A01C 23/02* | (2006.01) |
| *A01C 23/04* | (2006.01) |
| *A01M 7/00* | (2006.01) |
| *A01C 5/06* | (2006.01) |
| *B05B 1/14* | (2006.01) |
| *B05B 15/62* | (2018.01) |

(52) U.S. Cl.
CPC ............ *A01C 23/023* (2013.01); *A01G 25/09* (2013.01); *B05B 1/20* (2013.01); *A01C 5/062* (2013.01); *A01C 23/047* (2013.01); *A01M 7/006* (2013.01); *B05B 1/14* (2013.01); *B05B 15/62* (2018.02)

(58) Field of Classification Search
CPC ..... A01C 23/02; A01C 23/028; A01C 23/047; A01G 25/09; A01M 7/005; A01M 7/006; A01M 7/0064; B05B 1/14; B05B 1/20; B05B 15/62
USPC ....... 239/146, 150, 159, 163, 164, 169, 176, 239/723, 724, 734
See application file for complete search history.

(56) References Cited

U.S. PATENT DOCUMENTS

| | | | | |
|---|---|---|---|---|
| 3,117,725 | A | * | 1/1964 | Palmer .................. A01M 7/006 239/168 |
| 4,736,888 | A | * | 4/1988 | Fasnacht ............... A01M 7/005 239/161 |

(Continued)

*Primary Examiner* — Jason J Boeckmann
(74) *Attorney, Agent, or Firm* — Thomas J. Oppold; Larkin Hoffman Daly & Lindgren, Ltd.

(57) ABSTRACT

A liquid dispensing apparatus for applying liquid products to row crops. The liquid dispensing apparatus includes a plurality of drop assemblies supported by and laterally spaced along a boom structure. Each of the drop assemblies includes dribble hoses for dribbling a liquid product onto the soil in a rhizosphere of adjacent crop rows. The drop assemblies may include a spray assembly for spraying the row crops. The dribble hoses may be supported by a base unit with positionable support brackets.

17 Claims, 41 Drawing Sheets

Related U.S. Application Data now Pat. No. 10,076,075, which is a continuation-in-part of application No. 13/136,961, filed on Aug. 16, 2011, now Pat. No. 9,167,745.

(60) Provisional application No. 62/045,542, filed on Sep. 3, 2014.

(56) References Cited

U.S. PATENT DOCUMENTS

| | | | |
|---|---|---|---|
| 10,159,178 B2* | 12/2018 | Muff | A01G 25/09 |
| 11,116,129 B2* | 9/2021 | Muff | A01G 25/09 |
| 2002/0175229 A1* | 11/2002 | Vernia | B05B 15/65 |
| | | | 239/600 |
| 2013/0043326 A1* | 2/2013 | Muff | A01G 25/02 |
| | | | 239/159 |

* cited by examiner

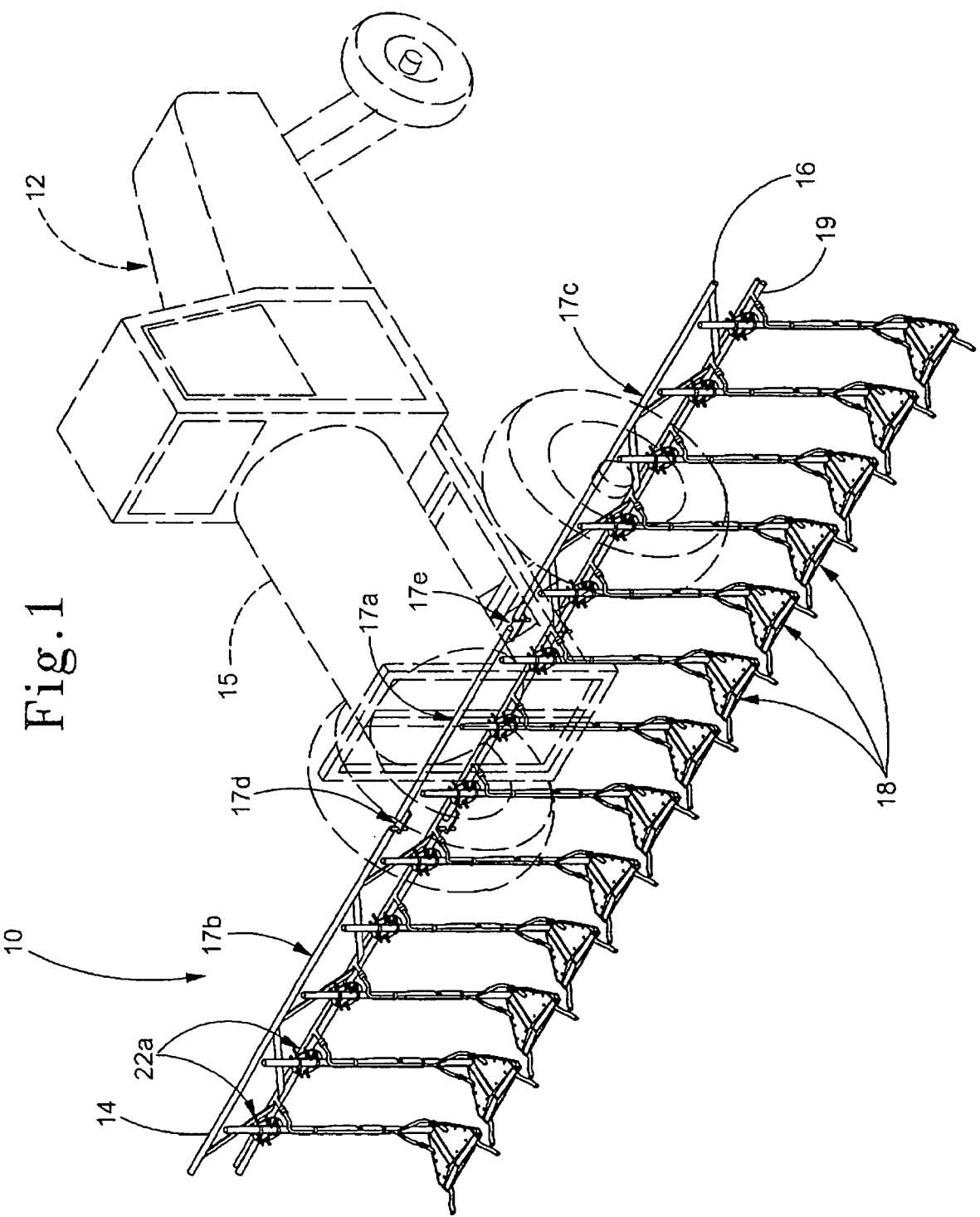

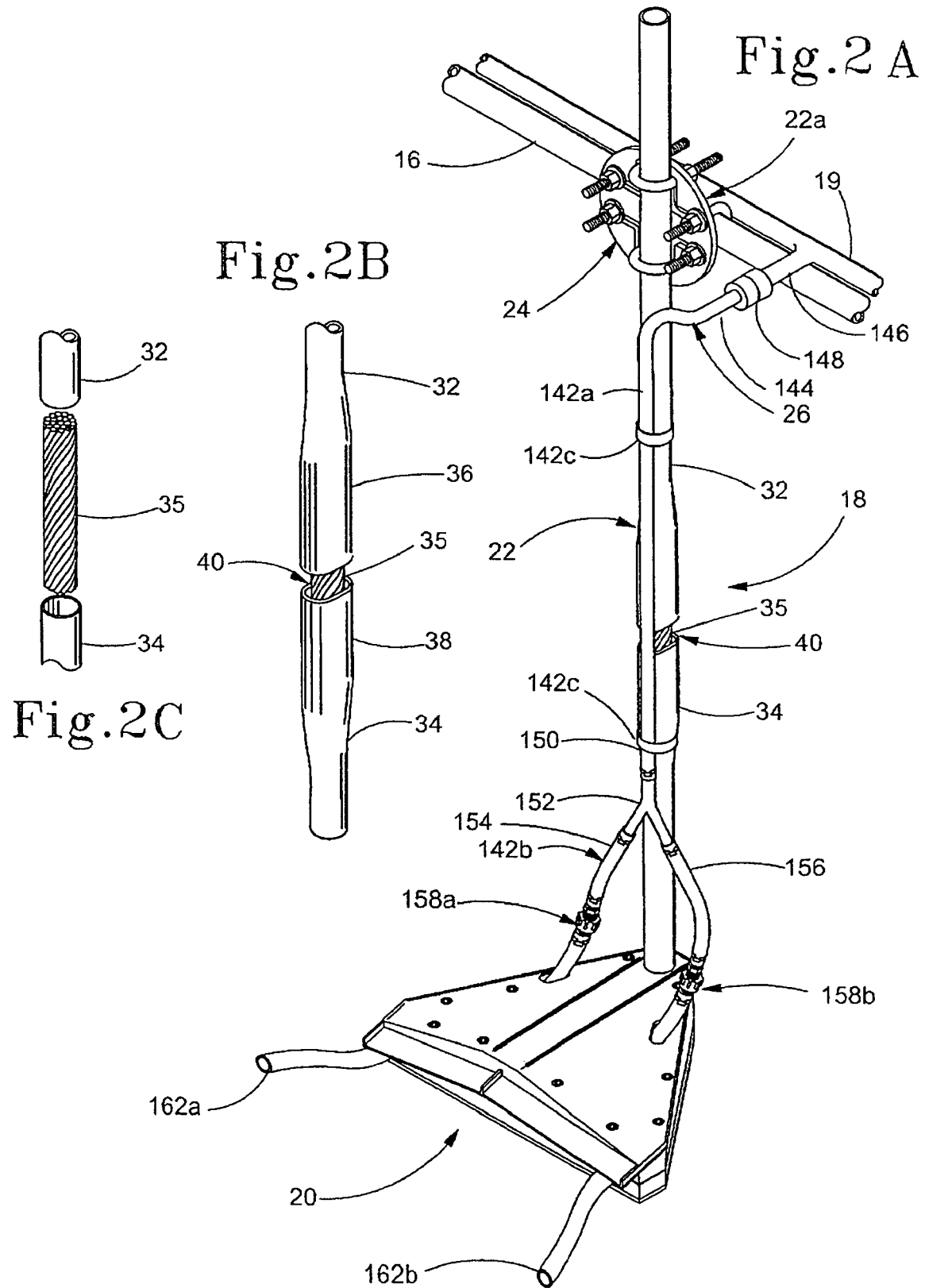

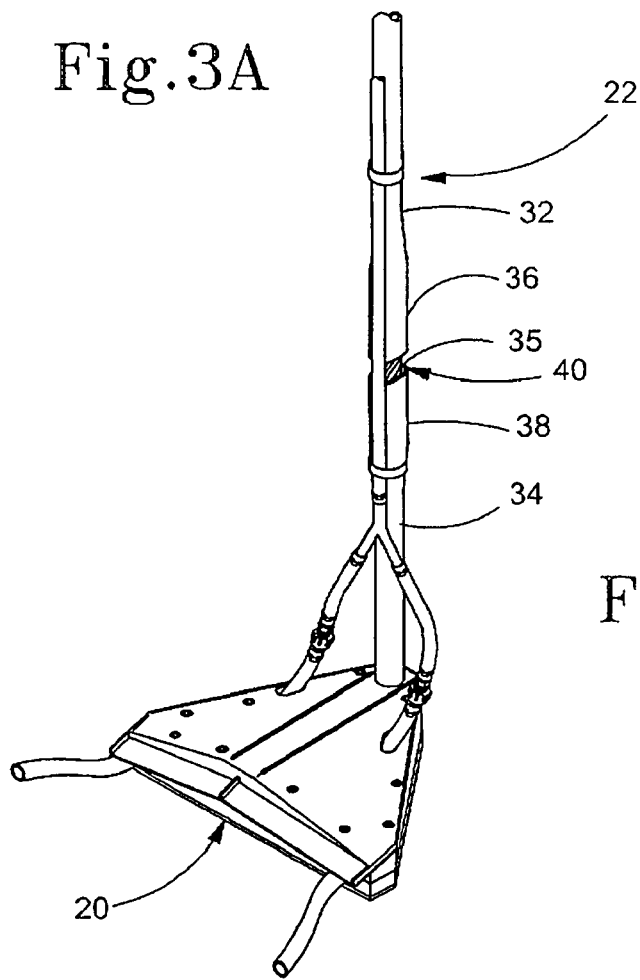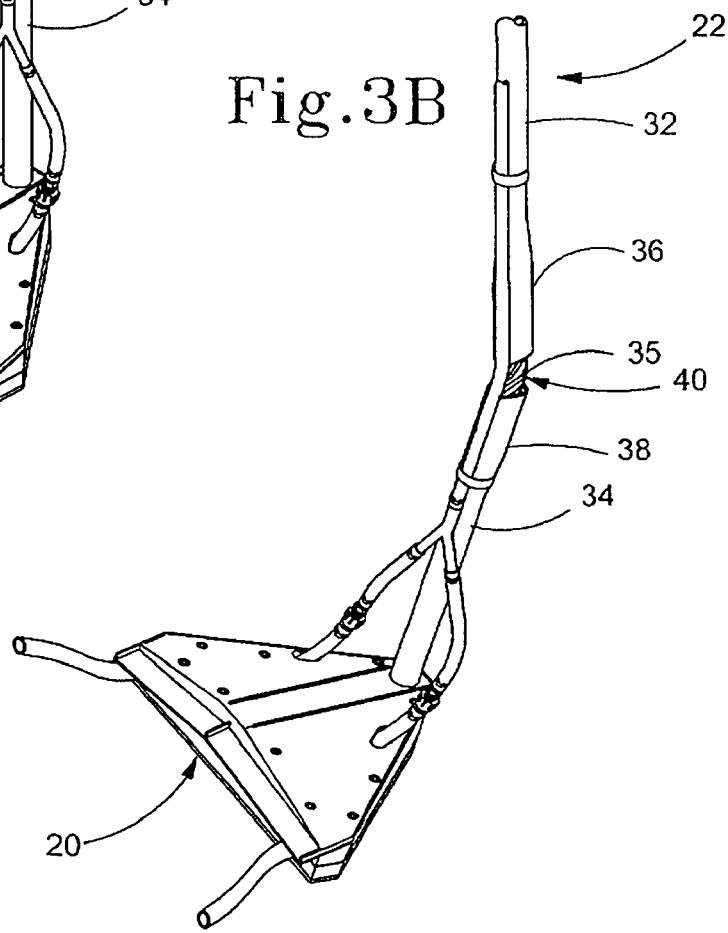

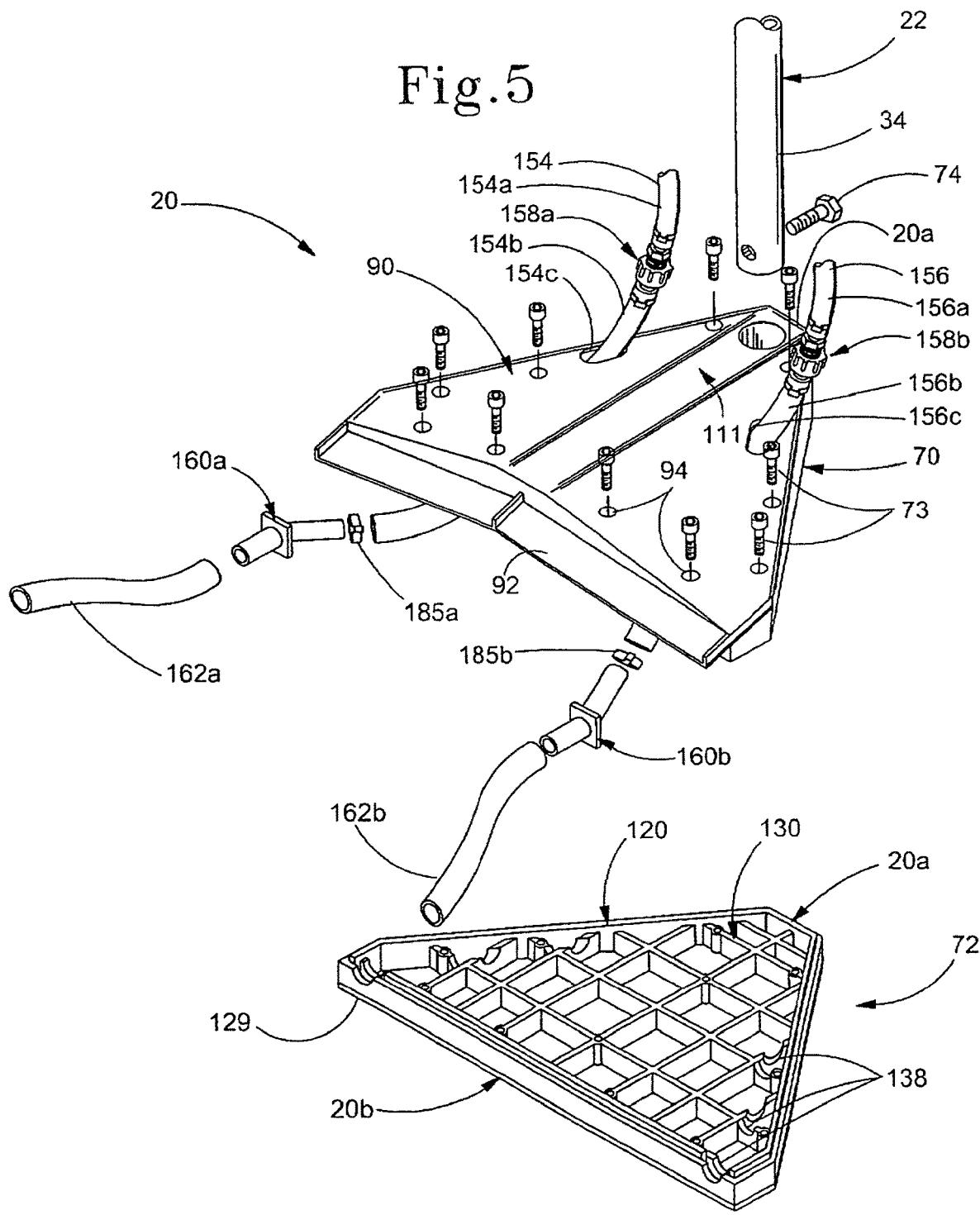

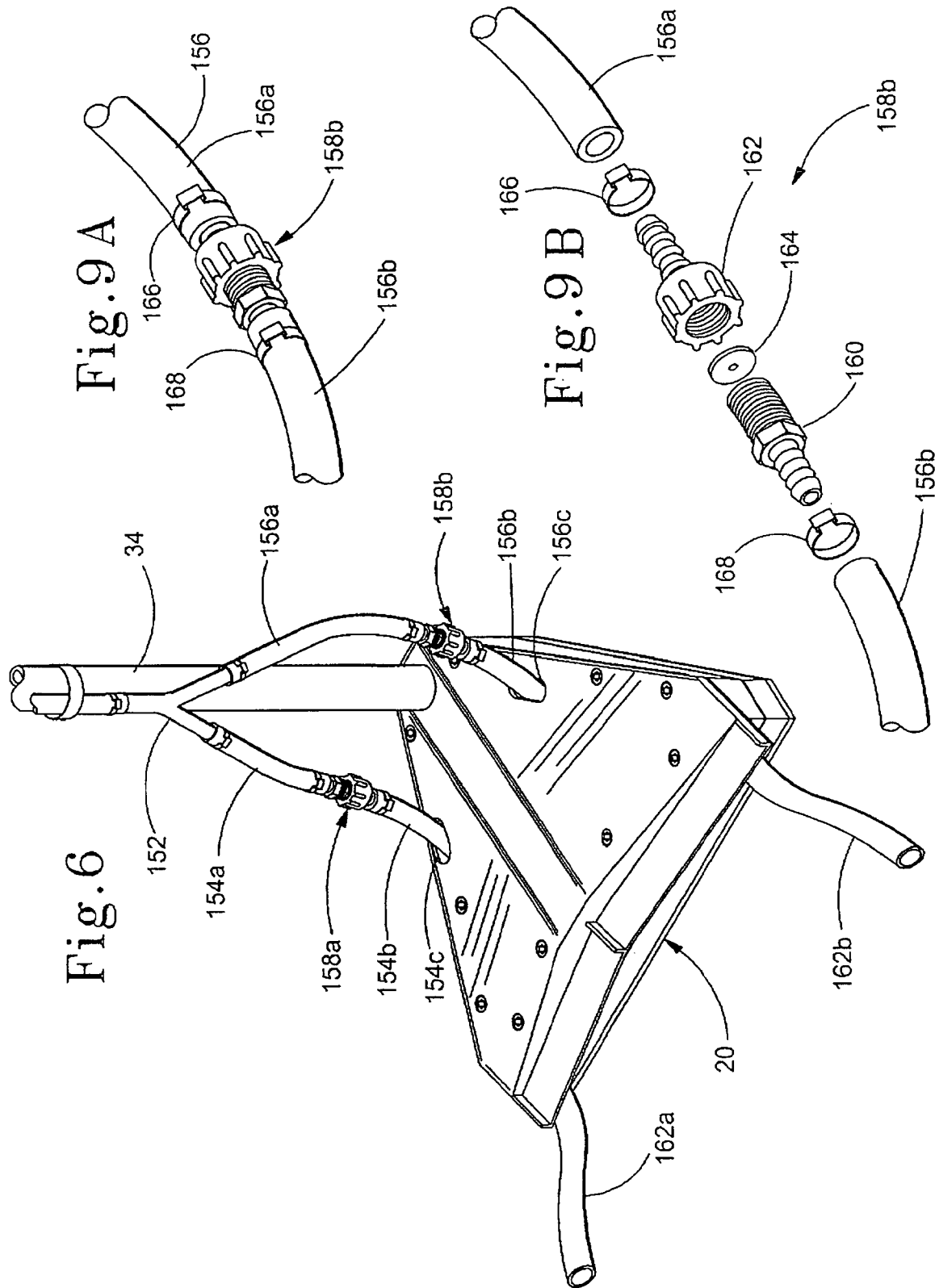

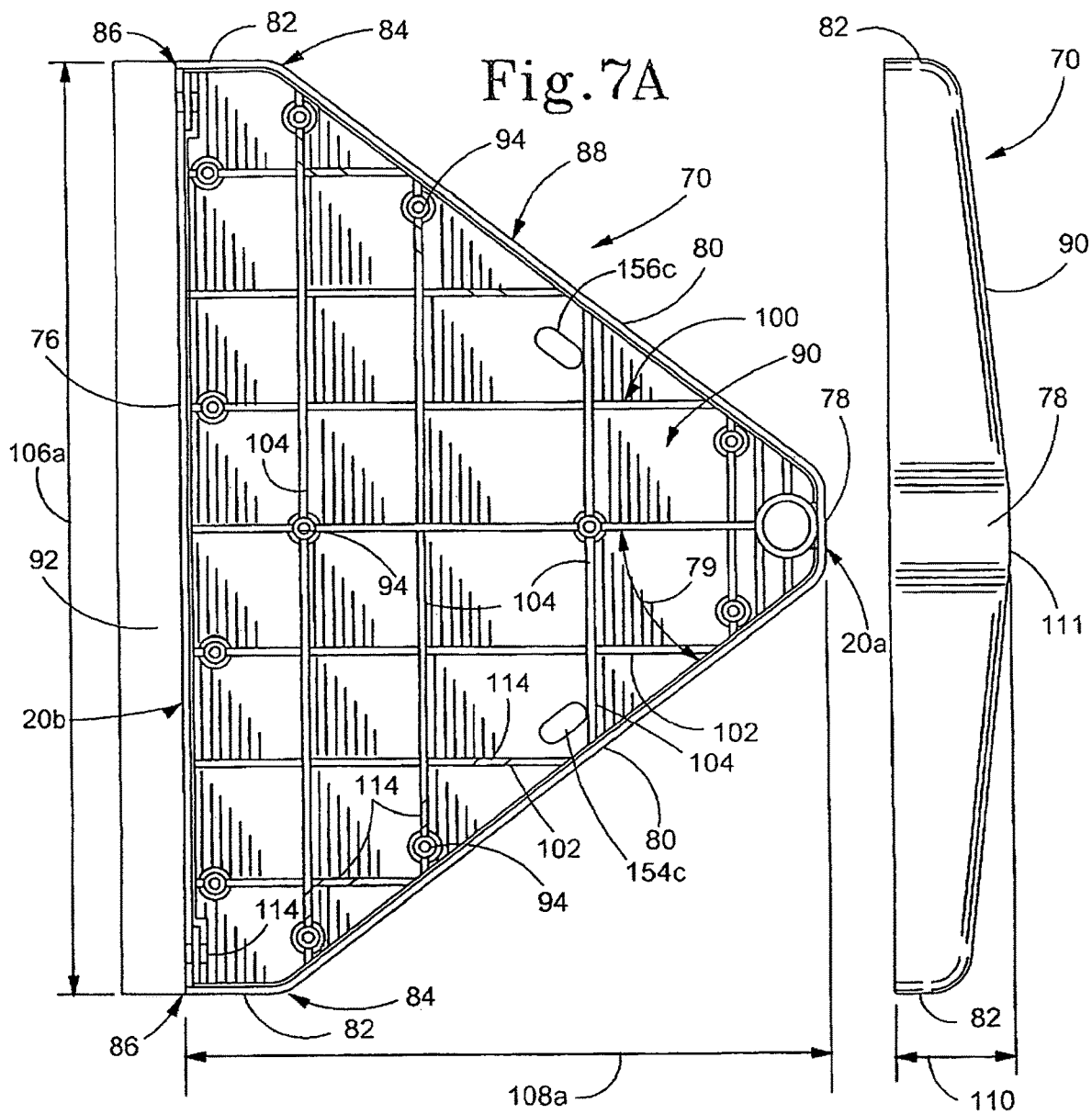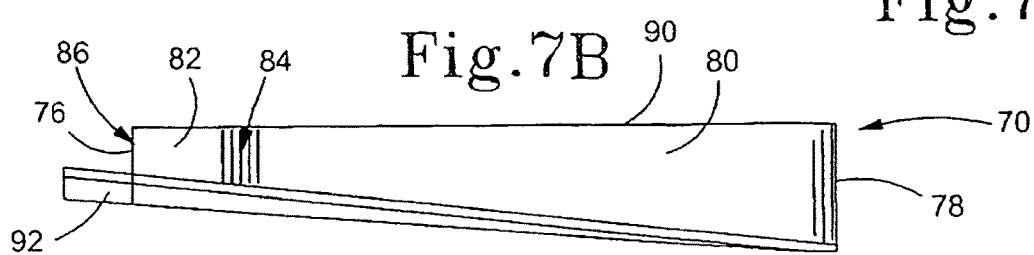

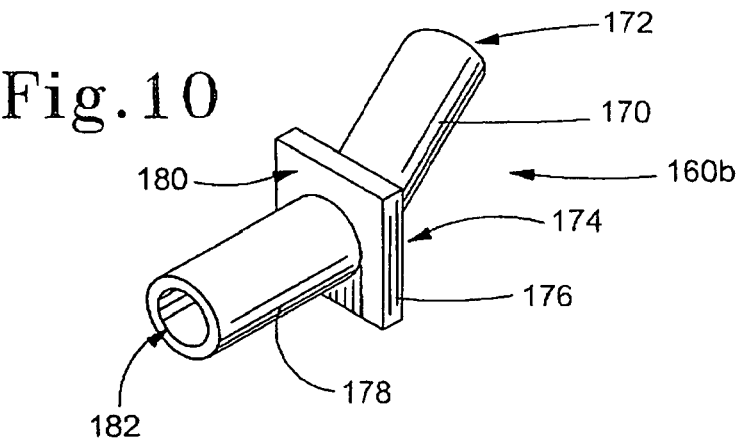
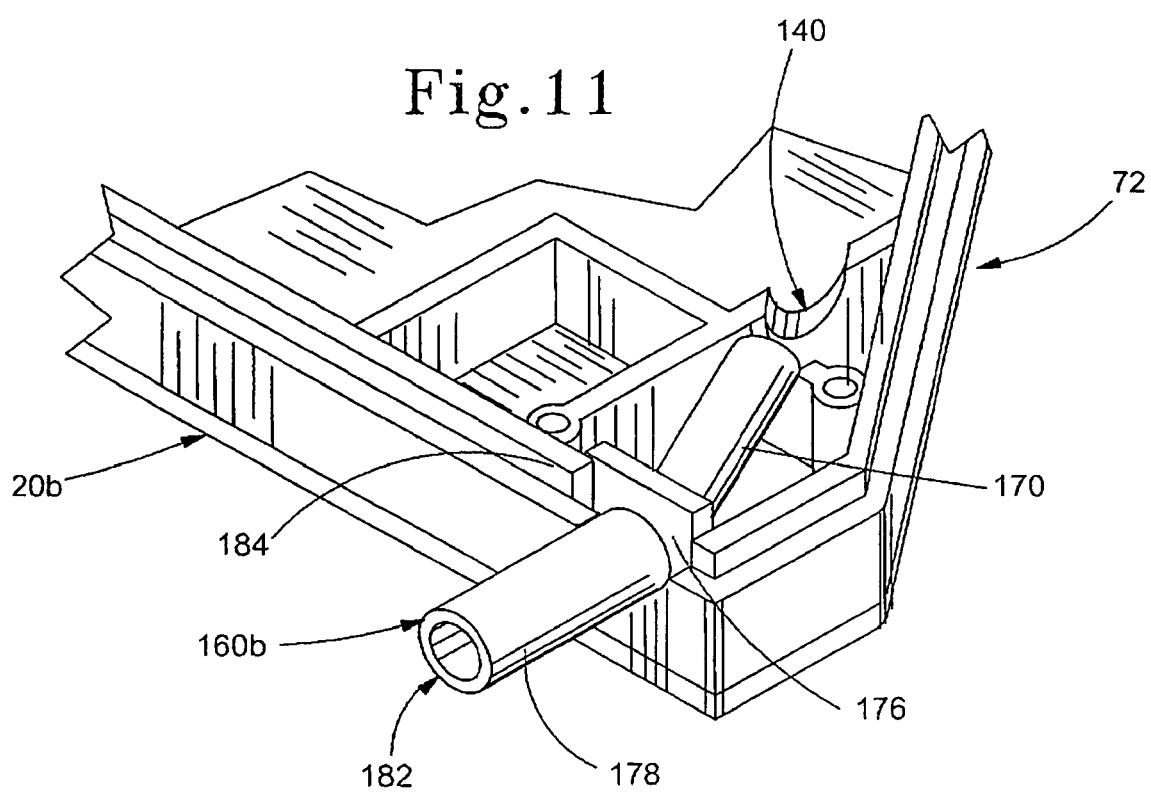

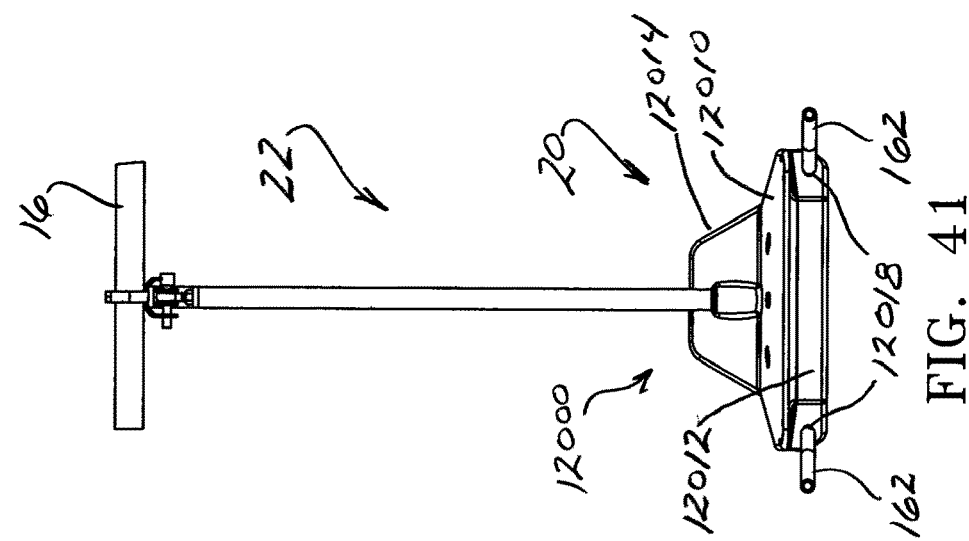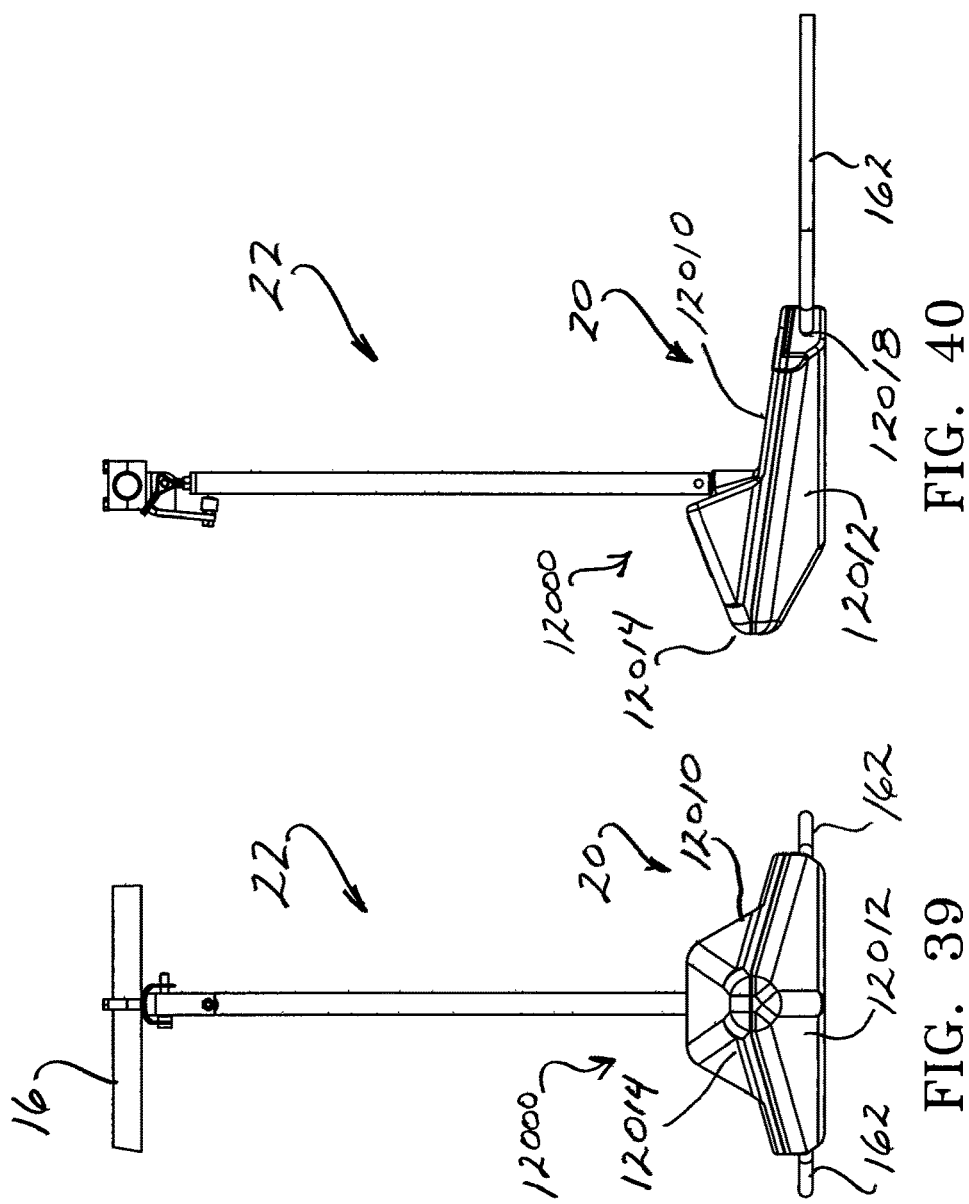

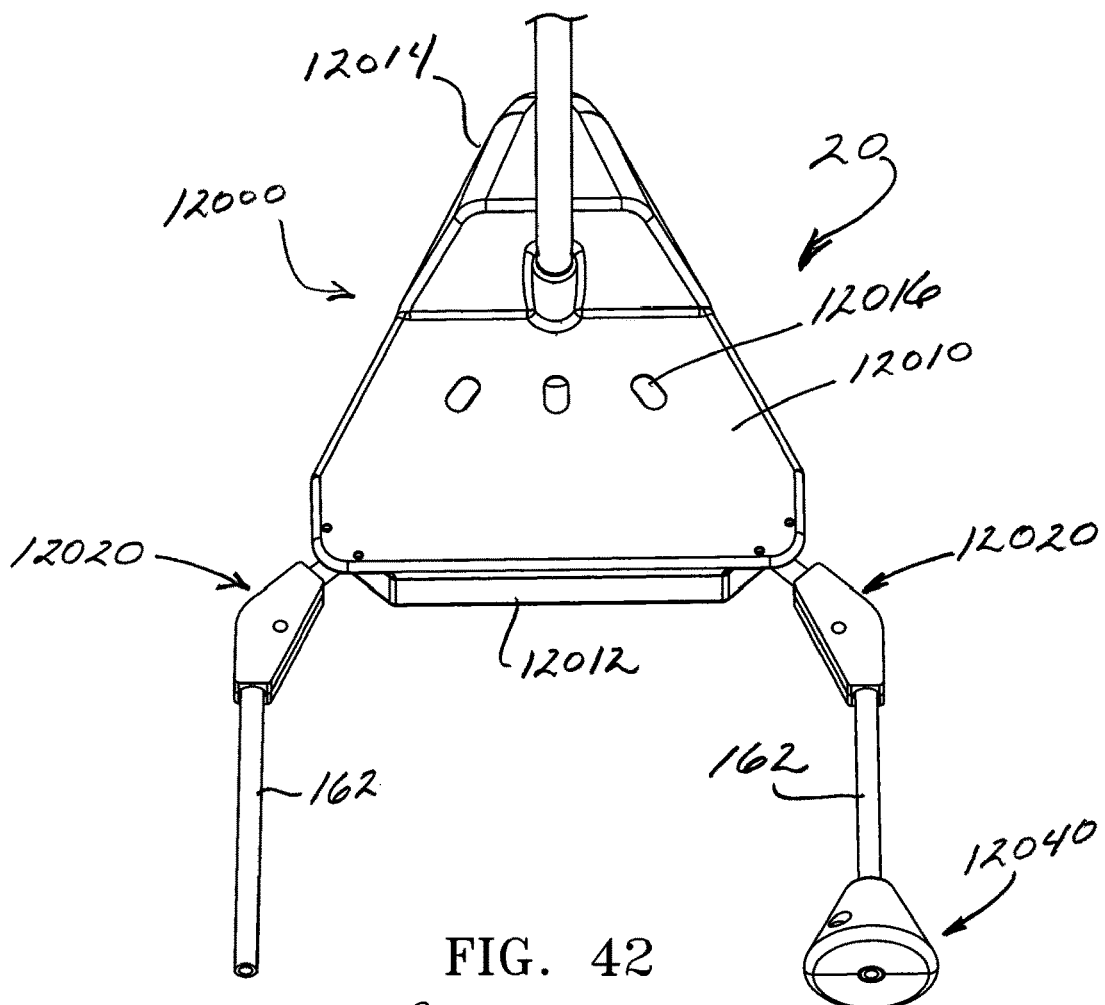
FIG. 42
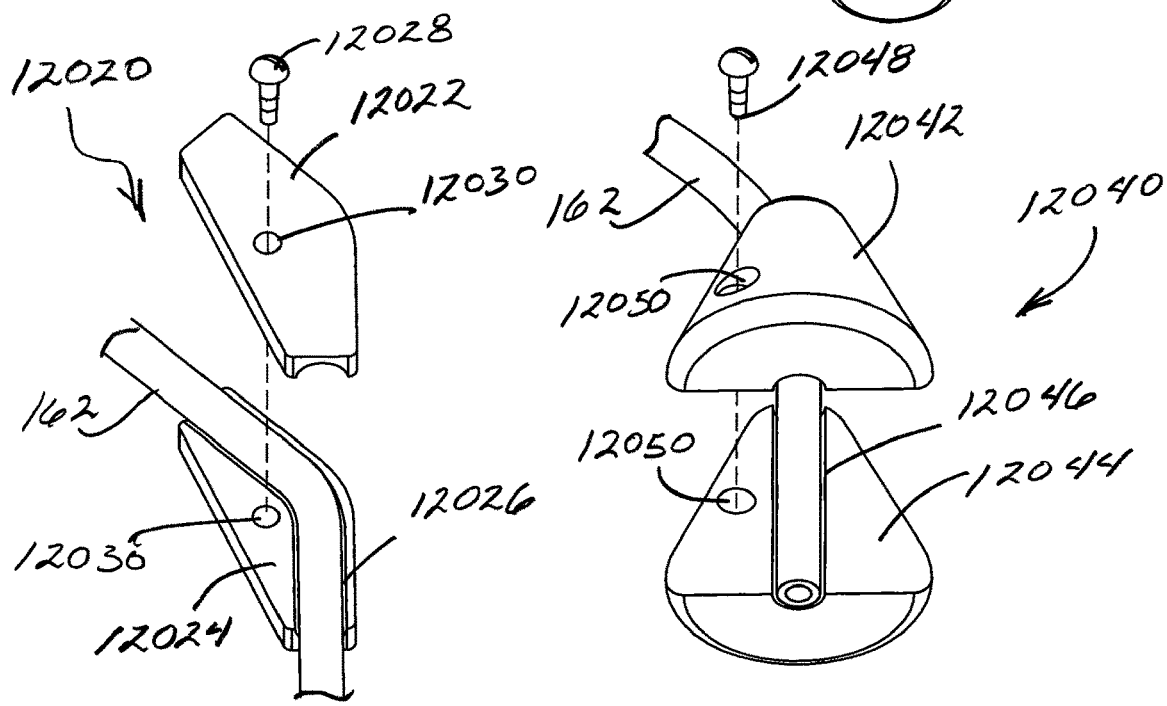
FIG. 43
FIG. 44

US 11,778,940 B2

LIQUID DISPENSING SYSTEM

BACKGROUND

In modern farming practices, broadcast applications of fertilizers or other liquid products to assist plant growth are common practice. For example, applying starter fertilizers at planting in furrow or subsurface presents an opportunity to assist plant nutrient needs for a short period of time, and in very limited amounts. Moreover, world goals of an average corn yield of 300 bushels per acre and average soybean yields of 100 bushels per acre have been suggested to help support the ever-growing population's food and energy needs. Agronomic specialists are developing new genetics in grains, creating genetic potential to achieve these higher yield goals. However, conventional liquid product application systems are useful only at the beginning of the plant's life and, especially when used later in a plant's life, create a significant amount of waste as they spray liquid products in the air above the plants. Thus, conventional broadcast applications of liquid products do not allow for the level of fertilization needed for new genetic plant nutrient needs.

BRIEF DESCRIPTION OF THE DRAWINGS

FIG. 1 is a perspective view of an illustrative liquid dispensing system in accordance with embodiments of the invention.

FIG. 2A is a perspective view of an illustrative liquid placement apparatus in accordance with embodiments of the invention.

FIG. 2B depicts a partial view of an illustrative drop assembly in accordance with embodiments of the invention.

FIG. 2C is a partial, exploded view of the illustrative drop assembly in accordance with embodiments of the invention.

FIG. 3A is a perspective view of an illustrative drop assembly, shown in a first position, in accordance with embodiments of the invention.

FIG. 3B is a perspective view of the illustrative drop assembly of FIG. 3A, shown in a second position, in accordance with embodiments of the invention.

FIG. 4A is an exploded, perspective view of an illustrative coupling assembly in accordance with embodiments of the invention.

FIG. 4B is an assembled, perspective view of the illustrative coupling assembly of FIG. 4A in accordance with embodiments of the invention.

FIG. 5 is an exploded, perspective view of an illustrative base assembly in accordance with embodiments of the invention.

FIG. 6 is an assembled, perspective view of an illustrative base assembly in accordance with embodiments of the invention.

FIG. 7A is a bottom view of an illustrative upper portion of a base assembly in accordance with embodiments of the invention.

FIG. 7B is a side view of the illustrative upper portion of FIG. 7A in accordance with embodiments of the invention.

FIG. 7C is a front, outline view of the illustrative upper portion of FIGS. 7A and 7B in accordance with embodiments of the invention.

FIG. 9A is an assembled, perspective view of an illustrative flow regulator in accordance with embodiments of the invention.

FIG. 9B is an exploded, perspective view of the illustrative flow regulator of FIG. 9A in accordance with embodiments of the invention.

FIG. 10 is a perspective view of an illustrative elbow assembly in accordance with embodiments of the invention.

FIG. 11 is a partial, upper-perspective view of an illustrative lower portion of a base assembly, showing an elbow assembly disposed therein, in accordance with embodiments of the invention.

FIG. 39 is a front elevation view of the drop assembly of FIG. 37.

FIG. 40 is a side elevation view of the drop assembly of FIG. 37.

FIG. 41 is a rear elevation view of the drop assembly of FIG. 37.

FIG. 42 is an enlarged plan view of an embodiment of a base assembly of the drop assembly of FIG. 37.

FIG. 43 is an enlarged exploded perspective view of an embodiment of a dribble tube elbow as shown in FIG. 42.

FIG. 44 is an enlarged exploded perspective view of an embodiment of a dribble tube hood as shown in FIG. 42.

DESCRIPTION

Figure 8A:
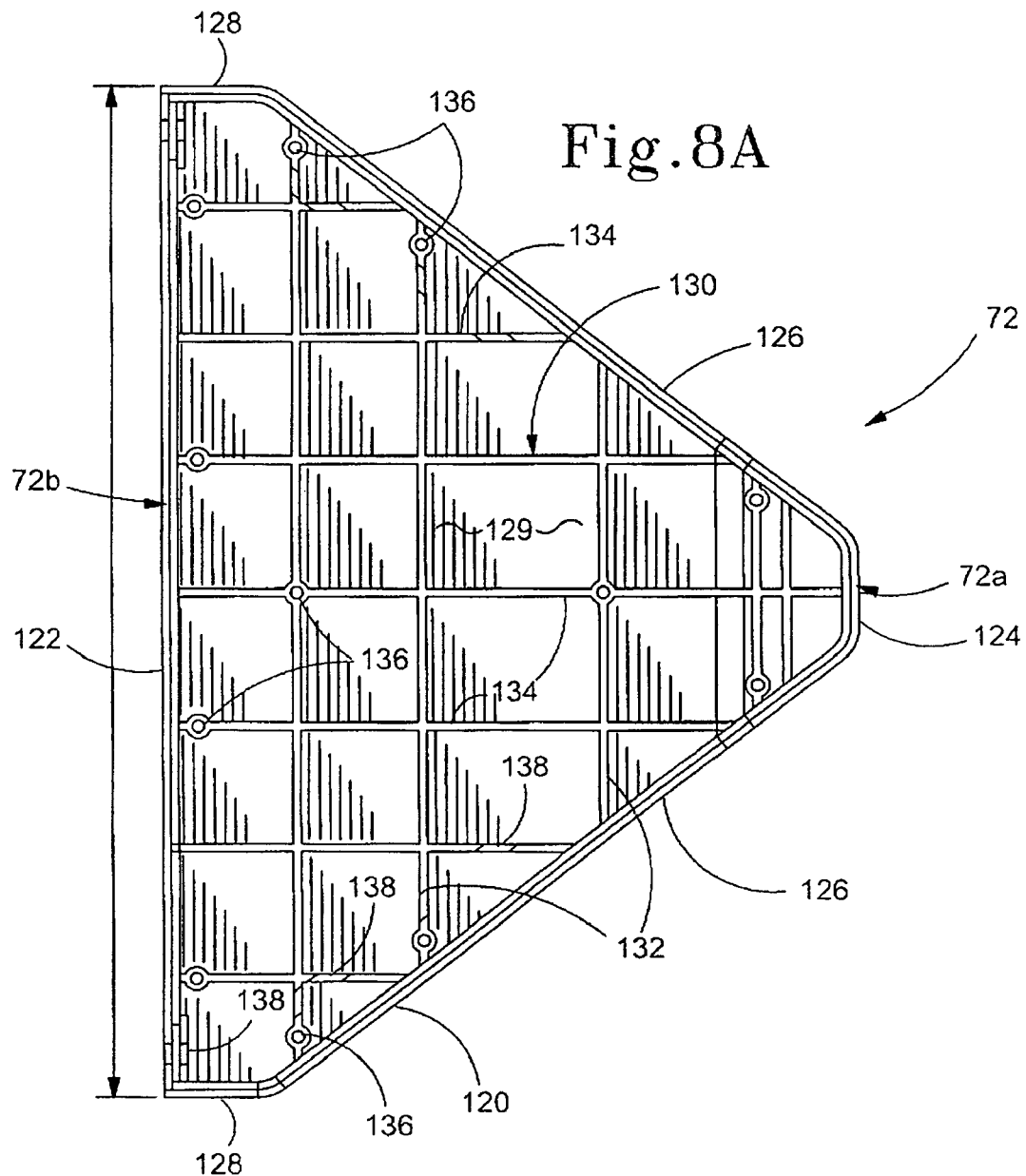
FIG. 8A is a top view of an illustrative lower portion of a base assembly in accordance with embodiments of the invention.

Embodiments of the invention allow for efficiencies in fertilizer usage and higher yield potential by creating the ability to feed plants just prior to the plants' specific crop nutrient needs, thereby helping the genetics to reach their full potential. Embodiments of the invention include a liquid placement apparatus that places the nutrients near the rhizosphere in a moisture zone for the process of mineralization. Nutrients can either be taken in by the plants by mass flow or diffusion, thereby minimizing the environmental footprint left during fertilizer application. By implementing embodiments of the invention, an early time line of opportunity of application is achieved and ranges from the early vegetative stages of a plant's life to the middle reproductive stages of the plant's life. This range creates a large window of opportunity for applicators to achieve new levels of fertilization for higher yields and to achieve more efficient use of fertilizer, thereby reducing surface contamination.

Turning to FIG. 1, an illustrative liquid dispensing system 10 is depicted in a perspective view. As shown in FIG. 1, the illustrative liquid dispensing system 10 includes a carrier 12 that supports a liquid dispensing apparatus 14. According to various embodiments, the carrier 12 can be of any number of different configurations. For example, in some embodiments and as illustrated in FIG. 1, the carrier 12 can be a tractor that includes its own propulsion technology and to which the liquid dispensing apparatus 14 is directly coupled. In other embodiments, the carrier 12 can be a trailer, or other towable vehicle, to which the liquid dispensing apparatus 14 is attached. In these embodiments, the carrier 12 can be towed by an independent tractor. Any number of different configurations for the carrier 12 are possible and all of these are considered to be within the ambit of the invention.

As shown in FIG. 1, the liquid dispensing apparatus 14 may include a boom 16 (often referred to as a "toolbar"). A number of liquid placement apparatuses 18 may be coupled to the boom 16 and may extend downward therefrom (e.g., when the boom 16 is in a fully extended position). Each of the liquid placement apparatuses 18 receives a liquid product from a tank 15 that is supported by the carrier 12. The liquid product is transferred from the tank 15 to a liquid placement apparatus 18 via one or more distribution hoses 19 that may be disposed along the boom 16. Any type and number of suitable distribution hoses 19 may be utilized and any type of suitable pumping mechanism (not illustrated for the purposes of brevity and clarity of description) may be employed to transfer the liquid product from the tank 15 to the distribution hoses 19, and thereby, to the liquid placement apparatuses 18. In example embodiments, the liquid placement apparatuses 18 may attach to a boom 16 as shown in the figures and described above, however, this is not meant to limit the invention. For example, in example embodiments the liquid placement apparatuses 18 may be attached to any suitable structure such as, but not limited to, a side-dress applicator, a cultivator, an opener, a planter row unit, a shank, a chisel, and/or an opener disk. In other words, the liquid placement apparatuses 18 may be attached in a spaced relation to any suitable structure which is supported at a height above the row crop including, by way of example, a boom, frame toolbar, or an attachment to a planter row unit, or any number of ground working tools such as the shank, chisel, and opener disk.

According to various embodiments, the boom 16 can be of any number of different lengths and of any number of different configurations. For example, common boom 16 lengths include 60 feet, 90 feet, and 100 feet. Any other boom 16 length could be employed, as well, in accordance with embodiments of the invention. The boom 16 is attached to the carrier 12 using any number of attachment technologies including, for example, a z-bracket mechanism. In embodiments, the boom 16 can be attached in front of the carrier 12 or behind the carrier 12. According to various embodiments of the invention, the carrier 12 includes the ability to raise the boom 16 to a height that is high enough to allow the carrier 12 to turn on the end of a field in a standing crop without injuring the standing crop. In other embodiments, portions of the boom 16 can be folded upwardly, and out of the way of the standing crops, as described below.

As illustrated in FIG. 1, the boom 16 includes a center section 17a, that is mounted to the carrier 12, and two wing sections 17b and 17c. In some embodiments, the wing sections 17b and 17c can be designed to fold at joints 17d and 17e, respectively. The foldable design allows for space-efficient storing of the system 10. Additionally, the wing sections 17b and 17c can be optionally folded (e.g., upwardly) during a turn-around action at the end of a crop row. It will be understood by individuals having skill in the relevant arts that foldable wings sections 17b and 17c can be useful in that, when the carrier 12 reaches an end of a crop row, the wing sections 17b and 17c can be folded upwardly, thereby moving the wing sections 17b and 17c, and any hardware attached thereto, out of the way of the crops at the end of the crop row as the carrier 12 is turned around to go down an adjacent crop row in the opposite direction.

Turning now to FIG. 2A, an illustrative liquid placement apparatus 18 is depicted in a perspective view. As shown, the liquid placement apparatus 18 includes a base assembly 20 that is coupled to a lower end of a drop assembly 22. The drop assembly 22 is adjustably coupled to the boom 16 using a coupling assembly 24. The liquid placement apparatus 18 further includes a hose assembly 26 that facilitates transferring liquid product from the distribution hose 19 associated with the boom 16 to the base assembly 20, which includes two dribble hoses 162a and 162b extending therefrom through which the liquid product is delivered to the ground.

As shown in FIGS. 2A-2C, 3A, and 3B, the drop assembly 22 includes an upper portion 32 and a lower portion 34, flexibly coupled together using a cable 35 that is disposed within the upper portion 32 and the lower portion 34. In embodiments, the cable 35 can be secured to the inside of each of the upper portion 32 and the lower portion 34 of the drop assembly 22 by crimping the cable 35 in place at crimps 36 and 38, respectively. In other embodiments, any number of other mechanisms can be used to couple the cable 35 to the upper 32 and lower 34 portions of the drop assembly 22. Additionally, as illustrated in FIGS. 2A-2C, 3A, and 3B, the drop assembly 22 includes a gap 40 between the upper portion 32 and the lower portion 34 of the drop assembly 22. The gap 40 allows the lower portion 34 of the drop assembly 22 to move relative to the upper portion 32 such as, for example, when an obstacle is encountered. According to various embodiments of the invention, the gap 40 can be of any desired size (e.g., ½", ¾", 1", etc.).

Turning to FIGS. 3A and 3B, an illustrative drop assembly 22 is depicted in two perspective views, in two different positions, according to embodiments of the invention. In a first position, illustrated in FIG. 3A, the drop assembly 22 is oriented substantially vertically and the upper 32 and lower 34 portions of the drop assembly 22 are substantially aligned, providing a roughly straight drop assembly 22. The cable 35 extends across the gap 40, thereby providing a flex point at which the lower portion 34 of the drop assembly 22 can move (e.g., flex, tilt, etc.) into a second position, illustrated in FIG. 3B, when the lower portion 34 of the drop assembly 22 or the base assembly 20 encounters a foreign structure such as, for example, a standing crop or field obstructions such as rocks, posts, gullies or ravines.

The upper portion 32 and the lower portion 34 of the drop assembly 22 can be of any number of different lengths and configurations. In an embodiment, for example, the upper 32 and lower 34 portions together make a drop assembly 22 that is 18" to 30" long. Depending upon the particular application, the drop assembly 22 can be shorter than 18" and, in some embodiments, the drop assembly can be longer than 30." In some embodiments, the upper 32 and lower 34 portions of the drop assembly 22 can include ¾" pipe flexibly coupled to one another using a ⅝ cable 35 that is crimped inside of the upper 32 and lower 34 portions. In some embodiments, the upper portion 32 and the lower portion 34 can be flexibly coupled to one another using any number of other coupling mechanisms including, for example, hinges, pivots, rotational coupling mechanisms, and the like, such that the lower portion 34 of the drop assembly 22 can move relative to the upper portion 32 when the lower portion 34 encounters an obstacle such as, for example, a standing crop, as shown in FIG. 3B.

Returning now to FIG. 2, the drop assembly 22 is adjustably coupled to the boom 16 using a coupling assembly 24 that couples the upper portion 32 of the drop assembly 22 to the boom 16 at a drop location 22a. According to various embodiments, any number of drop assemblies 22 can be coupled to the boom 16, with any desired amount of spacing provided between adjacent drop assemblies 22. According to embodiments, the boom 16 includes a number of drop assemblies 22 extending downwardly therefrom, where each drop assembly 22 extends downwardly from the boom 16 at a drop location 22a. In some embodiments, for example, the boom 16 includes a drop location 22a at every 15"-48", depending upon the configuration of the boom 16.

Figures 4A, 4B:
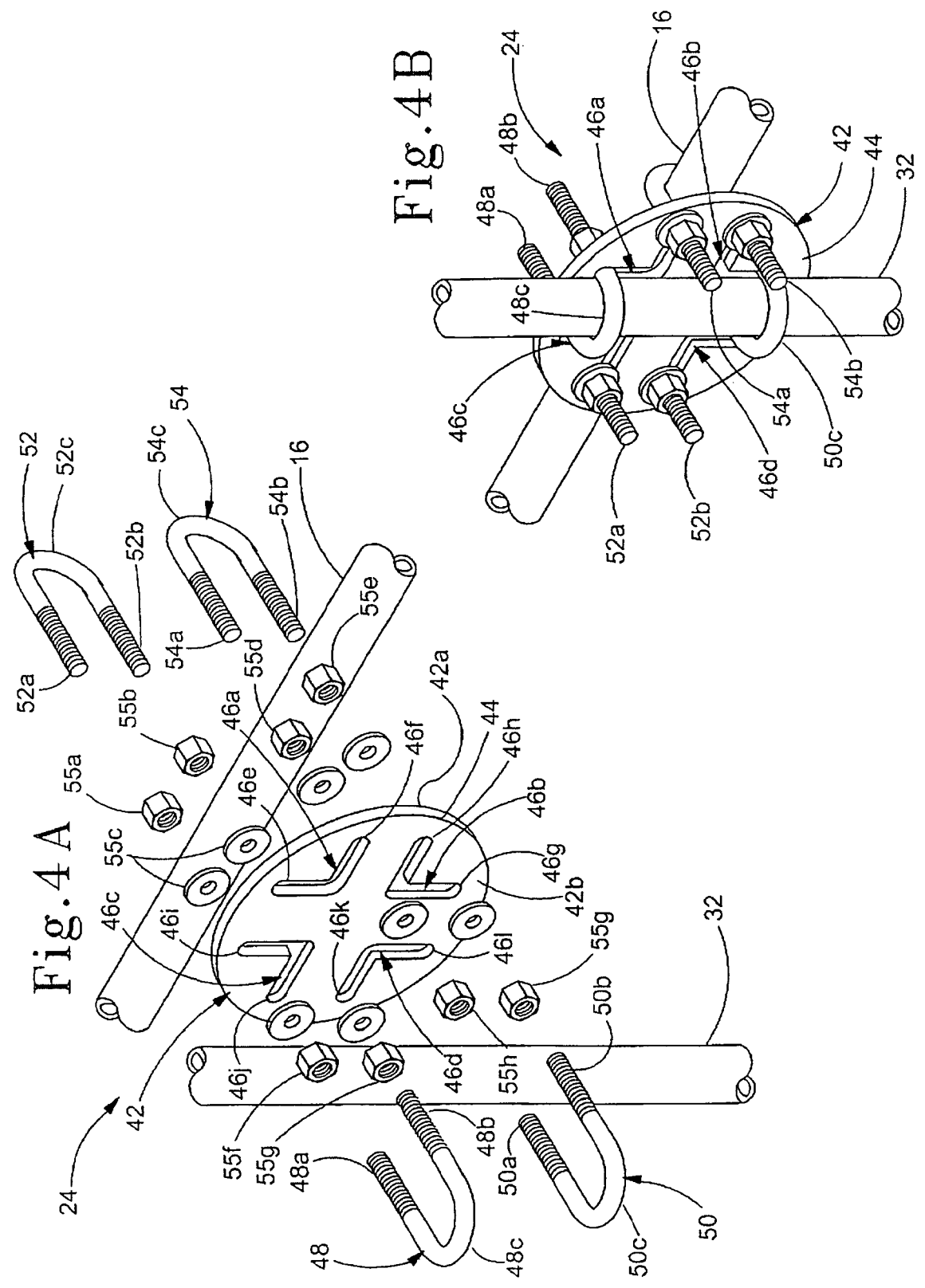

Turning now to FIGS. 4A and 4B, an illustrative coupling assembly 24 is illustrated in an exploded view (FIG. 4A) and in an assembled view (FIG. 4B). The illustrative coupling assembly 24 is just one example of a suitable coupling assembly in accordance with embodiments of the invention. In embodiments, other types of coupling assemblies can be used and in some embodiments, the coupling assembly 24 can include features or configurations not described herein. The illustrative coupling assembly 24, illustrated in FIGS. 4A and 4B allows for adjusting the placement of the coupling assembly (and therefore, the drop assembly 22) along the boom 16 (e.g., the coupling assembly 24 allows for determining a drop location 22a with minimal effort).

As shown in FIGS. 4A and 4B, the illustrative coupling assembly 24 includes a bracket 42, having a number of slots 46a, 46b, 46c, and 46d disposed therein, and U-bolts 48, 50, 52, and 54 that are configured to be coupled to the bracket 42, and around the boom 16 and the upper portion 32 of the drop assembly 22, thereby removably attaching the drop assembly 22 to the boom 16. With particular reference to FIG. 4A, the bracket 42 includes a body 44, in which is disposed the slots 46a, 46b, 46c, and 46d, which, in some embodiments, are generally L-shaped, as shown in FIGS. 4A and 4B. According to various embodiments, the body 44 of the bracket 42 is substantially flat and substantially circular in shape and is configured such that each L-shaped slot 46a, 46b, 46c, and 46d is roughly disposed within a quadrant of the circularly-shaped body 44, as shown in FIGS. 4A and 4B. In some embodiments, the body 44 can include any number of other types of shapes. Similarly, in embodiments, the slots 46 can include shapes other than L-shapes such as, for example, S-shapes, T-shapes, and the like. According to various embodiments, the slots 46a, 46b, 46c, and 46d are evenly spaced around the bracket 44 and can be particularly spaced apart to correspond to the widths of the upper portion 32 of the drop assembly 22 and the boom 16.

As is shown in FIGS. 4A and 4B, in operation, the upper portion 32 of the drop assembly 22 is aligned in a perpendicular orientation with the boom 16 and the bracket 42 is disposed between the upper portion 32 and the boom 16. As is illustrated in FIG. 4B, the bracket 42 is positioned such that a first pair of L-shaped slots 46a and 46b is exposed on a first side of the upper portion 32 of the drop assembly 22 and a second pair of L-shaped slots 46c and 46d is exposed on a second side of the upper portion 32 of the drop assembly 22.

In this mounting position, a first portion 46e of the first slot 46a is oriented substantially parallel to the upper portion 32 of the drop assembly 22 and connects with a second portion 46f, at a lower end of the first portion 46e. The second portion 46f of the first slot 46a extends from the lower end of the first portion 46e outwardly, in a direction that is substantially parallel to the boom 16. Similarly, but in what is essentially a reflected orientation, in the mounting position, the second slot 46b includes a first portion 46g that is substantially parallel to the upper portion 32 of the drop assembly 22 and connects with a second portion 46h, at an upper end of the first portion 46g. The second portion 46h of the second slot 46b extends from the upper end of the first portion 46g outwardly, in a direction that is substantially parallel to the boom 16. Also in the mounting position, a first portion 46i of the third slot 46c is oriented substantially parallel to the upper portion 32 of the drop assembly 22 and connects with a second portion 46j, at a lower end of the first portion 46i. The second portion 46j of the third slot 46c extends from the lower end of the first portion 46i outwardly, in a direction that is substantially parallel to the boom 16. Similarly, but in what is essentially a reflected orientation, in the mounting position, the fourth slot 46d includes a first portion 46k that is substantially parallel to the upper portion 32 of the drop assembly 22 and connects with a second portion 46l, at an upper end of the first portion 46k. The second portion 46l of the fourth slot 46d extends from the upper end of the first portion 46k outwardly, in a direction that is substantially parallel to the boom 16.

With particular reference to FIG. 4A, to adjustably secure the drop assembly 22 to the boom 16, a set of adjustable U-bolts 48, 50, 52, and 54 are utilized. Each U-bolt 48, 50, 52, and 54 is roughly shaped like a "U." That is, for example, a first U-bolt 48 includes a first arm 48a and a second arm 48b that are parallel to one another and that each have threads disposed toward the outside end of the arm 48a and 48b. A curved mid-portion 48c extends between the inside ends of the first arm 48a and the second arm 48b, thereby defining a U-shaped bolt 48. Similarly, a second U-bolt 50 includes threaded parallel arm portions 50a and 50b connected by a curved mid-portion 50c; a third U-bolt 52 includes threaded parallel arm portions 52a and 52b connected by a curved mid-portion 52c; and a fourth U-bolt 54 includes threaded parallel arm portions 54a and 54b connected by a curved mid-portion 54c.

As illustrated in FIG. 4B, to secure the bracket 42 to the upper portion 32 of the drop assembly 22 and the boom 16, the first U-bolt 48 is inserted through the back 42b of the bracket 42 such that the first arm member 48a passes through the first portion 46i of the third slot 46d, the second arm member 48b passes through the first portion 46e of the first slot 46a, and the mid-portion 48c of the first U-bolt 48 wraps around the outside (back) side of the upper portion 32 of the arm assembly 22. A first nut 55a is screwed onto the first arm member 48a and secured against the front side 42a of the bracket 42, and a second nut 55b is screwed onto the second arm member 48b of the first U-bolt 48 and secured against the front side 42a of the bracket 42, thereby holding the first U-bolt 48 in place. As shown, in embodiments one or more washers 55c can be disposed between the nuts 55a and 55b and the bracket 42.

Similarly, the second U-bolt 50 is inserted through the back 42b of the bracket 42 such that the first arm member 50a of the second U-bolt 50 passes through the first portion 46k of the fourth slot 46d, the second arm member 50b passes through the first portion 46g of the second slot 46b, and the mid-portion 50c of the second U-bolt 50 wraps around the outside (back) side of the upper portion 32 of the arm assembly 22. A third nut 55d is screwed onto the first arm member 50a and secured against the front side 42a of the bracket 42, and a fourth nut 55e is screwed onto the second arm member 50b of the second U-bolt 50 and secured against the front side 42a of the bracket 42, thereby holding the second U-bolt 50 in place.

As shown in FIG. 4B, the first and second U-bolts 48 and 50 adjustably couple the upper portion 32 of the drop assembly 22 to the back side 42b of the bracket 42. Similarly, the third and fourth U-bolts 52 and 54 adjustably couple the boom 16 to the front side 42a of the bracket 42, as described here. As shown in FIGS. 4A and 4B, the third U-bolt 52 is inserted through the front 42a of the bracket 42 such that the first arm member 52a of the third U-bolt 52 passes through the second portion 46j of the third slot 46c, the second arm member 52b passes through the second portion 46l of the fourth slot 46d, and the mid-portion 52c of the second U-bolt 52 wraps around the inside (front) side of the boom 16. A fifth nut 55f is screwed onto the first arm member 52a and secured against the back side 42b of the bracket 42, and a sixth nut 55g is screwed onto the second arm member 52b of the third U-bolt 52 and secured against the back side 42b of the bracket 42, thereby holding the third U-bolt 52 in place.

Similarly, the fourth U-bolt 54 is inserted through the back 42b of the bracket 42 such that the first arm member 54a of the fourth U-bolt 54 passes through the second portion 46f of the first slot 46a, the second arm member 54b passes through the second portion 46h of the second slot 46b, and the mid-portion 54c of the second U-bolt 54 wraps around the inside (front) side of the boom 16. A seventh nut 55h is screwed onto the first arm member 54a and secured against the back side 42b of the bracket 42, and an eighth nut 55h is screwed onto the second arm member 54b of the fourth U-bolt 54 and secured against the back side 42b of the bracket 42, thereby holding the fourth U-bolt 54 in place. In this manner, the upper portion 32 of the drop assembly 22 is adjustably and removably coupled to the boom 16.

Turning now to FIG. 5, an illustrative base assembly 20 is depicted in an exploded, perspective view. According to various embodiments of the invention, the base assembly 20 is a roughly triangle-shaped unit. The front 20a of the base assembly 20 leads the assembly 20 through the terrain so that the base assembly 20 can push through crops and other obstacles. In embodiments, the base assembly 20 is constructed from polypropylene plastic and, in embodiments, incorporates a grid-based design that is engineered for strength, weight distribution and durability. According to various embodiments, the base assembly 20 travels between approximately 6" and approximately 8" above the ground surface as the carrier 12 (see FIG. 1) moves through the crop rows, but can still be effective as high as 28" above the ground surface. Each base assembly 20 travels independently through a crop row and that crop row acts as a guide for the base assembly 20 to follow in contours and uneven topography. Y-drop has the capacity to dribble on the surface 1 to 50 gallons of product within 3" on both sides of plant rows. According to embodiments, and with reference to FIG. 1, the liquid placement apparatuses 18 are mounted on the boom 16 with approximately 6" of space between each of the base assemblies 20. In other embodiments, the apparatuses 18 are configured to allow a different amount of space between base assemblies 20.

As shown in FIG. 5, the base assembly 20 is manufactured in two injected molded pieces: an upper portion 70 and a lower portion 72. The upper portion 70 and lower portion 72 of the base assembly 20 are coupled using fastening devices such as, for example, a number of screws 73. The base assembly 20 is coupled to the bottom of the lower portion 34 of the drop assembly 22 using a fastening device such as, for example, a 5/16*1.5" shoulder bolt 74. In other embodiments, other types or sizes of bolts or other fasteners can be used to attach the base assembly 20 to the drop assembly 22. In an embodiment, the bolt 74 is disposed approximately 1" from the bottom of the base assembly 20 and can be secured to the lower portion 34 of the drop assembly 22 using a nut (not illustrated).

With particular reference to FIGS. 5 and 7A-7C, the upper portion 70 of the base assembly includes a back wall 76 and a parallel, opposed front wall 78. Angled side walls 80 extend from the ends of the front wall 78 toward the ends of the back wall 76, which is longer than the front wall 78. In some embodiments, the back wall 76 is significantly longer than the front wall 78, thereby providing for a wider base angle 79. In an embodiment, the upper portion 70 of the base assembly 20 does not include a front wall 78, but rather, comes to a point in the front. A pair of parallel, opposed wall segments 82 extend between the back ends 84 of the side walls 80 and the ends 86 of the back wall 76, thereby forming a roughly triangular frame 88. An upper panel 90 is disposed over the frame 88. As is further illustrated in FIGS. 5 and 7A, a wing 92 is attached to the back wall 76 and extends outwardly from the back wall 76, along the length of the back wall 76. Additionally, a number of apertures 94 are disposed within the upper panel 90. The apertures 94 are adapted to receive the screws 73 with which the base assembly 20 is assembled.

With particular reference to FIG. 7A, disposed within the frame 88 of the upper portion 70 of the base assembly 20 is an upper grid 100. In embodiments, the upper grid 100 includes a first set of ribs 102, which extend between the two sidewalls 80, parallel to the back wall 76. A second set of ribs 104 intersects the first set of ribs 102 and each of the second set of ribs 104 extends between the back wall 76 and a sidewall 80, in an orientation substantially perpendicular to the back wall 76 (and, thus, the first set of ribs 102), and in the configuration illustrated. As shown in FIG. 7A, the apertures 94 extend through ribs 102 or 104, thereby allowing the screws 73 to pass through the upper portion 70 of the base assembly 20 into the lower portion 72.

Additionally, a number of the ribs 102 and 104 toward the back 20b of the base assembly have channels (e.g., portions cut away) 114 disposed therein for allowing tubing to be disposed therethrough, as described in more detail below. The upper grid 100 corresponds to a lower grid 130. The grids 100 and 130 are engineered to reduce breakage of the upper portion 70 of the base assembly 20 upon impact with a foreign structure. Additionally, the designs of the grids 100 and 130 help to distribute the weight of the base assembly 20 in a manner that allows for the base assembly 20 to be moved through crop fields at reasonable speeds such as, for example, speeds ranging from about 1 mph to about 12 mph, while allowing the drop assembly 22 to hang in a reasonably vertical configuration. In embodiments, the weight of the base assembly 20 is distributed such that the base assembly is oriented with its front 20a end angled slightly upward (and thereby causing the drop assembly 22 to hang somewhat forward) while at rest, allowing the drop assembly 22 to move to a substantially vertical position as the speed of the carrier 12 increases and the carrier moves through the field.

According to various embodiments, the width 106 of the back wall 76 of the upper portion 70 of the base assembly 20 can have any desired dimension. In embodiments, for example, the width 106a varies from about 9" to about 32". It will be appreciated by individuals having skill in the relevant arts that the length 108a of the mold varies in relation to the width 106. In some embodiments, the widths 106a and 106b of the molds 70 and 72 are determined for a specific plant row width. According to various implementations, each base width 106a and 106b is designed to allow for 6" of total clearance—e.g., 3" of clearance on each side of the base assembly 20. This clearance between the base assembly 20 and the crop row allows the base assembly 20 to move between crop rows without damaging the crops in those crop rows.

With particular reference to FIG. 7C, the height 110 of the upper portion 70 of the base assembly 20 varies between the two sidewalls 80. As shown in FIG. 7C, the height 110 is beveled upward in the center front 111 of the upper portion 70 of the base assembly. The beveled upper portion 70 design allows neighboring base assemblies, when the machine is engaged, to not tangle with each other and allows base assemblies to slide off of each other if needed. Entanglement can happen, for example, when the boom 16 (or a portion thereof) is raised to allow the machine to turn at the end of a crop row. When the boom 16 is lowered, the standing crop may initially misalign the base assemblies until a short distance is traveled, whereby the design of the base assemblies allows the base assemblies to realign themselves. Additionally, the wing 92, which in embodiments, can extend approximately 1.5" from the back wall 76, protects neighboring base assemblies from catching on an elbow 160a or 160b (described in more detail below) when the base assemblies are realigned in the crop rows upon turnaround alignment from the row change.

Figure 8B:
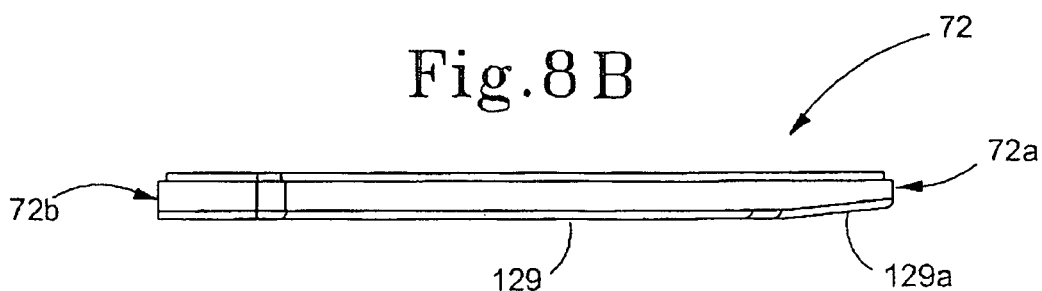
FIG. 8B is a side view of the illustrative lower portion of FIG. 8A in accordance with embodiments of the invention.

Turning now to FIGS. 5, 8A and 8B, the lower portion 72 of the base assembly 20 includes a frame 120 defined by a back wall 122, a front wall 124, two angled sidewalls 126, and two parallel wall segments 128, as shown. The shape of the frame 120 is roughly triangular and, in embodiments, is substantially similar to the shape of the frame 88 of the upper portion 70 of the base assembly 20. In some embodiments, the upper portion 70 and the lower portion 72 are configured such that the two portions 70 and 72 are flush along the sides when attached. A lower panel 129 extends over the bottom side of the frame 120. As shown in FIG. 8B, the lower panel 129 includes a bevel 129a extending from the front 72a of the lower portion 72 toward the rear 72b of the lower portion 72. In some embodiments, the bevel 129a can extend the entire length of the lower panel 129 (that is, the lower panel 129 itself could be angled downward from the front 72a toward the rear 72b), while in other embodiments (such as the embodiment illustrated in FIG. 8B), the bevel 129a extends for only a portion of the length of the lower panel 129. The bevel 129a helps the base assembly 20 move through crop rows more smoothly by facilitating deflection of encountered obstacles.

As is shown in FIG. 8A, the lower grid 130 is disposed within the frame 120 (and coupled to the lower panel 129). The lower grid 130 includes a first set of ribs 132 that extends between the two sidewalls 126 and a second set of ribs 134 that intersects the first set of ribs 132 in a substantially perpendicular orientation. As illustrated, each of the second set of ribs 134 extends between the back wall 122 and a sidewall 126. As shown in FIG. 8A, the lower portion 72 of the base assembly includes a number of apertures 136 that extend through ribs 132 or 134, thereby allowing the screws 73 to pass into the lower portion 72. Additionally, a number of the ribs 132 or 134 toward the back 20b of the base assembly have channels (e.g., portions cut away) 138 disposed therein. The channels 138 match the channels 114 of the upper portion 70 such that, when the base assembly 20 is assembled, a pair of throughways 140 (see FIG. 11, which illustrates one throughway 140 of the pair) are provided within the base assembly 20 for allowing tubing to be disposed therethrough, as described in more detail below.

Returning briefly to FIG. 1, a liquid product is delivered to crop rows, in embodiments of the invention, using a number of liquid placement apparatuses 18 that extend downwardly from a boom 16 attached to a carrier having a storage tank 15 and transfer pump (not illustrated herein for the purposes of clarity and brevity). The liquid product is pumped from the tank 15 into the distribution hose 19. The pump can be any type of conventional pump with the ability to provide enough liquid product as prescribed for the application intended.

According to embodiments of the invention, and with reference to FIG. 2A, the liquid product travels through the distribution hose 19 and into the hose assembly 26 near the drop location 22a. As illustrated in FIGS. 2A, 5, and 6, the hose assembly 26 includes an upper hose assembly 142a that extends along the drop assembly 22 and that is attached, at an upper end 144 to an n-orifice outlet 146 using a connector 148 adapted to be relatively easily coupled to the n-orifice outlet 146. According to embodiments, the upper hose assembly 142a is a ⅜ diameter hose. In other embodiments, hoses of different diameters can be used to optimize liquid product flow for the particular configuration. At a lower end 150 of the upper hose assembly 142a, a y-splitter 152 couples the upper hose assembly 142a to a lower hose assembly 142b.

In embodiments, the upper hose assembly 142a is attached to the back of the drop assembly 22 using fasteners 142c, as shown in FIG. 2, to protect the upper hose assembly 142a form damage caused by encountering debris from the crop row. In embodiments, the upper hose assembly 142a is disposed outside of the drop assembly 22 for convenience of replacement. The fasteners 142c can include any type of fastening device such as clamps, ties, and the like. In other embodiments, the upper hose assembly 142a can be disposed within the drop assembly 22 for added protection. In further embodiments, a removable cover (not illustrated) can be disposed over the upper hose assembly 142a to protect the upper hose assembly 142a from damage.

Figure 12:
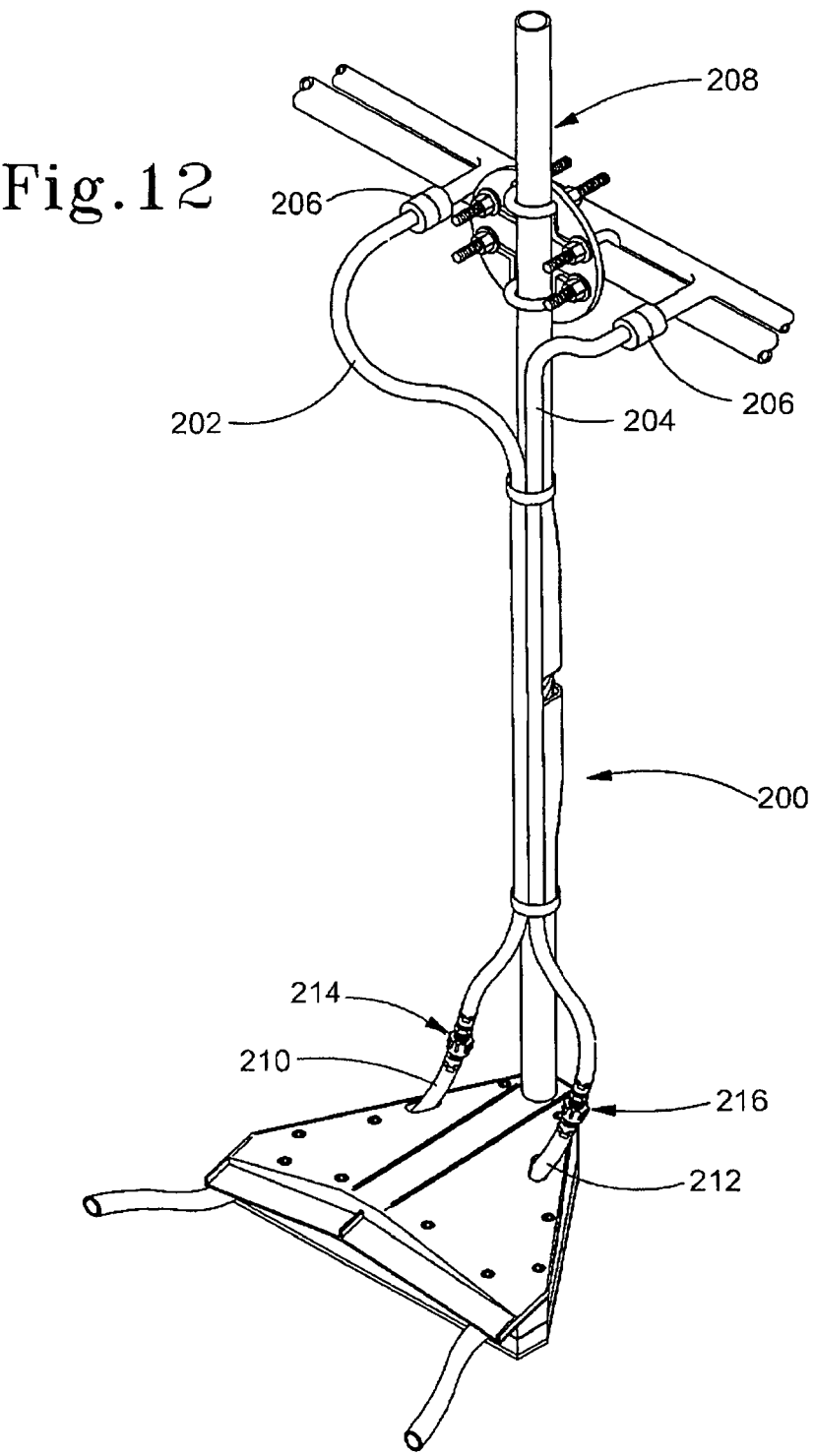
FIG. 12 is a perspective view of an alternative configuration for an illustrative liquid placement apparatus in accordance with embodiments of the invention.

Turning briefly to FIG. 12, an alternative embodiment of an upper hose assembly 200 is depicted. As shown in FIG. 12, the upper hose assembly 200 includes two hoses 202 and 204, each of which is coupled to an n-orifice outlet 206. This configuration can be useful, for example, where an operator wishes to use fewer liquid placement apparatuses 18 (see FIG. 1). As illustrated, the hoses 202 and 204 are disposed along the sides of the drop assembly 208 and are coupled to secondary hoses 210 and 212, respectively, using flow regulators 214 and 216, respectively. It should be understood that, in the embodiment illustrated in FIG. 12, a y-splitter is not needed, as the liquid product flow is delivered to the upper hose assembly 200 in two different channels 202 and 204 initially. In embodiments, a removable cover can be disposed over the upper hose assembly 200 to protect from damage caused by encountering debris in a crop row. Other configurations and implementations can be utilized, as well.

With reference to FIGS. 2A, 5, 6 and 9A and B, the lower hose assembly 142b includes a pair of secondary hoses 154 and 156, flow regulators 158a and 158b, (see FIG. 6) elbow assemblies 160a and 160b, and dribble hoses 162a and 162b. Each of the secondary hoses 154 and 156 includes a flow regulator 158a and 158b, respectively, disposed therein. The secondary hoses 154 and 156 are partially disposed within the base assembly 20, extending into the base assembly 20 through apertures 154c and 156c, respectively, which are defined within the upper panel 90 of the base assembly 20. Additionally, as shown in FIG. 5, within the base assembly 20, each of the secondary hoses 154 and 156 is coupled to an elbow assembly 160a and 160b, respectively. A dribble hose 162a and 162b is coupled to each elbow assembly 160a and 160b, respectively. In operation, the liquid product travels through the primary hose 142, through the y-splitter 152 into the secondary hoses 154 and 156, through the flow regulators 158a and 158b, into the elbow assemblies 160a and 160b and is ejected through the dribble hoses 162a and 162b.

Turning to FIGS. 9A and 9B, an illustrative flow regulator 158b is depicted. As shown, the flow regulator 158b is disposed within a secondary hose 156, which, as can be seen in FIGS. 9A and 9B, actually includes two separate hose portions 156a and 156b that are coupled by the flow regulator 158b. It should be understood that the other secondary hose 154 is similarly constructed (see, e.g., FIG. 6), having two hose portions 154a and 154b that are coupled using the flow regulator 158a. Additionally, the components and configuration of the flow regulator 158a, disposed within the secondary hose 154, are substantially the same as the components and configuration of the flow regulator 158b, described herein.

As shown in FIGS. 9A and 9B, the flow regulator 158b includes a flat orifice 164 enclosed inside of a plastic barbed insert 160 and cap 162. According to embodiments of the invention, the orifice 164 is strategically placed approximately 12.5" from the elbow apparatus 160b to ensure equal positive flow of liquid product. The size of the orifice 164 can be determined by desired flow rate, specific gravity of product, and volume of product to be delivered to a crop row. The flow regulator 158b is coupled to the hose portions 156a and 156b using clamps 166 and 168, respectively. According to embodiments of the invention, other types of flow regulators can be used.

Turning now to FIGS. 10 and 11, and with continued reference to FIG. 5, the elbow assembly 160b includes a first portion 170 that is coupled, at a first end 172 thereof, to the secondary hose 158b and, at a second end 174 thereof to a mounting plate 176 having an opening (not shown) defined therein. The elbow assembly 160b further includes a second portion 178 that is coupled, at a first end 180 thereof, to the mounting plate 176, and, at a second end 182 thereof, to the dribble hose 162b. In embodiments, the components 170, 176, and 178 of the elbow assembly 160b can be stainless steel and can be welded together. A stainless steel construction minimizes the possibility of rust or other corrosive damage to the base assembly 20 from the liquid product. In other embodiments, other types of material and/or mechanisms for coupling the components 170, 176, and 178 can be employed. In embodiments, the second portion 178 of the elbow assembly 160b has a 3-5 degree turn away from the outside of the base assembly 20. According to some embodiments of the invention, the second portion 178 of the elbow assembly 160b also has a 22-degree bend downward to assist the flow of liquid product downward toward the ground to reduce splattering.

As shown in FIG. 11, the mounting plate 176 is configured to be disposed adjacent to a blocking surface 184 disposed within the lower portion 72 of the base assembly 20. The mounting plate 176, and its position adjacent the blocking surface 184, holds the elbow assembly 106b in place within the lower portion 72 of the base assembly 20. The second hose portion 162b of the secondary hose 162, and the first portion 170 and the second portion 178 of the elbow assembly 160b are configured to be disposed within the throughway 140 defined within the base assembly 20. It should be understood that a substantially similar configuration is repeated on the other side of the base assembly with respect to the secondary hose 154 and the corresponding elbow assembly 160a.

Returning briefly to FIG. 5, the dribble hoses 162a and 162b are attached to the elbow assemblies 160a and 160b using clamps 185a and 185b, respectively, and can include, for example, hoses with single-strand wire enclosures of lengths varying from about 18" to about 36," depending on the application. According to embodiments, the dribble hoses 162a and 162b are configured to drag on the ground as the carrier 12 (see FIG. 1) moves through a field of row crops. In other embodiments, the dribble hoses 162a and 162b are configured to terminate some predetermined distance above the ground. Additionally, in various embodiments, the dribble hoses 162a and 162b are attached to the elbow assemblies 160a and 160b, respectively, using an adjustable clamp, which facilitates relatively easy assembly and replacement.

Figure 13A:
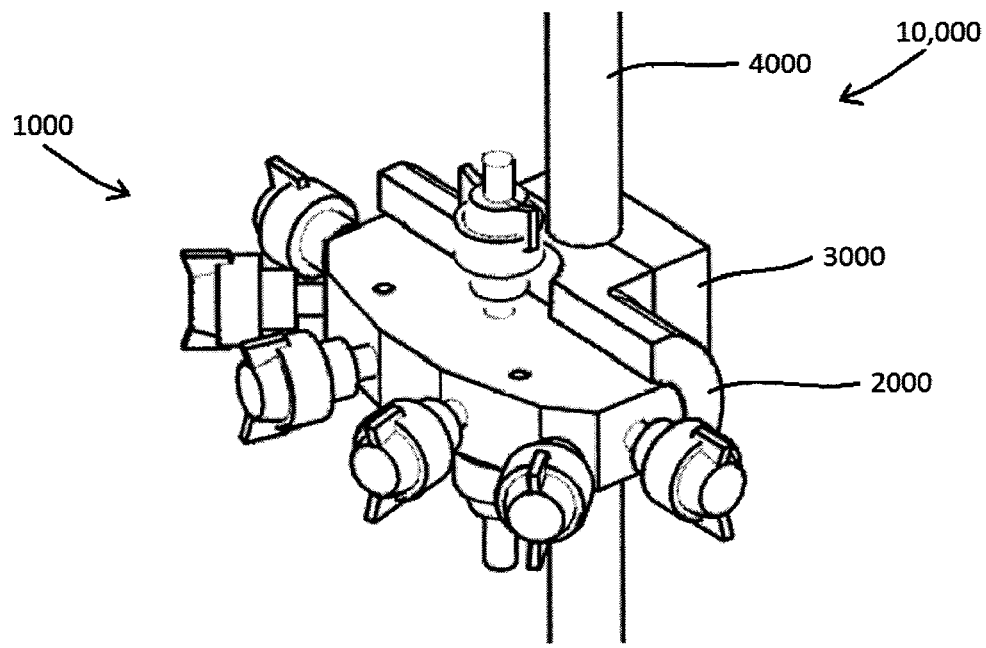
FIGS. 13A and 13B are views of a spray assembly in accordance with example embodiments.

FIG. 13A is a perspective view of a spray assembly 10000 in accordance with example embodiments. In example embodiments, the spray assembly 10000 may be configured to spray a liquid product, for example, a liquid fertilizer, a liquid herbicide, or a liquid insecticide. In example embodiments, the spray assembly 10000 may be attached to a structure 4000. The structure 4000, as shown in at least FIG. 13A, may resemble a vertically oriented tube. In this example, the spray assembly 10000 may be configured to move along the structure 4000. Thus, in example embodiments, a height of the spray assembly 10000 may be changed as it moves along the structure 4000. In example embodiments, the structure 4000 may be, for example, the upper portion 32 or the lower portion 34 of the drop assembly 22.

In example embodiments the spray assembly 10000 may be configured to spray the liquid product in an upwards direction or a downwards direction, or any direction therebetween (for example, a horizontal direction). When applied to the farming industry, this may allow an operator to spray various portions of a plant from above or below. For example, if it is desired to spray a bottom surface of a plant (for example, an underside of a leaf) with the liquid product, the spray assembly 10000 may be placed below the leaf and may be configured so the liquid product is sprayed upwards and onto the bottom surface of the plant. In the alternative, if it is desired to spray an upper surface of a plant (for example, a top of a leaf) the spray assembly 10000 may be arranged higher than the leaf and reconfigured to spray the liquid downwards to apply the liquid product to the upper surface of the plant.

In example embodiments, the spray assembly 10000 may be configured to spray the liquid product in a single direction or in several directions. Thus, in example embodiments the spray assembly 10000 may be configured to spray the liquid product in different spray patterns. For example, in the event the spray assembly 10000 is moved through a field to facilitate a spraying of crops, the spray assembly 10000 may be configured to spray the liquid product in a direction of travel of the spray assembly 10000, opposite the direction of travel, perpendicular to the direction of travel, and/or somewhere between these extremes. For example, in example embodiments, the spray assembly 10000 may be mounted on the structure 4000 such that it sprays in a direction which is away from a direction of travel of the spray assembly 10000. On the other hand, the spray assembly 10000 may be mounted on the structure 4000 such that it sprays a liquid product in a direction which is in a direction of travel of the spray assembly 10000. On the other hand, the spray assembly 10000 may be configured with additional ports and attachments so that the spray assembly 10000 may simultaneously spray a liquid product in the direction of travel and away from the direction of travel of the spray assembly 10000.

In view of the above, the spray assembly 10000 may allow for precise control of applying a liquid product to a plant. The following is a description of a nonlimiting example of the invention. It is understood that the description is meant for purposes of illustration only and is not meant to limit the invention as the invention covers various modifications of the disclosed embodiments.

Figure 13B:
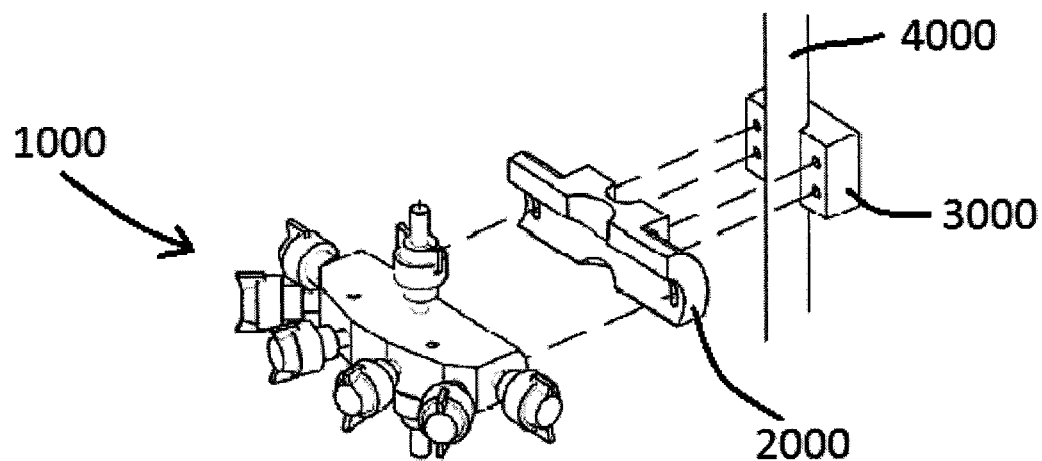

As shown in FIGS. 13A and 13B, the spray assembly 10000 of example embodiments may include a manifold assembly 1000, a tilt base 2000, and a clamp 3000. In example embodiments, the tilt base 2000 and the clamp 3000 may be configured to sandwich the structure 4000. In example embodiments, the structure 4000 may resemble a bar having a circular cross section, however, this is not meant to limit the invention. For example, in example embodiments, the structure 4000 may have another cross section such as (but not limited to) a square cross section, a rectangular cross section, a triangular cross section, or an octagonal cross section.

Figure 14A:
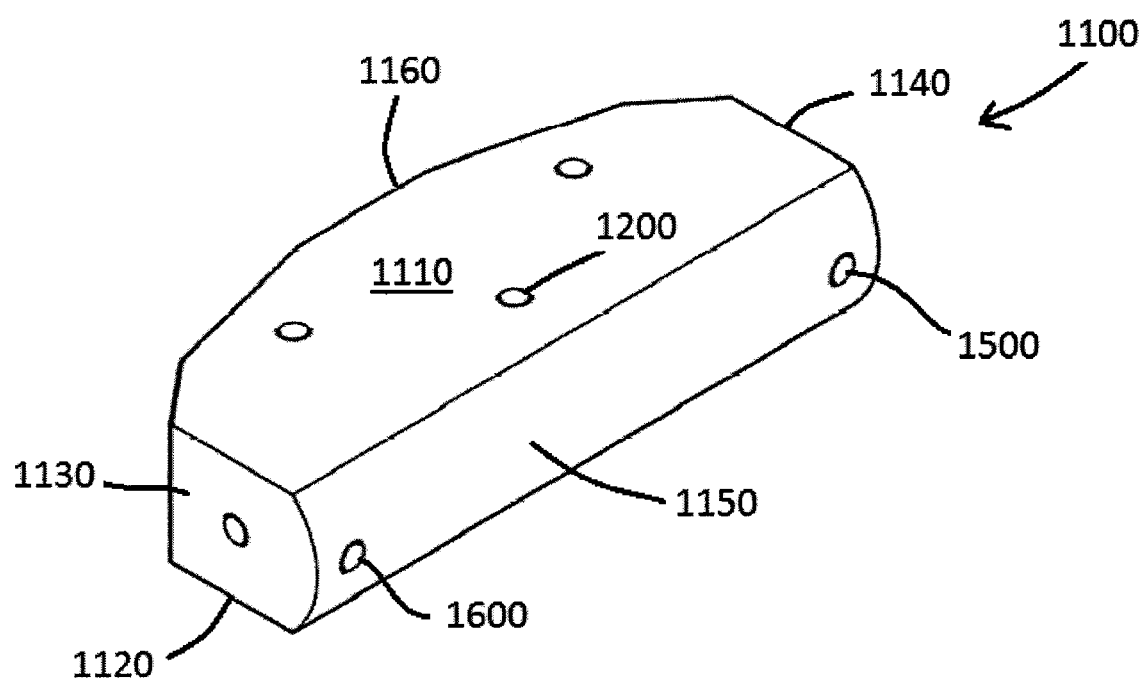
FIGS. 14A-14I are views of a manifold body in accordance with example embodiments.
Figure 14B:
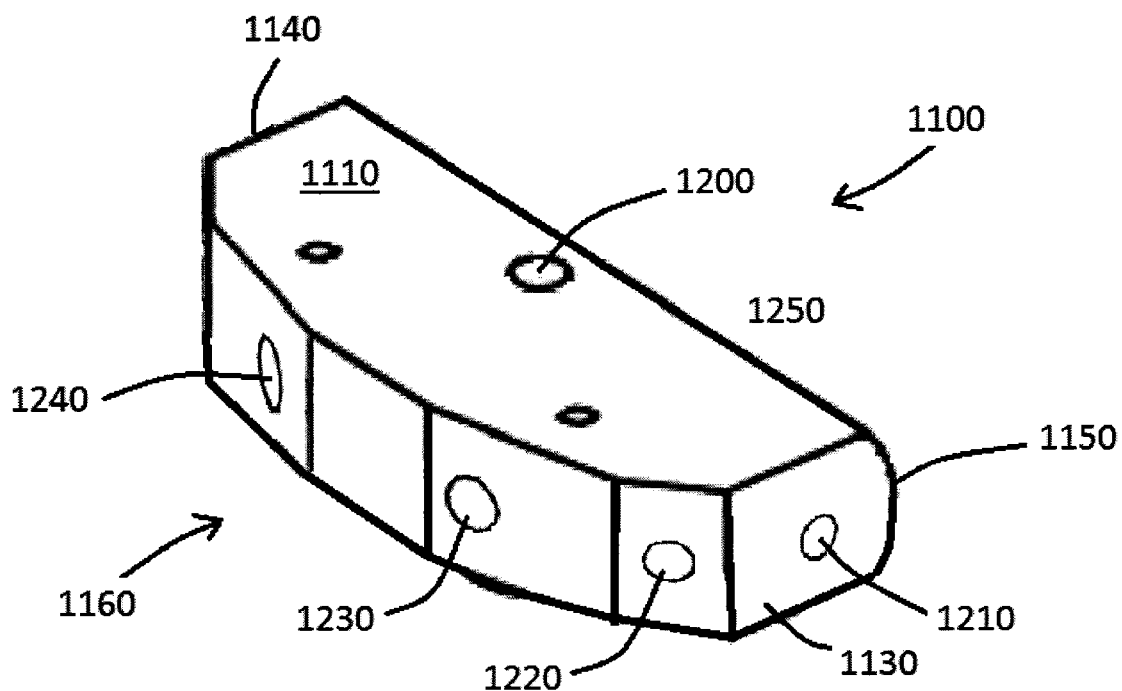
Figure 14C:
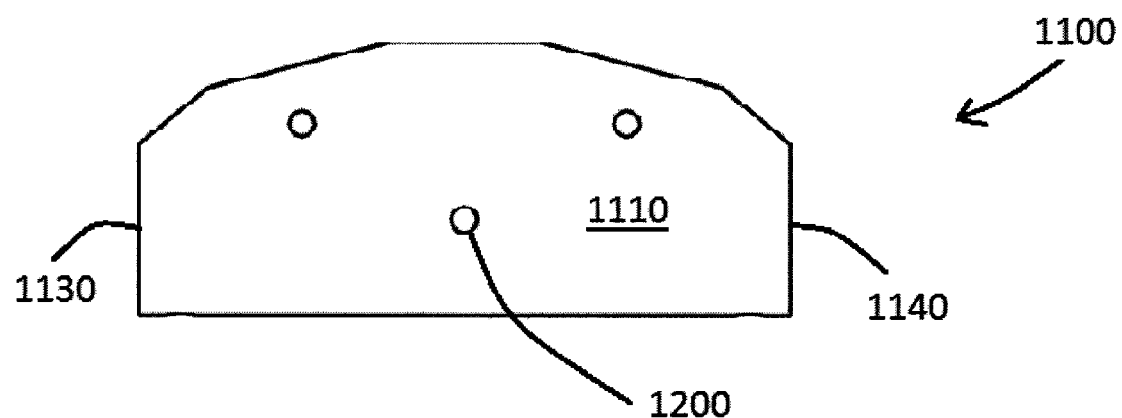
Figure 14D:
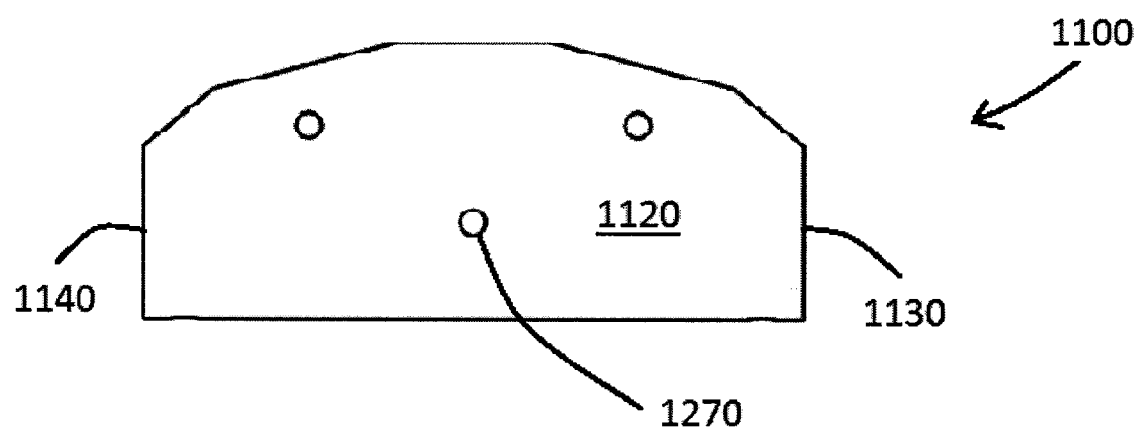
Figure 14E:
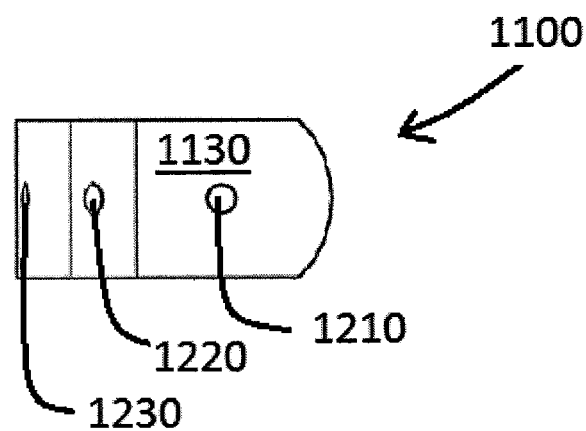
Figure 14F:
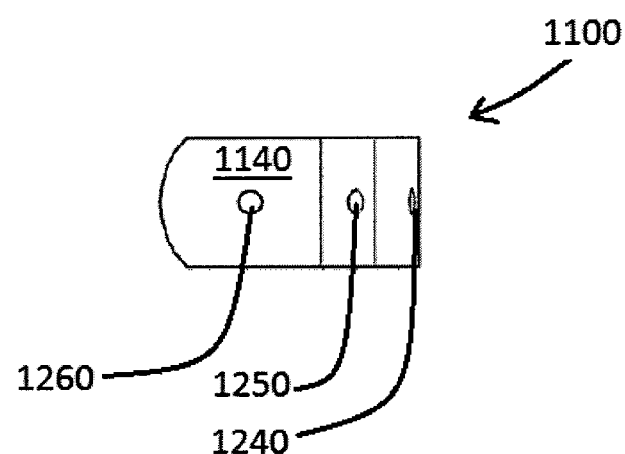
Figure 14G:
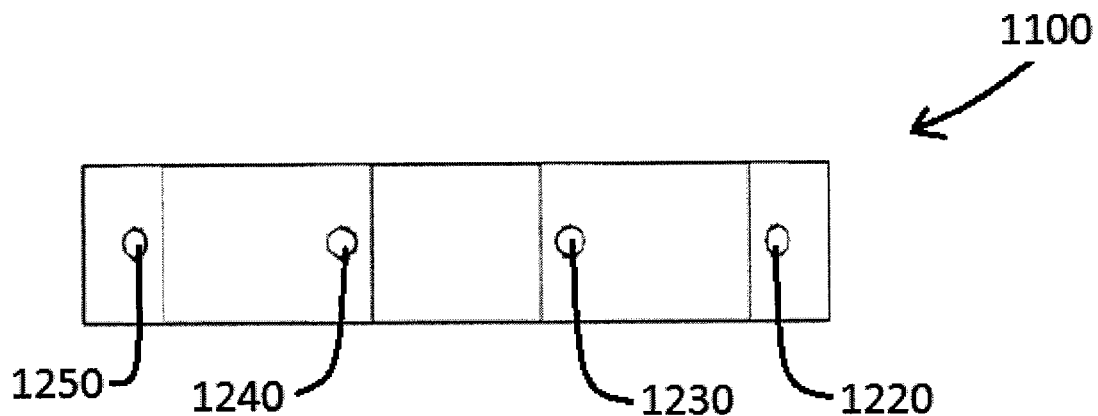
Figure 14H:
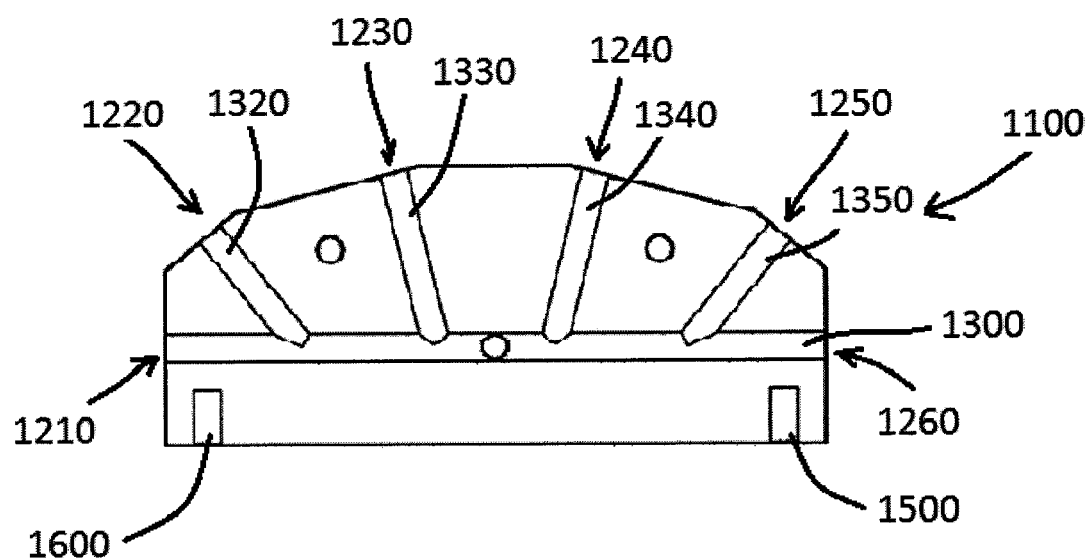
Figure 14I:
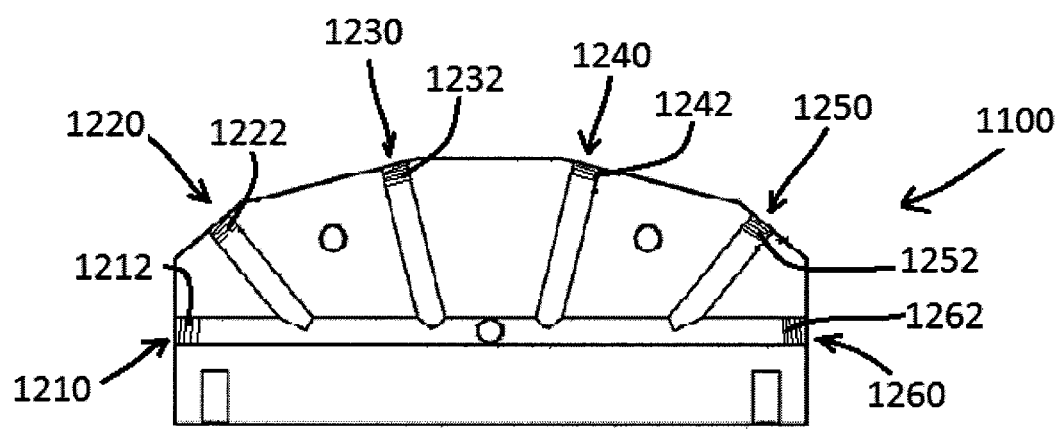

FIGS. 14A-14H are various views of a manifold body 1100 in accordance with example embodiments. For example, FIGS. 14A and 14B are perspective views of the manifold body 1100, FIG. 14C is a top view of the manifold body 1100, FIG. 14D is a bottom view of the manifold body 1100, FIG. 14E is a left side view of the manifold body 1100, FIG. 14F is a right side view of the manifold body 1100, FIG. 14G is a front view of the manifold body 1100, and FIGS. 14H and 14I are cross-section views of the manifold body 1100.

In example embodiments, the manifold body 1100 may resemble a body with various passages formed therein. For example the manifold body 1100 may be formed from a metal such as, but not limited to, aluminum, iron, brass, or steel, or a nonmetal, such as, but not limited to, plastic. In example embodiments, the manifold body 1100 may be made by various processes. For example, in one nonlimiting embodiment, the manifold body 1100 may be made from a casting process wherein the passages are created during the casting process. On the other hand, in another nonlimiting embodiment, the manifold body 1100 may be made from a casting process and the passages may be added later via a machining process. However, example embodiments are not limited by the manner in which the manifold body 1100 is made as there are other methods available such as, but not limited to, forging or printing.

Referring to FIGS. 14A-14D, the manifold body 1100 may be defined by several surfaces. For example, in example embodiments the body 1100 may have a top surface 1110, a bottom surface 1120, a left side surface 1130, a right side surface 1140, a back surface 1150, and a front surface 1160. In example embodiments, the back surface 1150 may be configured to engage a receiving surface 2300 of the tilt base 2000. For example, in example embodiments, the back surface 1150 may resemble a convex surface having radius of curvature and the receiving surface 2300 may resemble a concave surface having a radius of curvature similar to (if not identical to) the radius of curvature of the back surface 1150. However, the above description is not meant to limit the invention. For example, in example embodiments, rather than the back surface 1150 of the manifold body 1100 having a convex surface and the receiving surface 2300 of the tilt base 2000 having a concave surface, the back surface 1150 may actually have a concave surface and the receiving surface 2300 may have the convex surface. Regardless, the back surface 1150 and the receiving surface 2300 may be configured such that the manifold body 1100 may rotate with respect to the tilt base 2000.

In example embodiments the back surface 1150 may include receiving holes 1500 and 1600. These receiving holes 1500 and 1600 may be configured to receive a member, for example, a threaded member, which may help secure the manifold body 1100 to the tilt base 2000. In example embodiments, the receiving holes 1500 and 1600 may be threaded holes, however, this is not a critical feature of example embodiments. For example, rather than providing receiving holes 1500 and 1600 in the back surface 1150 of the manifold body 1100, the back surface 1150 could include threaded pegs configured to insert into slotted holes 2510 and 2610 of the tilt base 2000 and a nut could be used to secure the manifold body 1100 to the tilt base 2000.

Referring to FIGS. 14A-14H it is apparent there are several openings in the manifold body 1100. For example, the top surface 1110 may have a top opening 1200, the left side surface 1130 may have a first opening 1210, the front surface 1160 (which may be a discontinuous surface) may have a second opening 1220, a third opening 1230, a fourth opening 1240, and a fifth opening 1250, the right hand surface 1140 may have a sixth opening 1260, and the bottom surface 1120 may have a bottom opening 1270. In example embodiments, each of the openings 1200, 1210, 1220, 1230, 1240, 1250, 1260, and 1270 may be connected to one another via various passages. For example, as shown in FIG. 14H (which is a cross-section of the manifold body 1100), the manifold body 1100 may include a primary passage 1300 connected to each of the top opening 1200, the first opening 1210, the sixth opening 1260, and the bottom opening 1270. In this particular nonlimiting example, the primary passage 1300 may also be connected to second, third, fourth, and fifth openings 1220, 1230, 1240, and 1250 via secondary passages 1320, 1330, 1340, and 1350 as shown in the figures. As such, a liquid product flowing into the top opening 1200 may flow, via the primary passage 1300, to the bottom opening of the bottom surface 1120 and/or to the first and sixth openings 1210 and 1260. The liquid product may also flow to any one of (or all of) second, third, fourth, and fifth openings 1220, 1230, 1240, and 1250 via the secondary passages 1320, 1330, 1340, and 1350.

In example embodiments, surfaces associated with first, second, third, fourth, fifth, and sixth openings 1210, 1220, 1230, 1240, 1250, and 1260 (as well as the top opening 1200 and the bottom opening 1270) may be threaded surfaces which may allow a plurality of attachments to attach thereto. For example, FIG. 14I illustrates a cross section of the manifold body 1100 with the threads 1212, 1222, 1232, 1242, 1252, and 1262 associated with the first, second, third, fourth, fifth, and sixth openings 1210, 1220, 1230, 1240, 1250, and 1260 clearly identified.

Figure 15A:
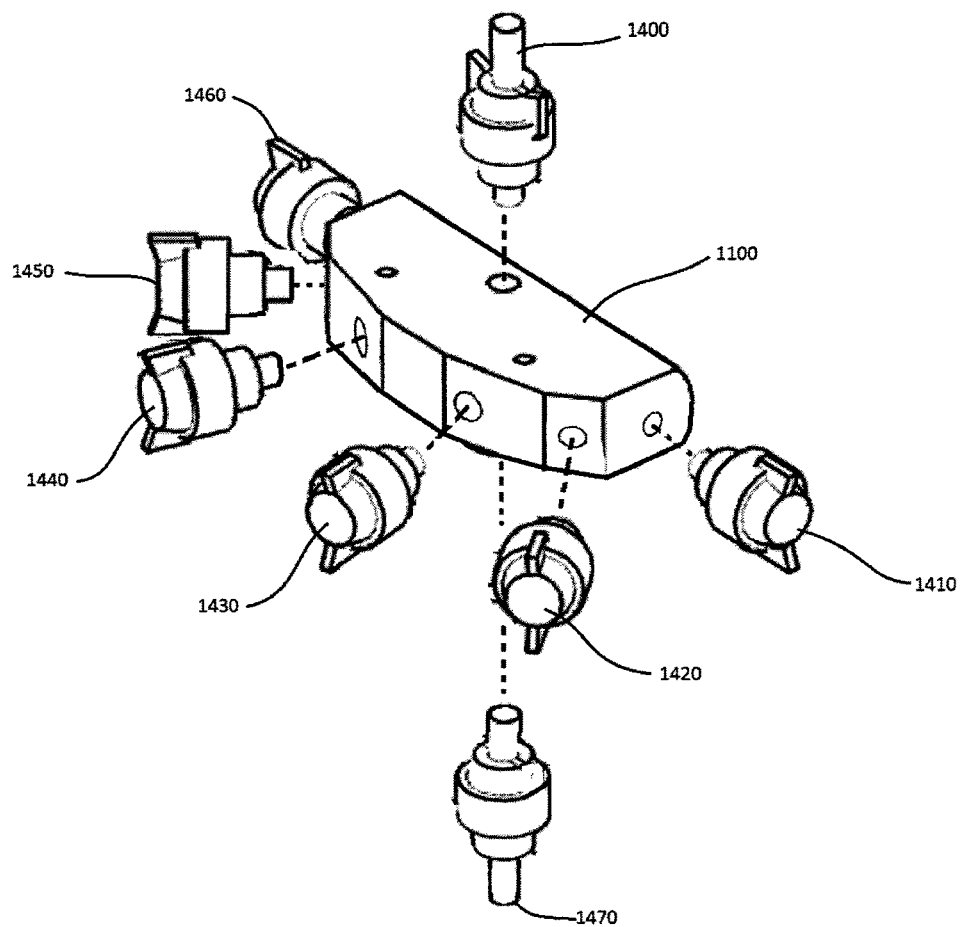
FIGS. 15A-15B are views illustrating attachments attaching to the manifold body in accordance with example embodiments.
Figure 15B:
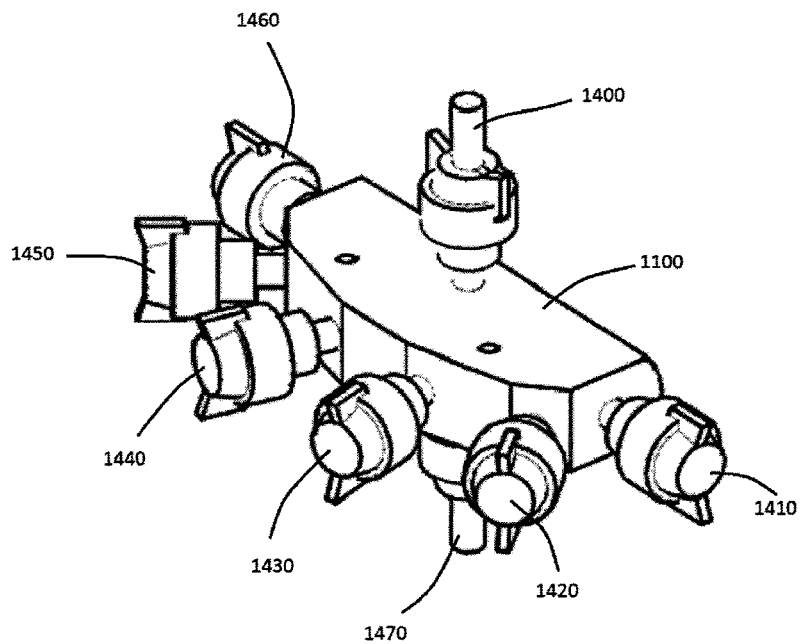

FIG. 15A illustrates the manifold body 1100 along with a plurality of attachments 1410, 1420, 1430, 1440, 1450 and 1460 which are configured to insert into the first, second, third, fourth, fifth, and sixth openings 1210, 1220, 1230, 1240, 1250, and 1260. In example embodiments, ends of the plurality of attachments 1410, 1420, 1430, 1440, 1450 and 1460 may have threads and therefore may be configured to screw in the plurality of openings 1210, 1220, 1230, 1240, 1250, and 1260. In example embodiments the plurality of attachments 1410, 1420, 1430, 1440, 1450 and 1460 may be, but are not required to be, nozzles or couplers which may facilitate coupling of another member to the manifold body 1100. In addition, FIGS. 15A and 15B illustrate a top attachment 1400 and a bottom attachment 1470 which may be configured to attach to the manifold body 1100 via the top opening 1200 and the bottom opening (not illustrated). In example embodiments, the top attachment 1400 may be configured to attach to the manifold body and may be configured to attach to a liquid carrying member, for example, a tube or a hose. Thus, in example embodiments, a tube or a hose may attach to the top attachment 1400 to deliver a liquid product to the manifold body 1100. Similarly, the bottom attachment 1470 may also attach to the manifold body 1100 and may be configured to attach to another liquid carrying member, for example, a hose of a tube. This may allow for a liquid product to flow into the manifold body 1100 via the top opening 1200 to exit the manifold body 1100 via the bottom opening 1270.

In example embodiments, the plurality of attachments 1410, 1420, 1430, 1440, 1450, and 1460 may be a plurality of nozzles that may be configured to spray upwards, downwards, horizontal, sideways, or a combination thereof. For example, in example embodiments, an operator may configure the first and sixth attachments 1410 and 1460 to point upwards and configure the second, third, fourth, and fifth nozzles 1420, 1430, 1440, and 1450 to spray downwards. In the alternative, an operator may alternate which of the attachments 1410, 1420, 1430, 1440, and 1450 and 1460 point upwards. For example, an operator may configure the first, third, and fifth attachments 1410, 1430, and 1450 to spray downwards and may configure the second, fourth, and sixth attachments 1420, 1440, and 1460 to spray upwards. In addition, the plurality of attachments 1410, 1420, 1430, 1440, 1450, and 1460 may be configured with actuators, for example motors, which may configure the attachments to spray in a certain direction. In this latter embodiment, a user may operate a controller to control the motors to manipulate the plurality of attachments 1410, 1420, 1430, 1440, 1450, and 1460 to achieve a desired spray pattern. Thus, in example embodiments, an operator may either manually adjust the plurality of attachments 1410, 1420, 1430, 1440, 1450, and 1460 or use a controller to adjust the plurality of attachments 1410, 1420, 1430, 1440, 1450, and 1460 to obtain a desired spray pattern.

Figure 16A:
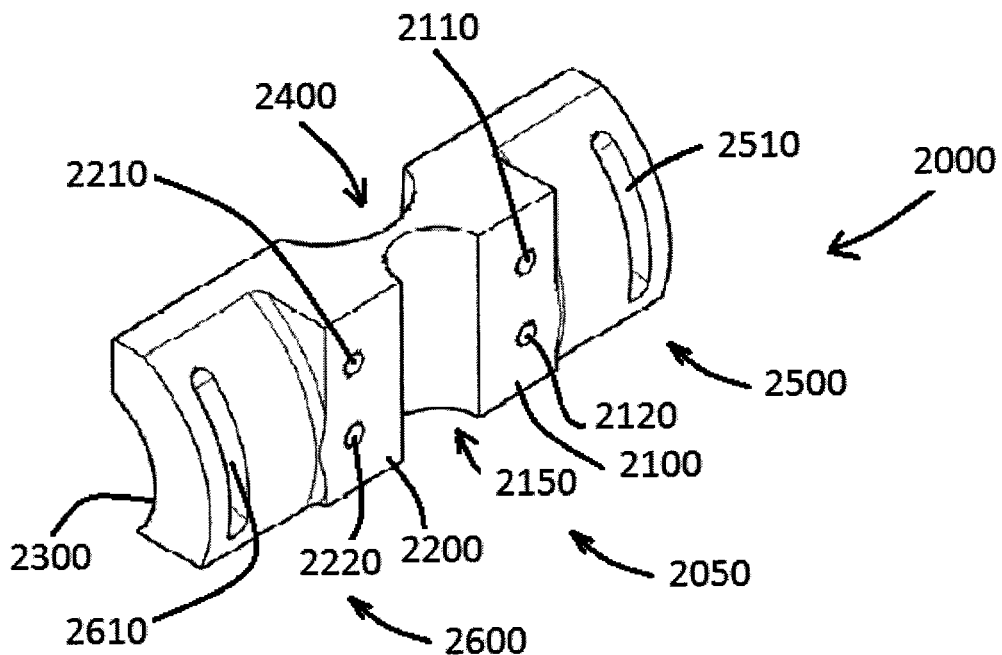
FIGS. 16A-16C are views of a tilt base in accordance with example embodiments.
Figure 16B:
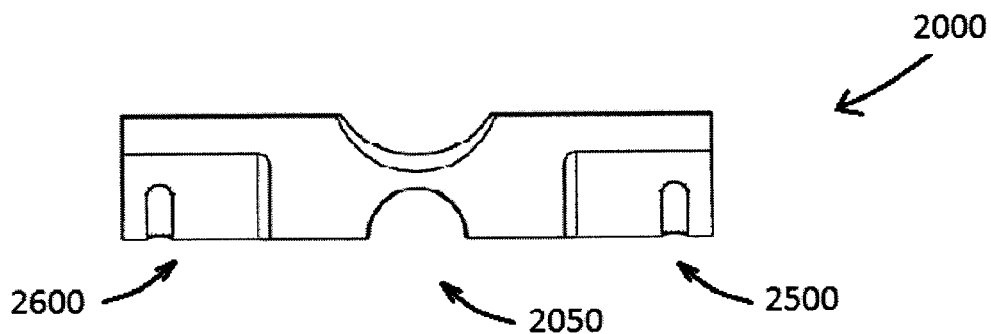
Figure 16C:
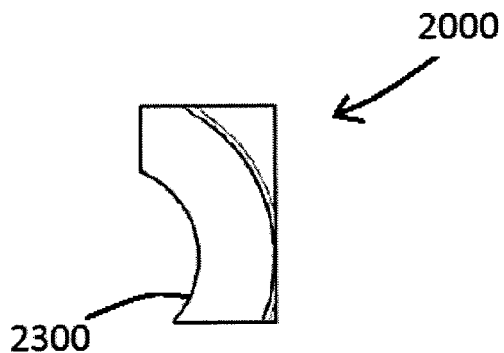
Figure 17A:
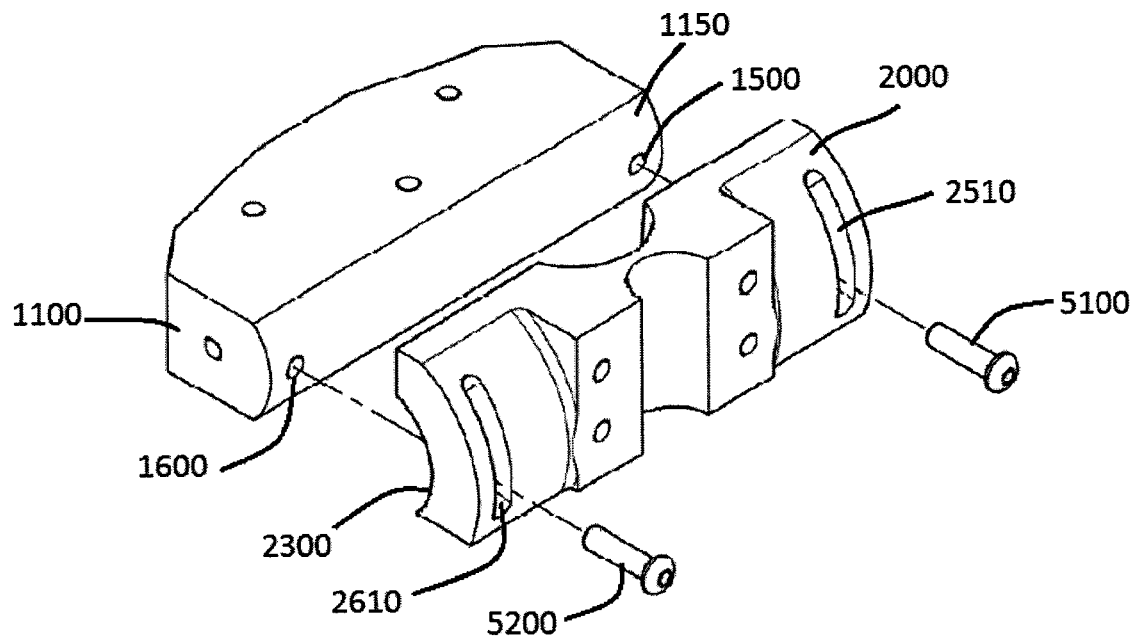
FIGS. 17A-17B illustrate the manifold body and the tilt base in accordance with example embodiments.
Figure 17B:
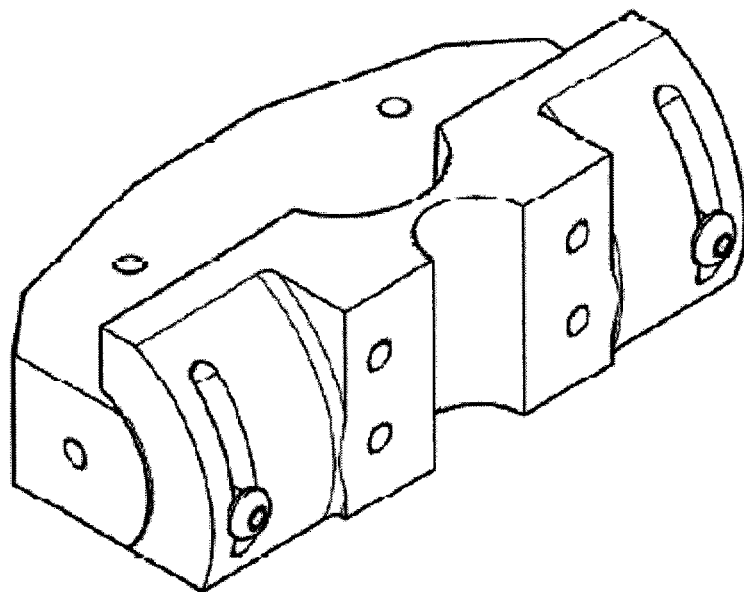

FIGS. 16A-16C illustrate an example of a tilt base 2000 in accordance with example embodiments. As shown in FIGS. 16A-16C the tilt base 2000 may include a first wing 2500 and a second wing 2600 separated by an attachment portion 2050. In example embodiments, each of the first wing 2500 and the second wing 2600 may include a receiving surface 2300 into which the back surface 1150 of the manifold body 1100 may nest. Also, in example embodiments, the first wing 2500 may include a first slotted opening 2510 and the second wing may include a second slotted opening 2610. These openings may facilitate an adjustable connection between the manifold body 1100 and the tilt base 2000. For example, as shown in FIG. 17A, the manifold body 1100 may be arranged so that its back surface 1150 may face the receiving surface 2300 of the tilt base 2000. As shown in FIGS. 17A and 17B, the receiving holes 1500 and 1600 (which may include threaded surfaces) of the manifold body 1100 may be aligned with the first and second slotted openings 2510 and 2610. Fasteners 5100 and 5200, for example, screws, may be used to attach the manifold body 1100 to the tilt base 2000 as shown in FIG. 17B. If the fasteners 5100 and 5200 are sufficiently tightened, friction between the manifold body 1100 and the tilt base 2000 may prevent the manifold body 1100 from moving with respect to the tilt base 2000. In the event a user wishes to reposition the manifold body 1100 with respect to the tilt base 2000, the user could loosen the fasteners 5100 and 5200, reposition the manifold body 1100, and then retighten the fasteners 5100 and 5200 to secure the manifold body 1100 to the tilt base 2000.

It should be understood that the description thus far is for the sake of illustration only and various modifications are considered to fall within the scope of the invention. For example, FIGS. 17A and 17B illustrate one manner in which the manifold body 1100 is mated with the tilt base 2000. This is not meant to limit the invention. For example, in example embodiments, the manifold body 1100 could be flipped upside down and still be mated with the tilt base 2000.

Referring back to FIG. 16A, the attachment portion 2050 may include a first surface 2100 and a second surface 2200. The first and second surfaces 2100 and 2200 may include apertures for connecting the tilt base 2000 to the clamp 3000. For example, in example embodiments, the first surface 2100 may include a first aperture 2110 and a second aperture 2120 which may be threaded holes configured to receive a threaded member, for example, a screw. Similarly, the second surface 2200 may also include a first aperture 2210 and a second aperture 2220 which may be threaded holes configured to receive a threaded member, for example, a screw. Although each of the first and second surfaces 2100 and 2200 are illustrated as including a pair of holes, this is not intended to limit the invention. For example, in example embodiments, each of the first and second surfaces 2100 and 2200 may include only a single hole or more than two holes.

Referring again to FIG. 16A it is observed that the tilt base 2000 may be further modified to accommodate various features of spray assembly 10000 as well as the structure 4000. For example, in example embodiments the tilt base 2000 may further include a recess 2400 which may be configured to accommodate the top attachment 1400 thus allowing the manifold assembly 1000 with the top attachment 1400 attached thereto to rotate upwards. As another example, the tilt base 2000 may include another recess 2150 in which the structure 4000 may be partially inserted. For example, in the event the structure 4000 is a cylindrical bar having a first diameter, the recess 2150 may form a cylindrical recess having a diameter substantially the same as the first diameter. As another example, if the structure 4000 was a bar with a square cross section, the recess 2150 may resemble a recess having flat sides with a width substantially the same as a width of the square bar to accommodate the structure 4000. As yet another example, the tilt base 2000 may further include another recess at a bottom thereof (similar to recess 2400) which may be configured to accommodate the bottom attachment 1470 thus allowing the manifold assembly 1000 with the bottom attachment 1470 attached thereto to rotate downwards.

Figure 18A:
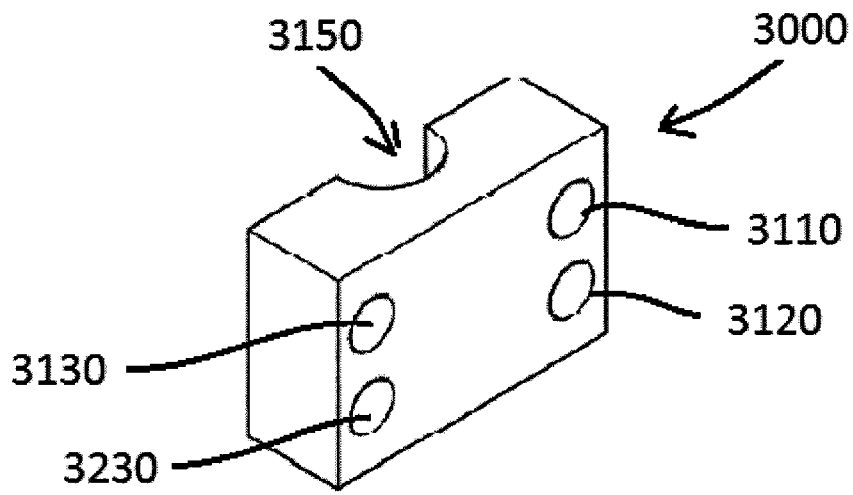
FIGS. 18A-18C are views of a clamp in accordance with example embodiments.
Figure 18B:
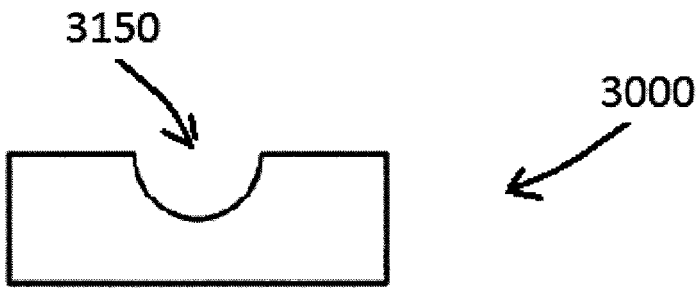
Figure 18C:
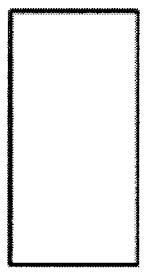

FIGS. 18A-18C are views of the clamp 3000 in accordance with example embodiments. As shown in FIGS. 18A-18C the example clamp 3000 may resemble a rectangular bar having a recess 3150 formed therein. The recess 3150 may accommodate the structure 4000. For example, in the event the structure 4000 is a cylindrical bar having a first diameter, the recess 3150 may form a cylindrical recess having a diameter substantially the same as the first diameter. As another example, if the structure 4000 is a bar with a square cross section, the recess 3150 may resemble a recess having flat sides with a width substantially the same as a width of the square bar to accommodate the structure 4000.

In example embodiments, the clamp 3000 may further include a plurality of holes through which connectors may pass to connect the clamp 3000 to the tilt base 2000. For example, in example embodiments, the clamp 3000 may include a first hole 3110, a second hole 3120, a third hole 3210, and a fourth hole 3230 which have the same spacing as the apertures 2110, 2120, 2210, and 2220 of the tilt base 2000. Thus, in example embodiments, fasteners (for example, screws) may be used to attach the clamp 3000 to the tilt base 2000.

In example embodiments when the tilt base 2000 and the clamp 3000 are connected together, the tilt base 2000 and the clamp 3000 may sandwich the structure 4000. In example embodiments, the tilt base 2000 and the clamp 3000 may be fastened together so that the surfaces of their recesses 2150 and 3150 contact or press against an outer surface of the structure 4000. In example embodiments friction between the structure 4000 and the surfaces of the recesses 2150 and 3150 may prevent the tilt base 2000 and clamp 3000 from moving along the structure 4000. In example embodiments, however, the tilt base 2000 and the clamp 3000 may be moved along the structure 4000 by loosening the fasteners fastening them together, moving the tilt base 2000 and the clamp 3000 to a desired location, and the retightening the fasteners.

Figure 19A:
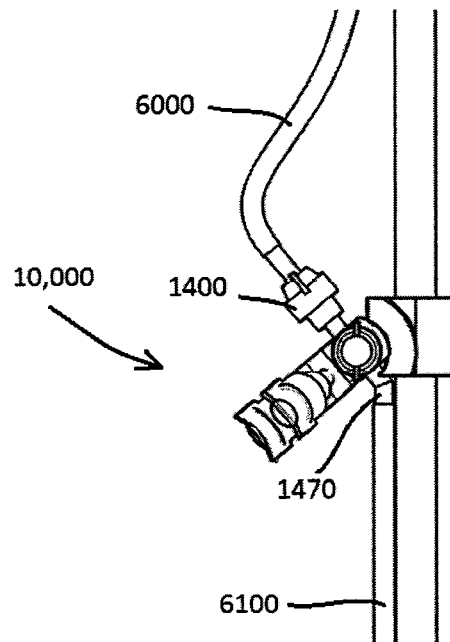
FIGS. 19A-19B are views of a spray assembly in different configurations in accordance with example embodiments.
Figure 19B:
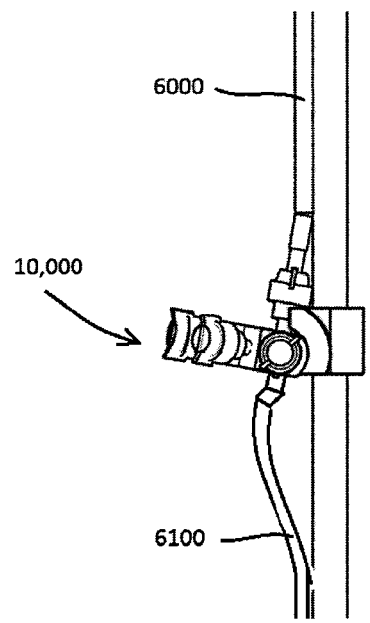

FIGS. 19A and 19B illustrate the spray assembly 10000 attached to the structure 4000. FIG. 19A illustrates the spray assembly 10000 arranged in a downwards position while FIG. 19B illustrates the spray assembly 10000 in an upward configuration. As shown in FIGS. 19A and 19B, a first hose 6000 may be connected to the top attachment 1400 and a second hose 6100 may be connected to the bottom attachment 1470. In example embodiments, the first hose 6000 may be associated with the previously described hose assembly 26. Thus, in example embodiments, the spray assembly 10000 may receive a liquid product from the tank 15. In the configuration of FIG. 19A a liquid product may be sprayed in a downward direction through one or more of the attachments 1410, 1420, 1430, 1440, 1450 and 1460. Conversely, if the spray assembly 10000 were oriented as illustrated in FIG. 19B, the liquid product may be sprayed in an upward direction. Thus, in example embodiments, the spray assembly 10000 of example embodiments may be manipulated to spray in either an upward direction or a downward direction or in various directions in between, for example, in a horizontal direction.

Figure 20:
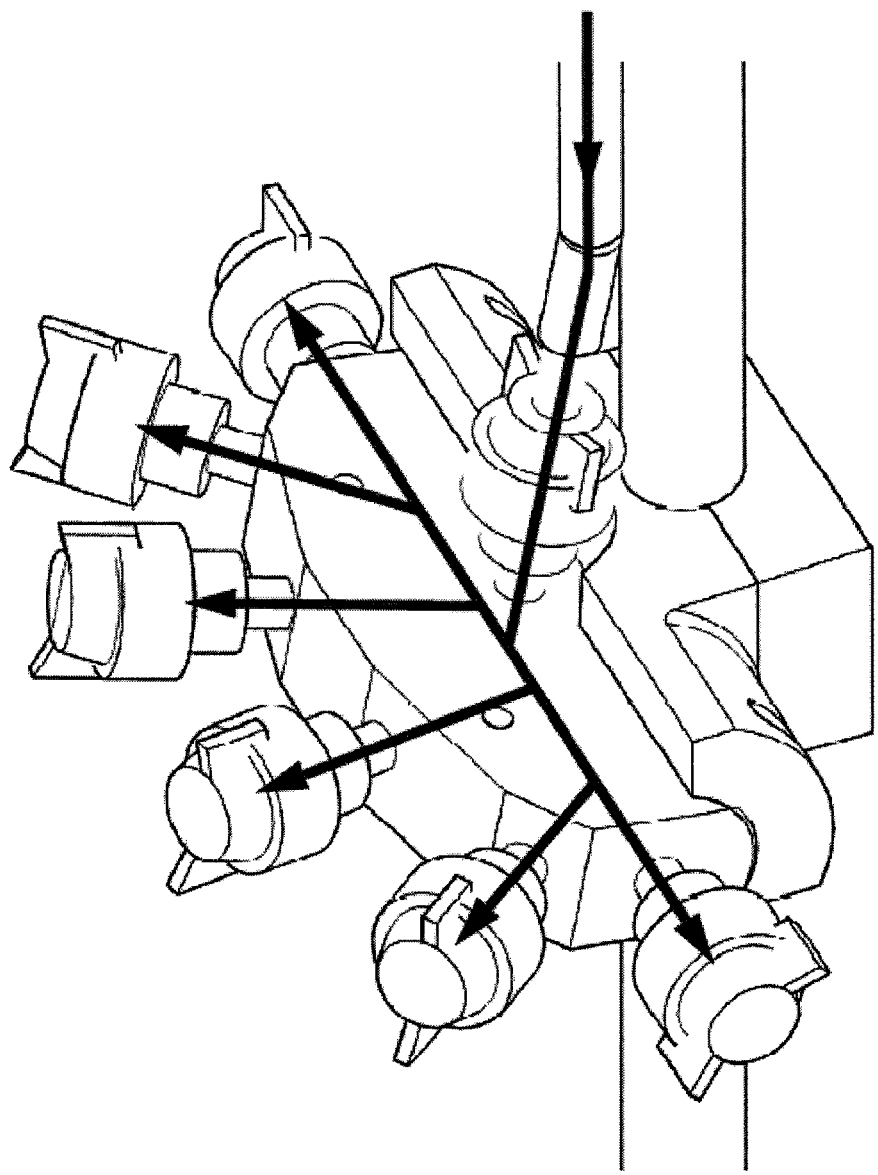
FIG. 20 is a view showing a liquid flowing through the manifold body in accordance with example embodiments.
Figure 21A:
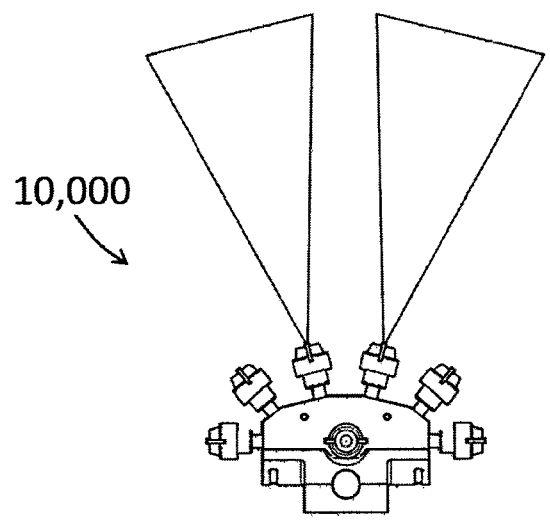
FIGS. 21A-21C are views of spray patterns in accordance with example embodiments.
Figure 21B:
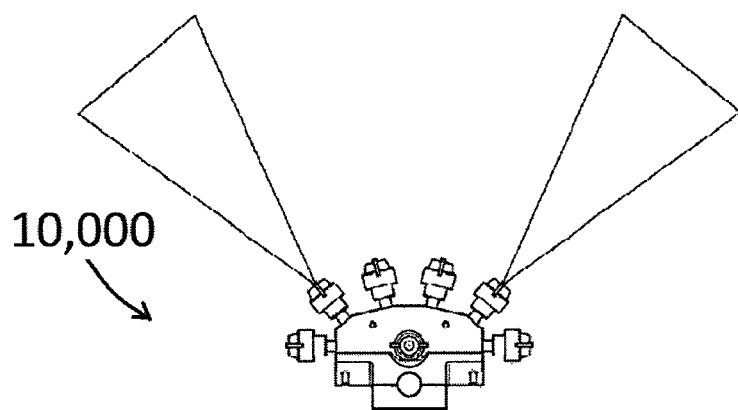
Figure 21C:
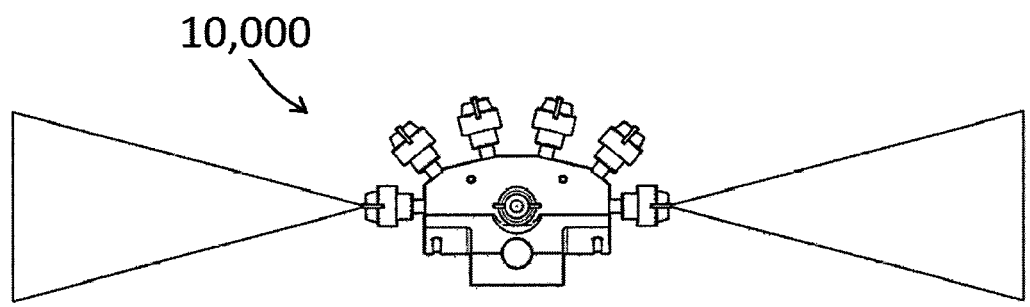

The liquid product flowing through the manifold body 1100 may flow through any one of the secondary passages 1320, 1330, 1340, and 1350 and/or the primary passage 1300. FIG. 20, for example, illustrates a flow pattern of liquid entering the manifold body 1100 via the top opening 1200 and flowing through each of the secondary passages 1320, 1330, 1340, and 1350 and also through the primary passage 1300. This allows the liquid to flow through each of the attachments 1410, 1420, 1430, 1440, 1450, and 1460 for application to an environment, for example, to a field containing plants. This, however, is not meant to be a limiting feature of example embodiments. For example, as shown in FIGS. 21A-21C, different spray patterns may be obtained by plugging or blocking various attachments. For example, as shown in FIG. 21A the first, second fifth, and sixth attachments 1410, 1420, 1450, and 1460 may be plugged resulting a first spray pattern illustrated therein. As a second example, the first, third, fourth, and sixth attachments 1410, 1430, 1440, and 1460 may be plugged resulting a second spray pattern as illustrated in FIG. 21B. As a third example, the second, third, fourth, and fifth attachments 1420, 1430, 1440, and 1450 may be plugged resulting a third spray pattern as illustrated in FIG. 21C. As a fourth example, each of the attachments 1410, 1420, 1430, 1440, 1450, and 1460 may be plugged to prevent a liquid product from being sprayed from the attachments 1410, 1420, 1430, 1440, 1450, and 1460. In this latter embodiment, liquid product may be removed from the manifold body 1100 via the seventh opening and second hose 6100.

Figure 22A:
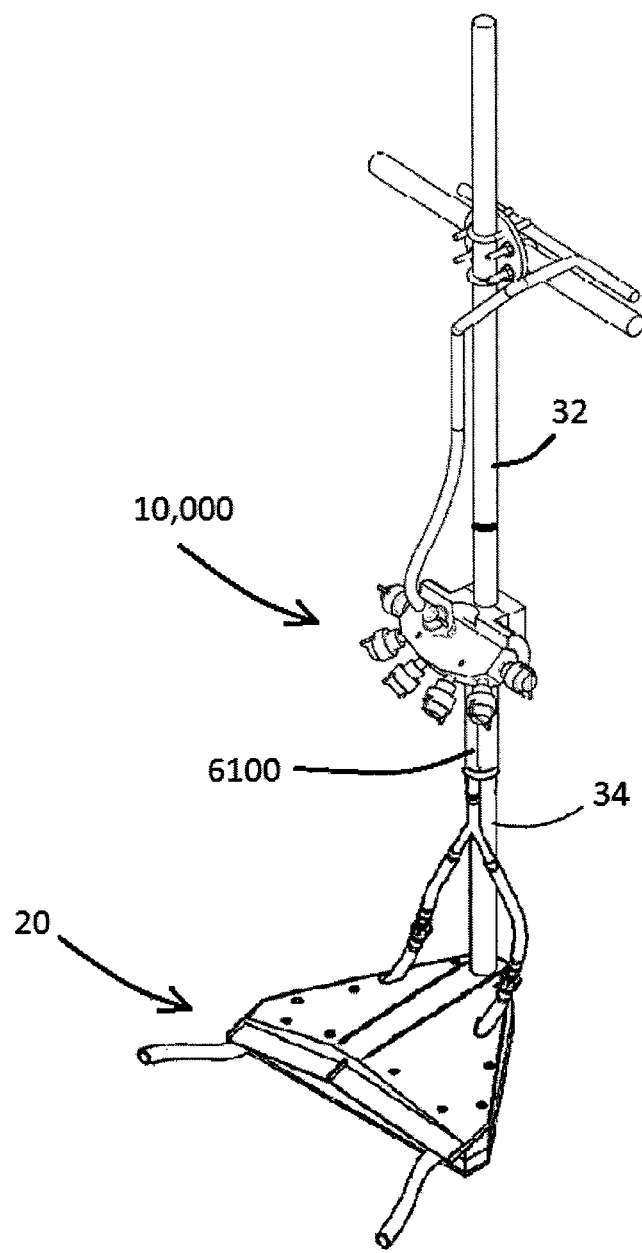
FIG. 22A is a view of a system having the spray assembly in accordance with example embodiments.

In example embodiments, the spray assembly 10000 may be associated with other liquid delivery devices. For example, as shown in FIG. 22A, the spray assembly 10000 may be attached to the previously described drop assembly 22. In this particular nonlimiting embodiment, the spray assembly 10000 is shown attached to the lower portion 34 of the drop assembly 22, but, in reality, it could be attached to the upper portion 32 of the drop assembly 22 instead. In example embodiments, the spray assembly 10000 may be configured to receive liquid product from the distribution hose 19 and may be configured to distribute the liquid product to the base assembly 20 via the hose 6100. In this particular nonlimiting example, each of the attachments 1410, 1420, 1430, 1440, 1450 and 1460 may be plugged to allow all of the liquid product flowing into the spray assembly 10000 to transfer to base assembly 20. On the other hand, if it is desired to apply some or all of the liquid product to an agricultural field via the spray assembly 10000, one of all of the attachments 1410, 1420, 1430, 1440, 1450 and 1460 may not be plugged.

Figure 22B:
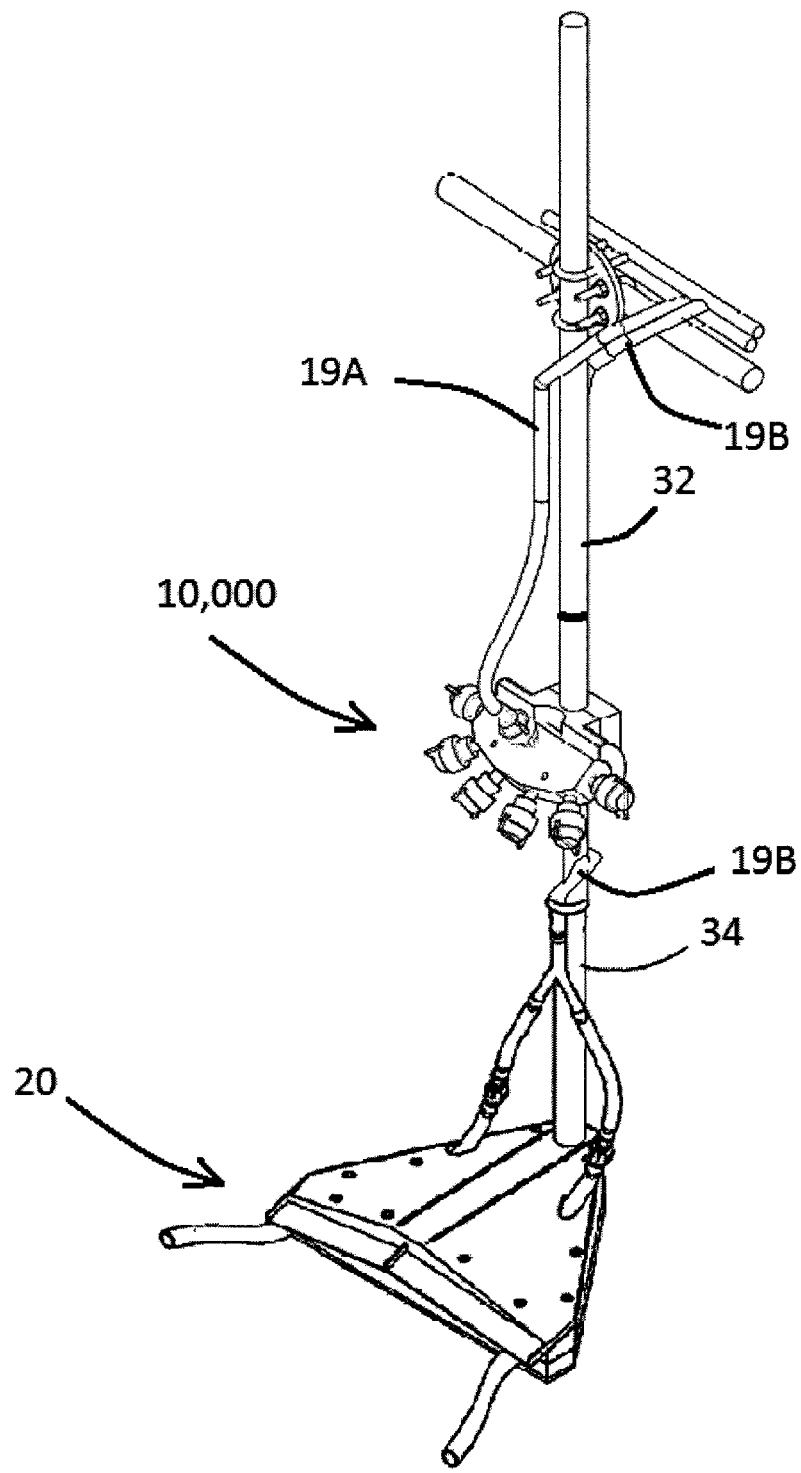
FIG. 22B is a view of a system having the spray assembly in accordance with example embodiments.

In example embodiments, the spray assembly 10000 may be associated with other liquid delivery devices so that different liquid products may be delivered at the same time. For example, as shown in FIG. 22B, the spray assembly 10000 may be attached to the previously described drop assembly 22. In this particular nonlimiting embodiment, the spray assembly 10000 is shown attached to the lower portion 34 of the drop assembly 22, but, in reality, it could be attached to the upper portion 32 of the drop assembly 22 instead. In example embodiments, the spray assembly 10000 may be configured to receive a first liquid product from the distribution hose 19. The first liquid product, for example, may be, but is not required to be, an insecticide. As shown in FIG. 22B, a second distribution hose 19B may attach to a second source containing a second liquid product. The second distribution hose 19B may deliver the second liquid product, for example, a fertilizer, to the ground via the base assembly. In this particular nonlimiting example, at least one of attachments 1410, 1420, 1430, 1440, 1450 and 1460 may opened to allow some or all of the first liquid product flowing into the spray assembly 10000 to spray from the spray assembly 10000 while allowing a second liquid product to be delivered to the ground via the base assembly 20. As such, two different liquid products may be simultaneously delivered.

Example embodiments are not limited by the examples illustrated in FIGS. 22A and 22B. For example, the systems illustrated in the figures could be modified so that some or all of the first liquid product delivered to the spray assembly 10000 may be delivered to the base assembly 20 for application to the ground along with the second liquid product. On the other hand, if it is desired to apply some or all of the liquid product to an agricultural field via the spray assembly 10000, one of all of the attachments 1410, 1420, 1430, 1440, 1450 and 1460 may not be plugged. Also, the spray assembly 10000 and the base assembly 20 may be used in conjunction with conventional sprayers. In this latter embodiment, this may allow an operator to apply a liquid material in three distinct ways: 1) dribbling near the ground adjacent the base of a plant; 2) spraying from the spray assembly 10000 upwards towards undersides of plants; and 3) from above the plant to spray top parts of plants.

Figure 23:
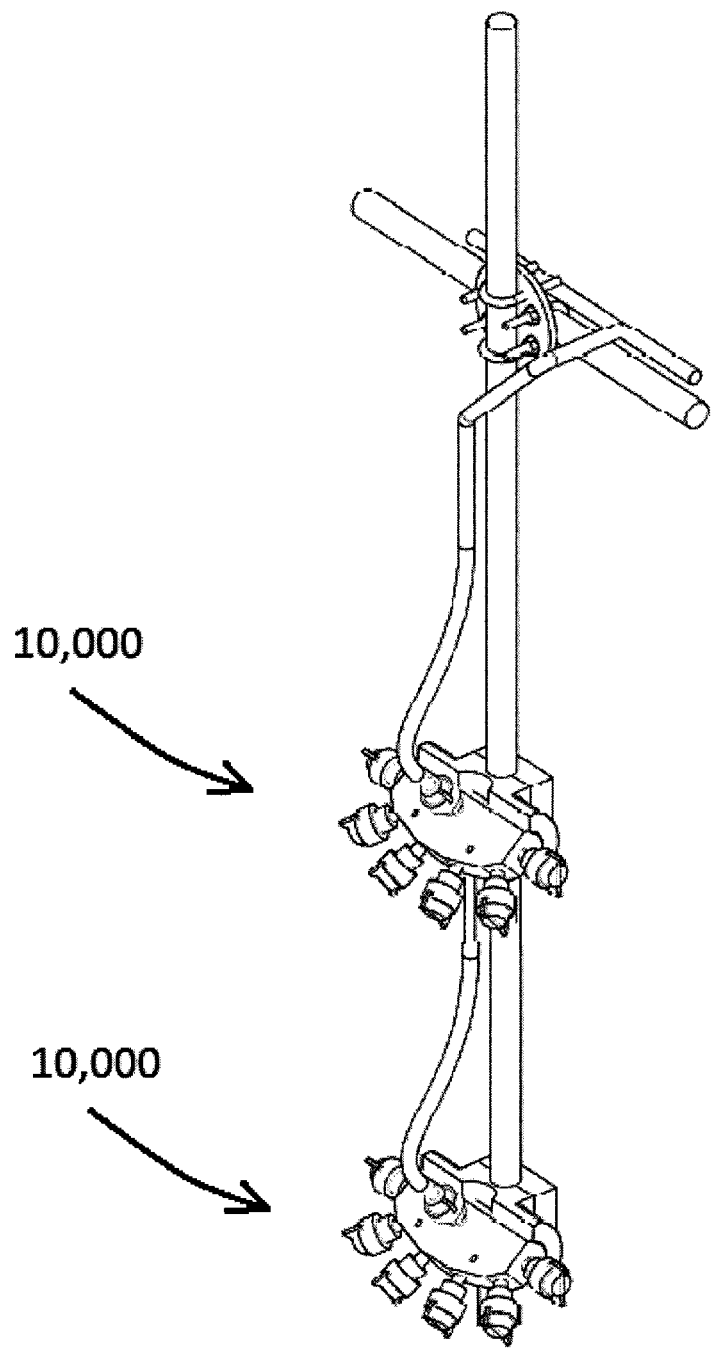
FIG. 23 is a view of a system having the spray assembly in accordance with example embodiments.

In example embodiments, a plurality of spray assemblies 10000 may be may be attached to the previously described drop assembly 22. For example, as shown in FIG. 23 two spray assemblies 10000 may be connected to one drop assembly 22. This may be advantageous in the event a multitude of spray patterns are desired. For example, in example embodiments the upper spray assembly 100000 may be configured to apply a spray of liquid lateral to a direction of travel whereas the lower spray assembly 10000 may be configured to apply liquid downward on the ground.

Figure 24:
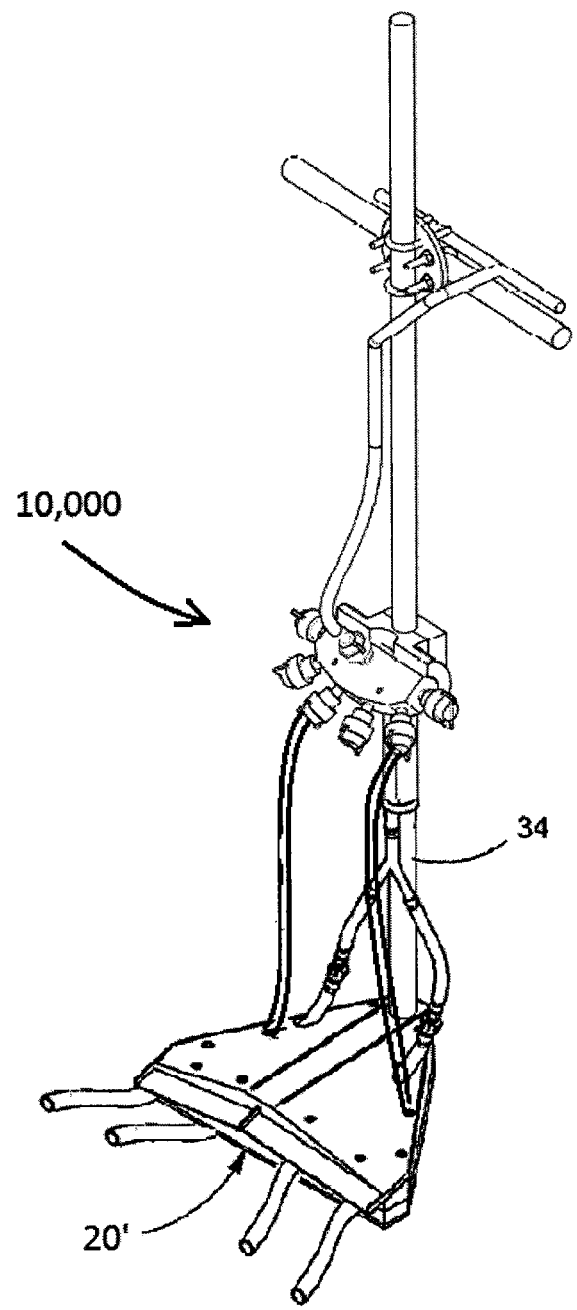
FIG. 24 is a view of a system having the spray assembly in accordance with example embodiments.

In yet another example embodiment, as shown in FIG. 24, dribble hoses may be attached either directly to the manifold body 1100 or to attachments connected to the manifold body 1100. Liquid may flow from the manifold body 1100 to the ground via the dribble hoses which may connect to a modified base 20' as shown in FIG. 24. In this particular nonlimiting example embodiment, unused attachments (if present) may be plugged so that any liquid flowing through the manifold body 1100 flows only through the attached dribble hoses.

Figure 25:
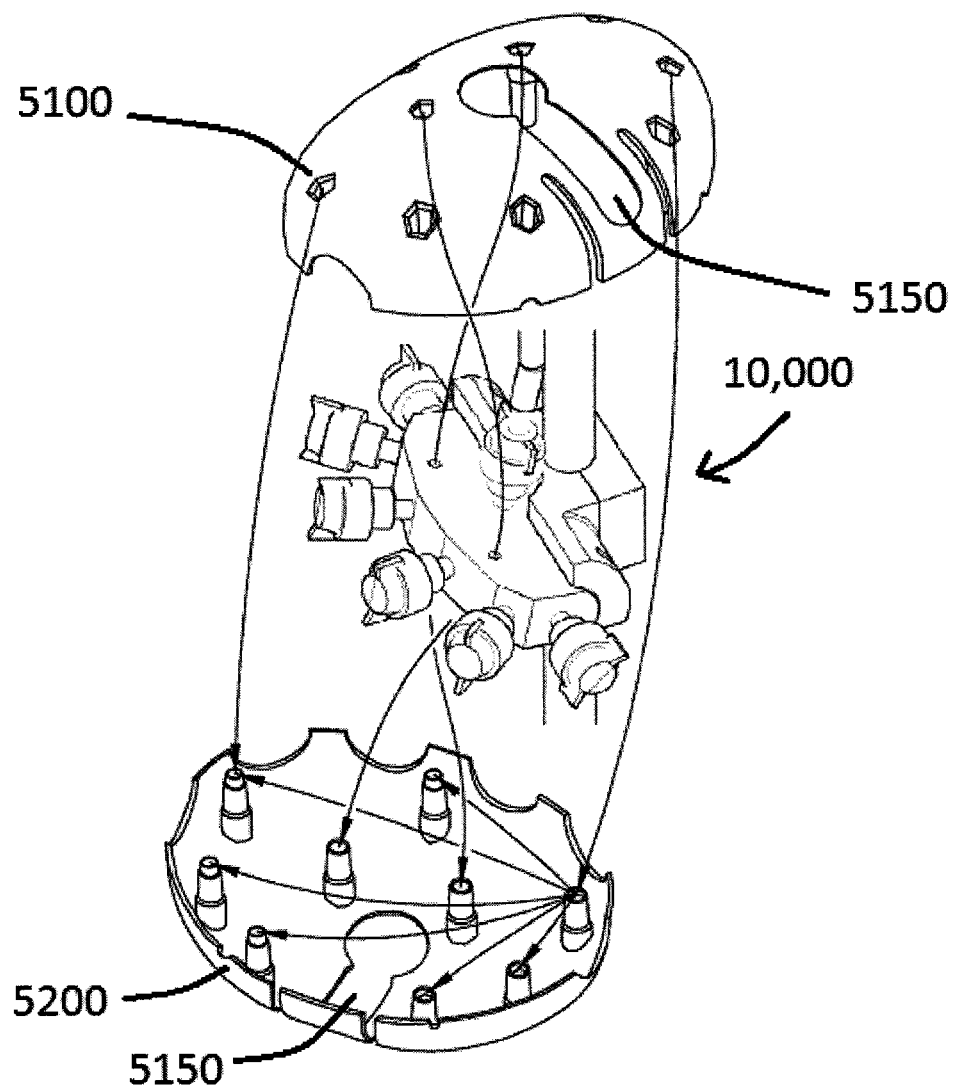
FIG. 25 is a view of a cover in accordance with example embodiments.

In example embodiments, the spray assembly 10000 of example embodiments may be used in the agricultural industry. For example, in example embodiments the spray assembly 10000 may be attached to the drop assembly 22 and moved through a field. As a consequence, the spray assembly 10000 may be exposed to damaging forces. In order to protect the spray assembly 10000 a novel cover 5000 has been designed. As shown in FIG. 25, the cover 5000 may be comprised of a first half 5100 and a second half 5200 which may cover the spray assembly 10000 from above and below. As shown in FIG. 25, the cover 5000, when the two halves 5100 and 5200 are joined, may include holes to allow liquid product sprayed through one of the attachments to exit the cover 5000. The cover 5000 also includes a slot 5150 at a back end thereof to allow the cover 5000 to attach to the spray assembly 10000 without sacrificing the ability of the manifold body 1100 to adjust to various configurations. In example embodiments, one of the first half 5100 and the second half 5200 may include columns with threaded cavities which may be configured to accept fastening members, for example, screws, to attach the first half 5100 to the second half 5200, however, this is not meant to be a limiting feature of example embodiments. For example, in example embodiments, the cover 5000 may be configured to snap onto the any portion of the spray assembly 10000.

Figure 26:
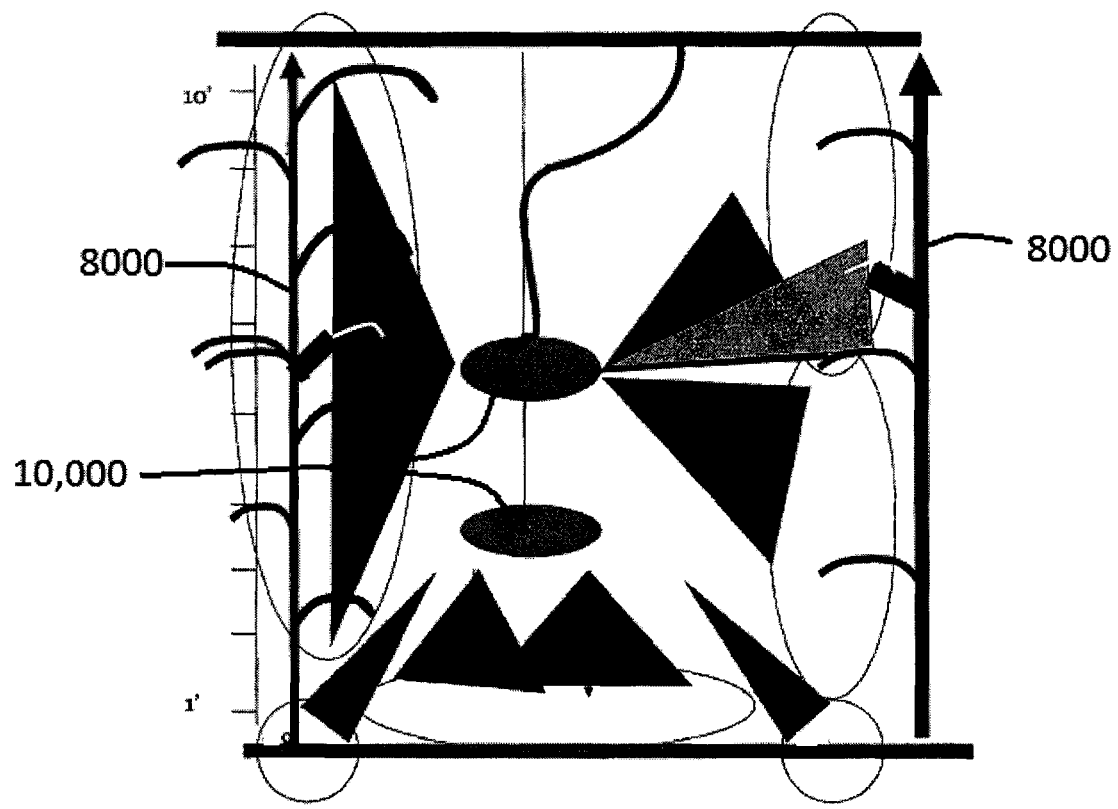
FIG. 26 illustrates an example of applying a liquid product in accordance with example embodiments.

FIG. 26 illustrates a practical example of the invention. As shown in FIG. 26, two spray assemblies 10000 enclosed in their protective covers 5000 are illustrated as being transported between two rows of corn 8000. It is evident the arrangement of the spray assemblies is similar to that presented in FIG. 23. As shown in FIG. 26 the top spray assembly 10000 may be configured to spray a liquid laterally whereas the lower spray assembly 10000 may be configured to spray a liquid in a downward direction. This may be accomplished by configuring the manifold body 1100 of the upper spray assembly to have a horizontal orientation while configuring the lower spray assembly 10000 to have its manifold body 1100 point in a downward direction. Various ports associated with the manifold bodies 1100 may be plugged to achieve a desired spray pattern.

Figure 27:
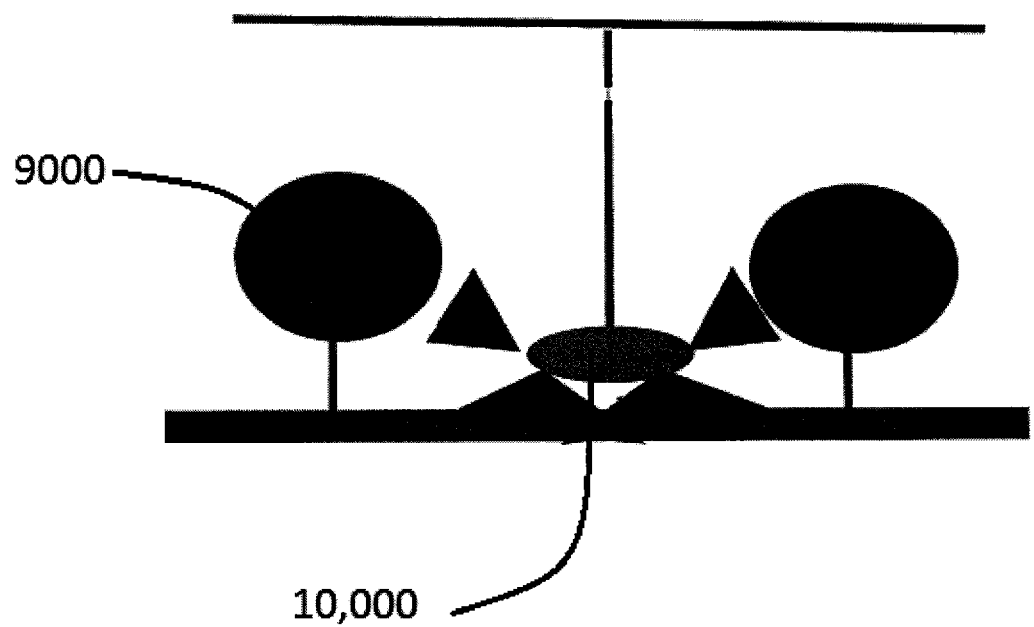
FIG. 27 illustrates an example of applying a liquid product in accordance with example embodiments.

FIG. 27 illustrates another practical example of the invention. As shown in FIG. 27, a spray assembly 10000 enclosed by a protective cover 5000 may be transported between two rows of plants 9000. In this example, the plants 9000 may be, but is not required to be, cotton, soy beans, peanuts and/or tobacco. As shown in FIG. 27, the spray assembly 10000 may be configured to spray a liquid upwards so as to apply a liquid to an underside of a plant leaf. This allows various of portions of the plant to receive the liquid in a manner not provided for in the conventional art which typically only applies a liquid in a downward or horizontal direction. Thus, this example clearly illustrates an embodiment wherein an underside of a leaf may be directly treated with a liquid product.

Figure 28:
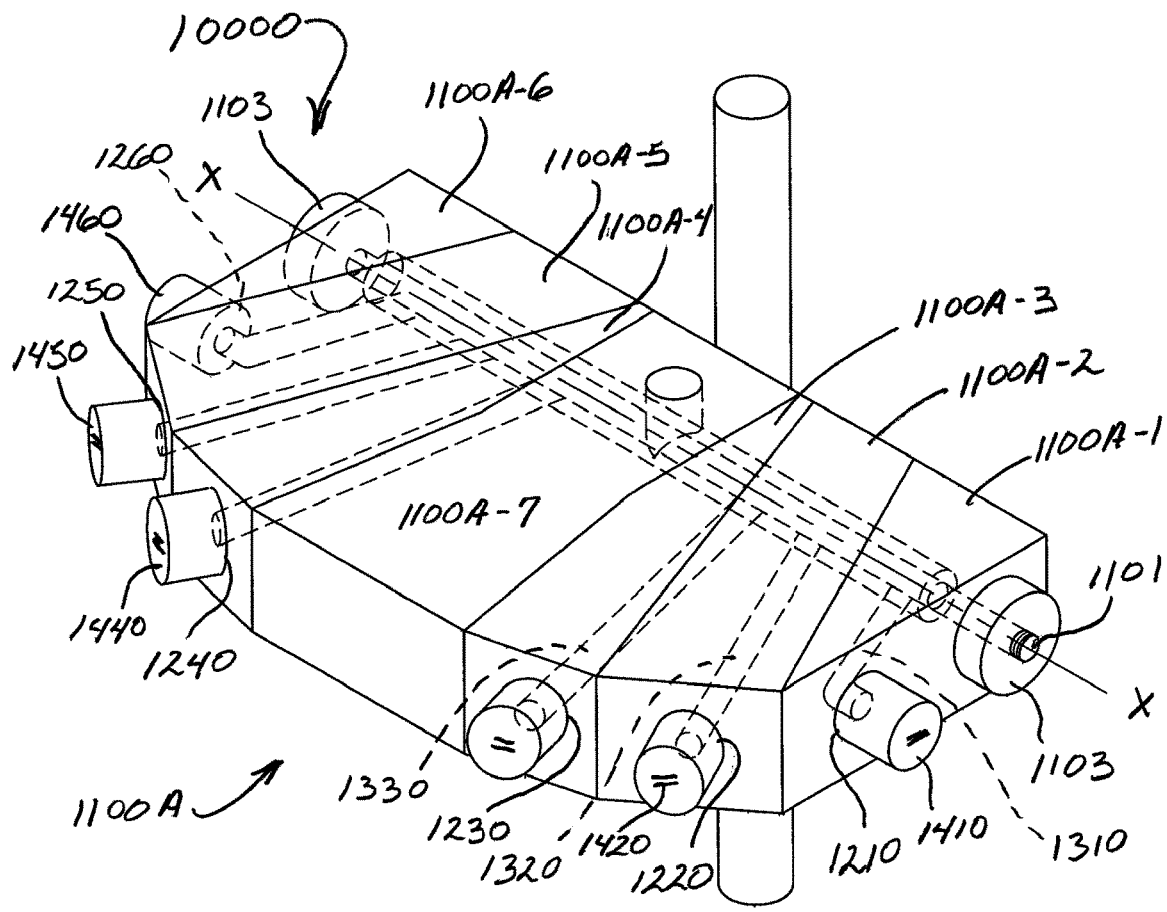
FIG. 28 is a perspective view of an alternative embodiment of a spray assembly.
Figure 29:
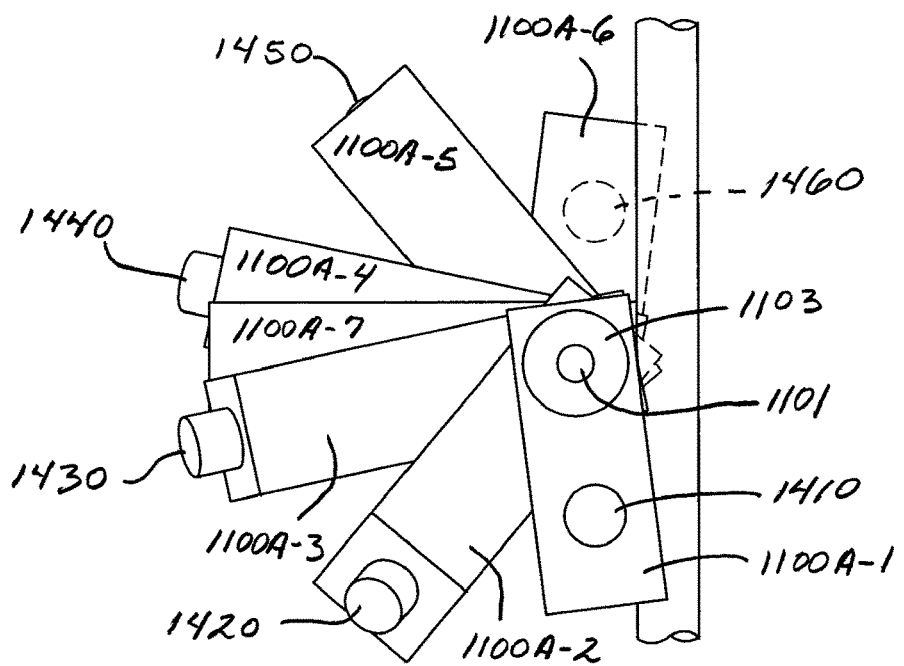
FIG. 29 is a side elevation view of the spray assembly of FIG. 28 showing the pivotal manifold sections positioned in various positions.

FIG. 28 illustrates yet another embodiment of the spray assembly 10000 comprising a manifold body 1100A having multiple independently pivoting body sections 1100A-1, 1100A-2, 1100A-3, 1100A-4, 1100A-5, 1100A-6 and a stationary body section 1100A-7 with each section supporting a threaded nozzle or other spray attachment 1410, 1420, 1430, 1440, 1450, 1460 (as described in connection with FIG. 14I) received within respective openings 1210, 1220, 1230, 1240, 1250, 1260. In such an embodiment, the body sections 1100A-1, 1100A-2, 1100A-3, 1100A-4, 1100A-5, 1100A-6 pivot about a horizontal pivot shaft 1101 so each body section may separately pivot about axis X-X as best illustrated in FIG. 29 for spraying upwardly, downwardly or horizontally as desired. An adjustment knob on each side of the manifold body 1100A threadably engages threaded ends of a pivot shaft 1101. To secure the body sections in the desire position, the adjustment knobs 1103 are threadably tightened to hold the body sections in frictional engagement with one another. Each pivotable section has a passage 1310, 1320, 1330, 1340, 1350, 1360 branching off a main passage 1300 extending transversely through the manifold body 1100A and coaxial with the pivot axis X-X. It should be appreciated that the main passage 1300 extends through the interior body sections 1100A-2, 1100A-3, 1100A-4, 1100A-5, 1100A-7 and terminates within the outer body sections 1100A-1 and 1100A-6. An appropriate seal is provided between each body section and at the ends of the main passage 1300 where the pivot shaft 1101 extends through the terminal ends of the main passage 1300. The body sections may be positioned manually or via actuators remotely controllable by the operator from the cab or automatically in response to a prescription map or in response to various sensors or cameras (described in more detail later). It should be appreciated that if actuators are used for remotely or automatically positioning the body sections, the adjustment knobs may be eliminated.

In yet another alternative embodiment of the spray assembly 10000, rather than the nozzles attachments threading into openings in the manifold 1100 as described above, the nozzle attachments 1410, 1420, 1430, 1440, 1450, 1460 may comprise a ball and socket configuration (not shown), wherein each opening 1210, 1220, 1230, 1240, 1250, 1260 comprises a socket into which each of the respective passages 1310, 1320, 1330, 1340 communicates liquid to a ball end of the nozzle attachments 1410, 1420, 1430, 1440, 1450, 1460 received within each of the respective socket openings 1210, 1220, 1230, 1240, 1250, 1260. In such a ball and socket joint configuration, the nozzles could be moved about multiple axes so each nozzle could be individually oriented with respect to the manifold and adjacent nozzles for simultaneously spraying in various directions. In such an embodiment the manifold 1100 may be attached to the vertical support bar 4000 using the arrangement of the tilt base 2000 and clamp 3000 as previously described, or alternatively the manifold 1100 may be rigidly fixed to the vertical bar support 4000 by any suitable means recognized by those skilled in the art. The ball joint nozzles may be positioned manually or via actuators remotely controllable by the operator from the cab or automatically in response to a prescription map or in response to various sensors or cameras (discussed in more detail later).

Figure 30:
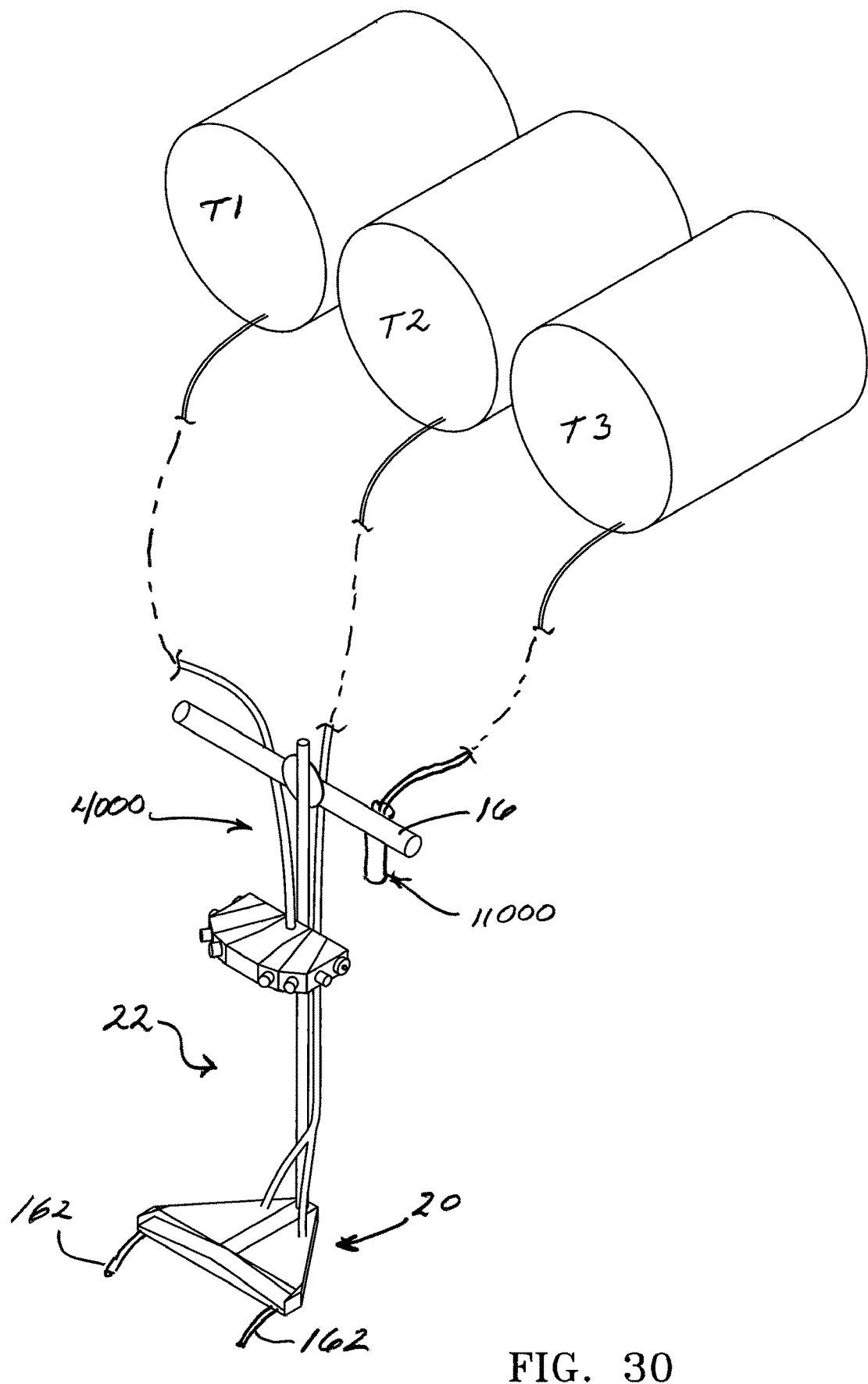
FIG. 30 is a perspective view of an alternative embodiment of the liquid dispensing system.

By way of other examples, a conventional self-propelled or tractor-drawn sprayer or the like, may carry several tanks containing different products and the boom 16 may support different combinations of applicators. For example, the carrier 12 may carry three separate tanks T1, T2, T3 with the three tanks each containing a different first, second and third liquid product, respectively. Referring to FIG. 30, the first liquid product may be communicated from the first tank T1 to the plurality of base assemblies 20 supported by the boom 16 such that the first liquid product dribbles from the dribble hoses 162a, 162b over the rhizosphere of the row crop as previously described; the second liquid product may be communicated from the second tank T2 to the plurality of spray assemblies 10000 positioned on the vertical structures 4000 supported by the boom 16 for spraying the second liquid product onto the row crop; and the third liquid product may be communicated from the third tank T3 to conventional spray nozzles 11000 supported from the boom 16 for spraying the third liquid product onto the row crop.

Figure 31:
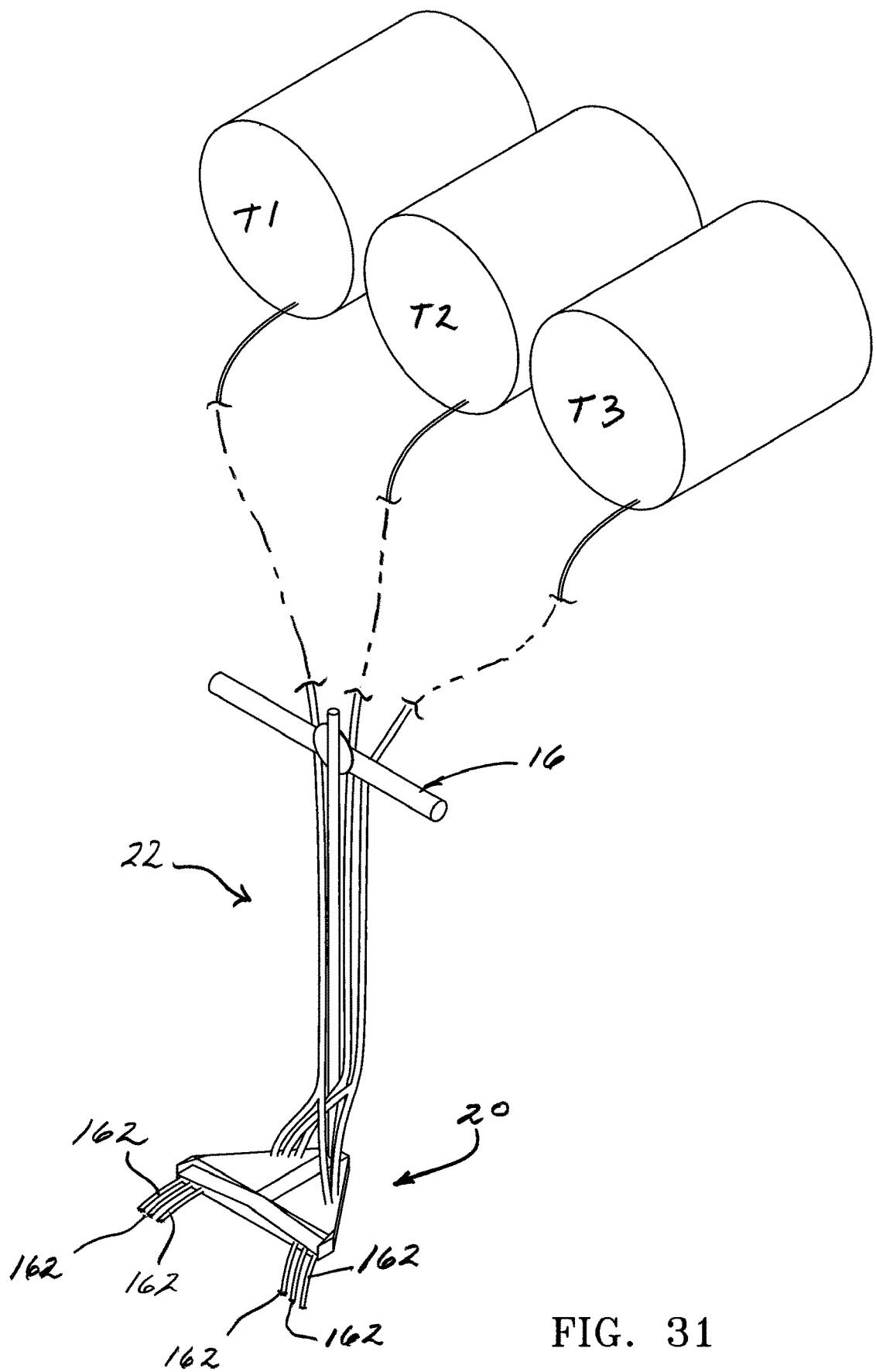
FIG. 31 is a perspective view of an alternative embodiment of the liquid dispensing system.

In another alternative embodiment as shown in FIG. 31, the first, second and third liquid products may all be communicated from the three separate tanks T1, T2, T3 to the plurality of base assemblies 20 supported by the boom 16 with the first, second and third liquid product being dribbled from three separate dribble hoses 162a-1, 162a-2, 162a-3, 162b-1, 162b-2, 162b-3 extending from each side of the base assembly 20.

Figure 32:
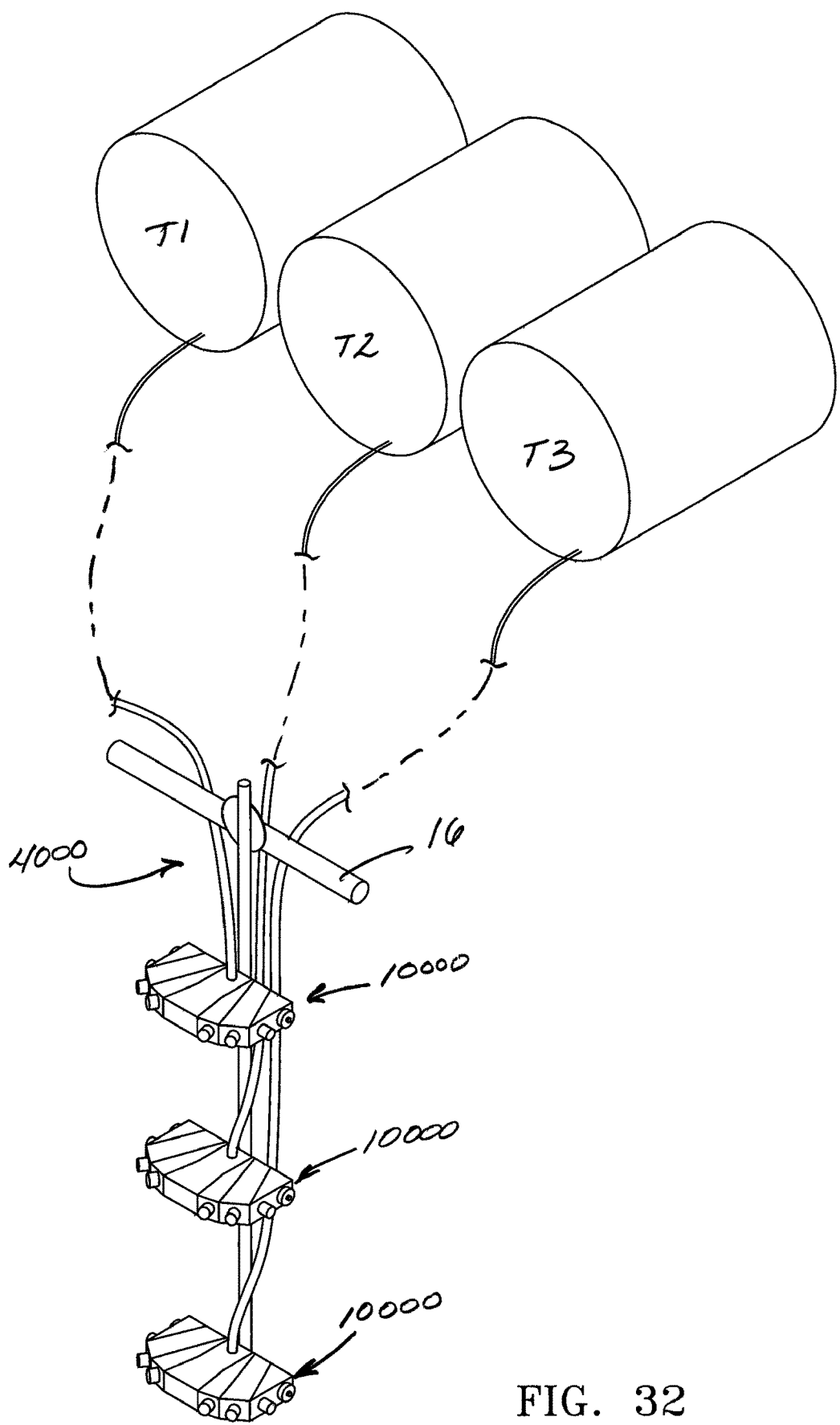
FIG. 32 is a perspective view of an alternative embodiment of the liquid dispensing system.

In another alternative embodiment as shown in FIG. 32, the first, second and third liquid products may all be communicated from the three separate tanks T1, T2, T3 to three separate spray assemblies 10000 all supported by the same vertical structure 4000 for each row, with the first, second and third liquid product being sprayed from each of the respective spray assemblies.

It should be appreciated that each of the above described types of applicators (i.e., the base assembly 20, spray assembly 10000, and conventional sprayers 11000) may be adapted such that each applies all three of the liquid products simultaneously. It should also be appreciated that more or fewer tanks and varying combinations of the above described types of applicators (i.e., the base assembly 20, spray assembly 10000, and conventional sprayers 11000) may be used as desired.

Figure 33:
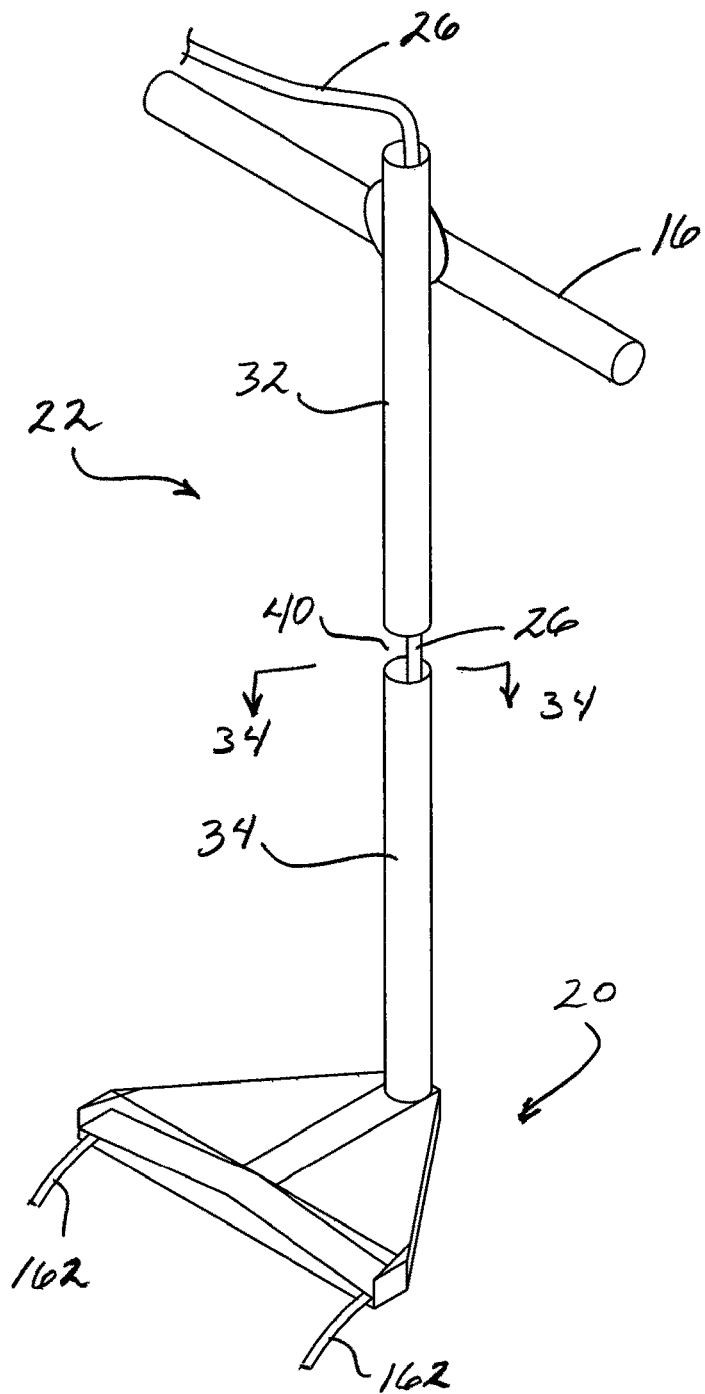
FIG. 33 is a perspective view of an alternative embodiment of a drop assembly.
Figure 34:
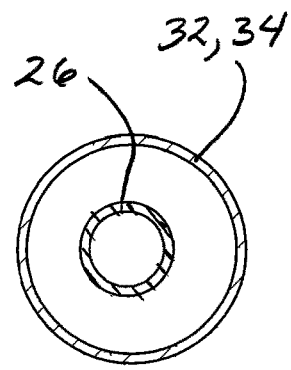
FIG. 34 is a cross-section view of the drop assembly as viewed along line 34-34 of FIG. 33.

Referring to FIGS. 2A-2C and FIGS. 3A-3B, the hose assembly 26 (comprising upper and lower hoses 142a, 142b) is shown as being external to the upper and lower tubular drop portions 32, 34 of the drop assembly 22 and a flexible cable 35 extends through the upper and lower portions 32, 34 and through the gap 40 between the break in the upper and lower tubular portions 32, 34 to permit the drop assembly to flex if the base assembly 20 encounters an obstruction in the field. As shown in FIGS. 33 and 34, rather than having the hose 26 being external to the drop portions 32, 34, the hose 26 is internal to the tubular drop portions 32, 34 and the internal flexible cable 35 eliminated. In this embodiment, the internal hose 26 serves the dual purpose of delivering the liquid product to the base assembly 20 as before but also serves the same purpose as the cable 35 by extending through the gap 40 between the break of the tubular upper and lower portions 32, 34 to permit the drop assembly 22 to flex if the base assembly 20 encounters an obstruction in the field. In such an embodiment the internal hose 26 may have a braided outer sheathing to provide the necessary tensile strength to support the base assembly and to minimize the risk of nicks, scrapes and cuts which could cause the hose to leak.

Figure 35:
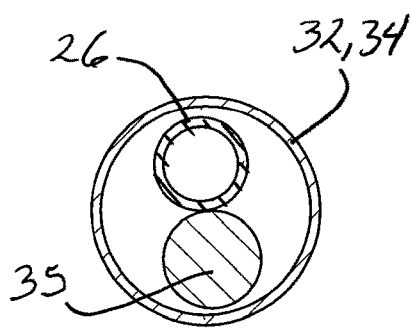
FIG. 35 is a cross-section view of an alternative embodiment of drop assembly of FIG. 33.

Alternatively, as shown in a cross section view in FIG. 35, rather than eliminating the flexible cable 35, both the hose 26 and the flexible cable 35 may extend internally through the tubular drop portions 32, 34.

Figure 36:
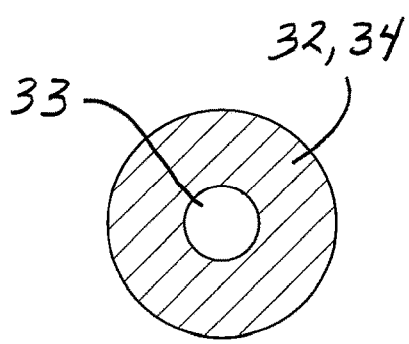
FIG. 36 is a cross-section view of an alternative embodiment of drop assembly of FIG. 33.
Figure 37:
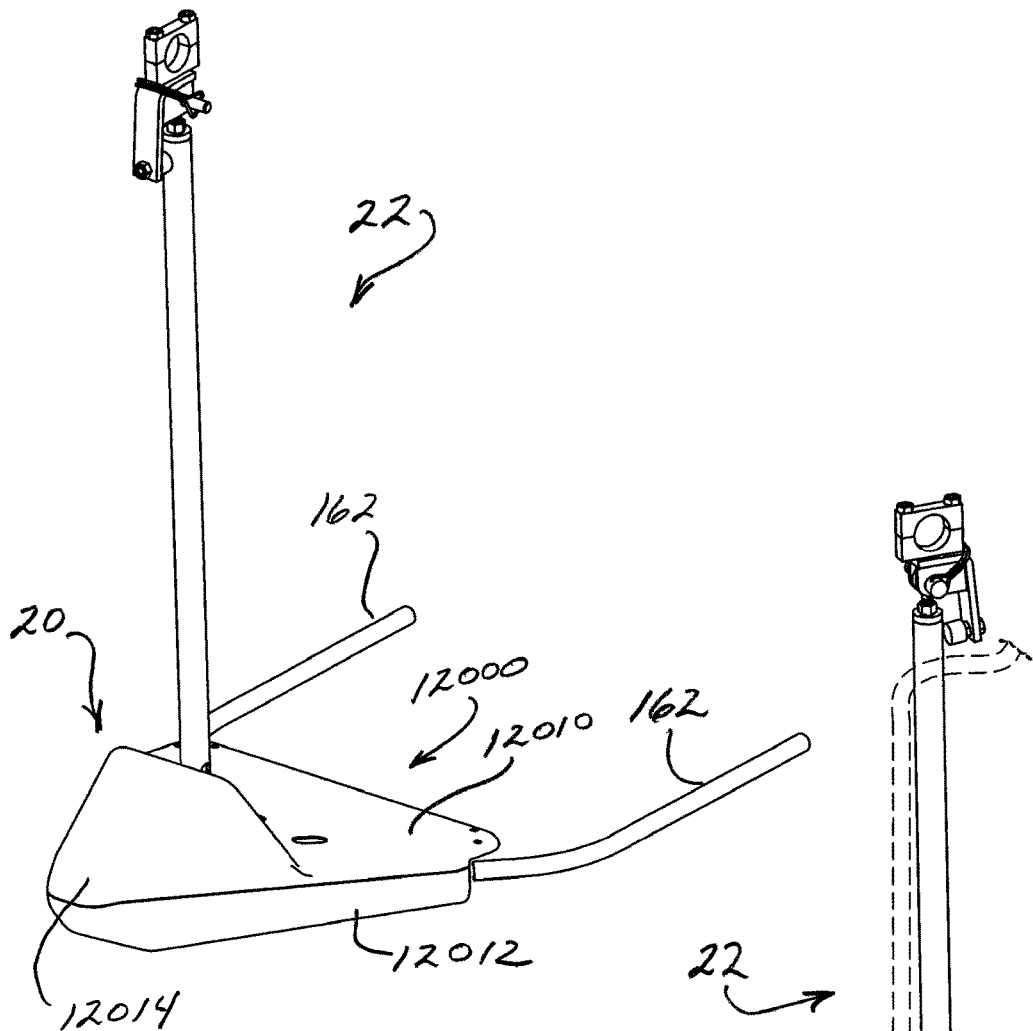
FIG. 37 is a front perspective view of another alternative embodiment of a drop assembly.

Alternatively, rather the upper and lower drop portions 32, 34 being thin walled tubular members as shown in FIGS. 34 and 35, the upper and lower drop portions 32, 34 could be extruded members as shown in a cross section view in FIG. 36 with internal liquid passageways 33 within the upper and lower sections connected by a flexible hose sections 26a or other suitable flexible connection capable of communicating the liquid product from the passageways of the upper portion 32 to the passageways of the lower portion. The flexible cable 35 may or may not be incorporated in this embodiment.

FIGS. 37-41 illustrate yet another alternative embodiment of the drop assembly 22 in which the base assembly 20 comprises a triangular contoured base unit 12000 having a top member 12010 and a bottom member 12012 which may be secured together by threaded connectors (not shown) similar to the assembly described above in connection with FIGS. 5, 7A and 8A, but in this embodiment, the threaded connectors preferably extend through recessed holes (not shown) in the bottom member 12012 which are threadably received in aligned holes (not shown) within stems projecting downwardly from the interior surface of the top member 12010, thereby providing a clean appearance from the top surface of the base unit 12000.

When assembled, the top and bottom members 12010, 12012 together form a forwardly projecting nose 12014 which diverges outwardly and rearwardly along its top, sides and bottom surfaces (as best viewed in FIGS. 39 and 40). The triangular contoured shape of the base unit 12000 with its forwardly projecting and rearwardly diverging nose 12014 enables the base unit 12000 to more effectively deflect plant material away from and around the base unit 12000 as plant material is encountered as the drop assembly 22 is drawn forwardly through the field.

Figure 38:
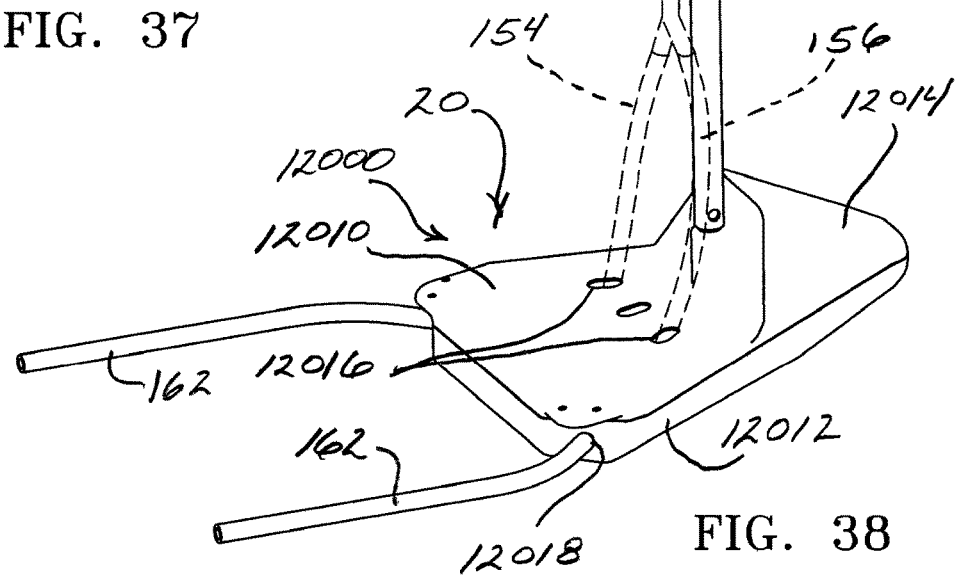
FIG. 38 is a rear perspective view of the drop assembly of FIG. 37.

As shown in FIG. 38, as with the previously described embodiment, the top member 12010 may include apertures 12016 through which the hoses 154, 156 pass into the interior of the base unit 12000 before exiting as dribble tubes 162 through rearward apertures 12018 near the outer rearward corners of the triangular base unit 12000.

Figure 45:
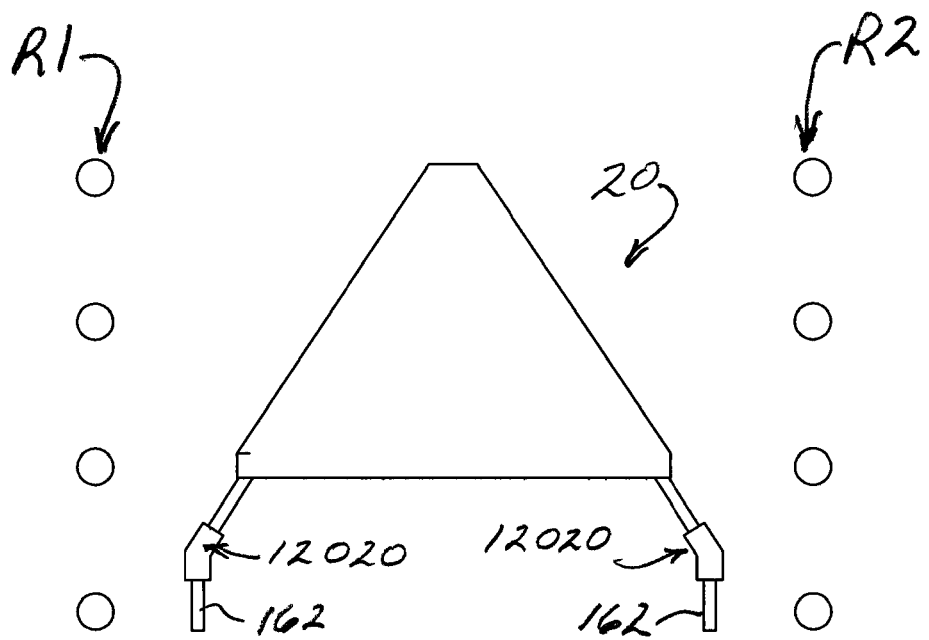
FIG. 45 schematically illustrates a plan view of an embodiment of the drop assembly with elbows positioned on the dribble tubes.
Figure 46:
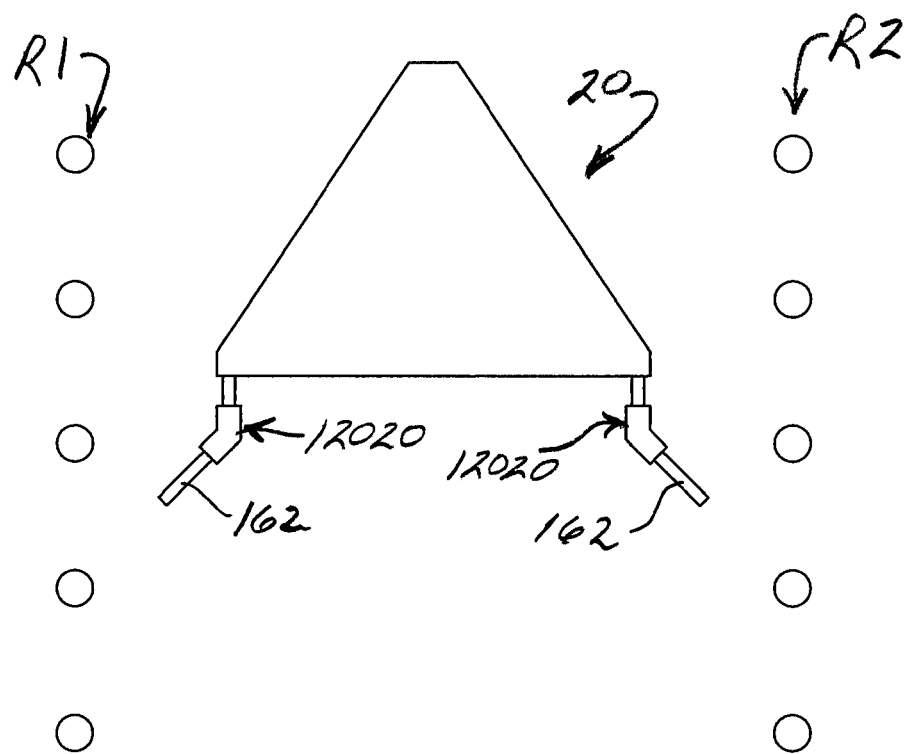
FIG. 46 schematically illustrates a plan view of another embodiment of the drop assembly with elbows positioned on the dribble tubes.

FIG. 42 illustrates the base assembly 20, 12000 in plan view showing the addition of elbows 12020 on the dribble tubes 162. The elbows 12020 serve to orient the ends of the dribble tubes 162 rearwardly while also providing additional mass and rigidity to the dribble tubes so the ends of the dribble tubes remain more aligned with the direction of travel of the base assembly 20 for more consistent placement of the liquid product over the rhizosphere of the row crops R1, R2 as schematically illustrated in FIG. 45. Alternatively, as shown in FIG. 46 the elbows 12020 may be flipped to orient the ends of the dribble tubes 162 outwardly toward the row crops R1, R2. The dribble hose orientations shown in FIGS. 45-46 are not limiting in any manner, as one or more elbows or other supporting structure can be used to create a multitude of dribble hose orientations for more consistent placement of the liquid product over the rhizosphere of the row crops.

As shown in FIG. 43, the elbows 12020 may comprise top and bottom halves 12022, 12024 with an interior channel 2026 to receive the dribble tube 162. The top and bottom halves 12022, 12024 may be secured together using a threaded connector 12028 received within aligned apertures 12030.

FIG. 44 illustrates a dribble tube hood 12040 to add additional mass to the ends of the dribble tubes 162. Without the addition of mass to the free ends of the dribble tubes, the ends of the dribble tubes may be deflected by plant material, rocks, debris or other obstructions as the base unit is drawn through the field, which may cause the liquid product to be dispensed onto the leaves or stalks of the row crop. The added mass at the ends of the dribble tubes provided by the dribble tube hood 12040, ensures that the ends of dribble tubes drag along the soil surface behind the base unit 20 so the liquid product is dispensed onto the soil surface and over the rhizosphere of the row crops. The dribble tube hood 12040 may comprise first and second halves 12042, 12044 with an interior channel 2046 to receive the dribble tube 162. The top and bottom halves 12042, 12044 may be secured together using a threaded connector 12048 received within aligned apertures 12050.

It should be appreciated that the mass of both the elbows 12020 and the dribble tube hood 12040 may be varied by selecting different material, including, for example, PVC, brass, or iron.

Figure 47:
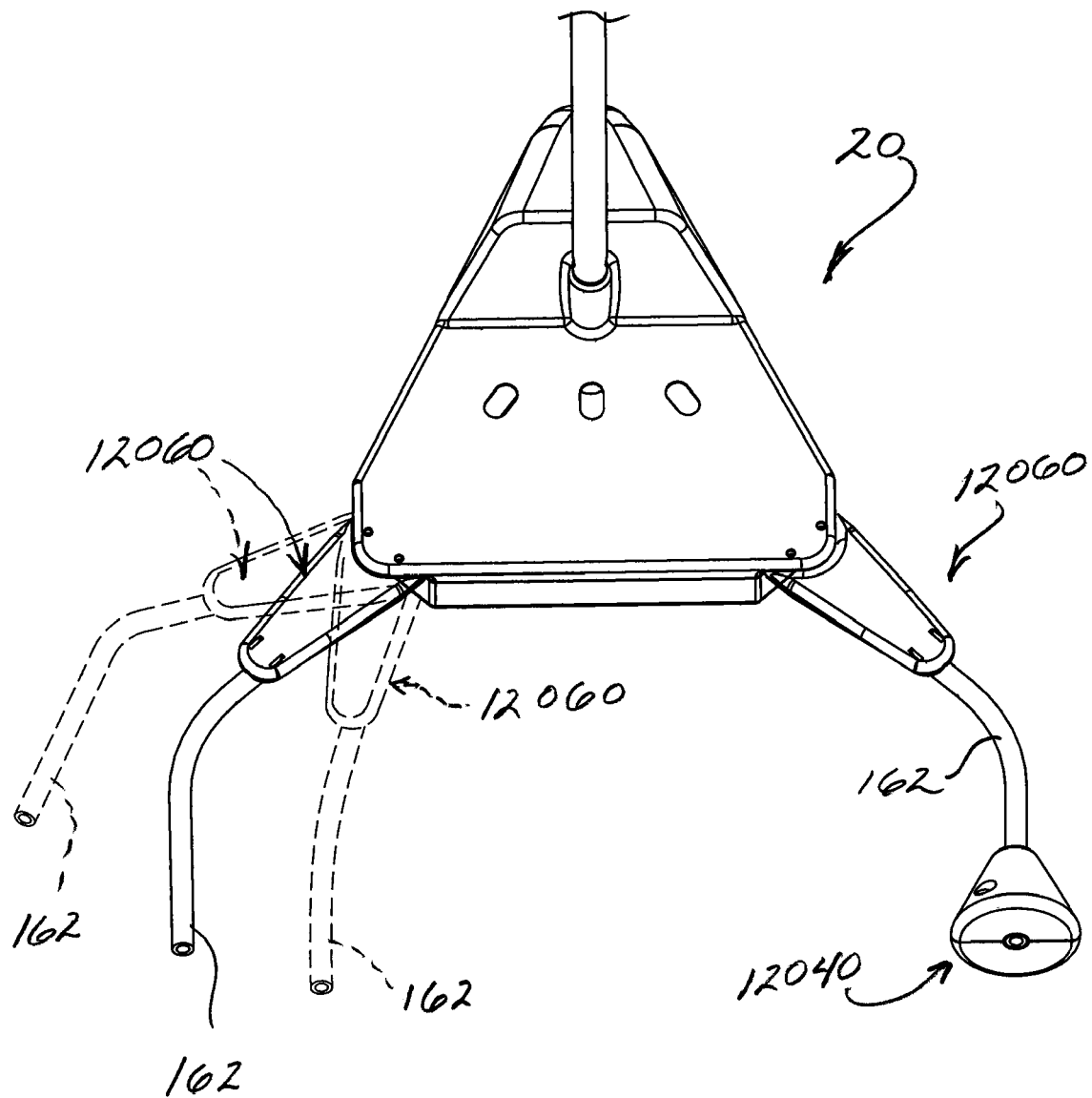
FIG. 47 is an enlarged plan view of another embodiment of the base assembly of the drop assembly of FIG. 37.
Figure 50:
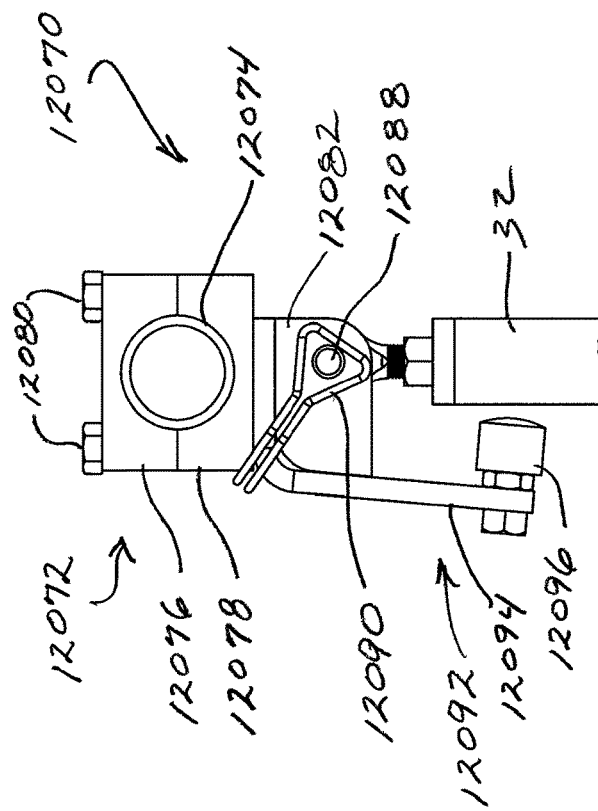
FIG. 50 is a side elevation view of the drop assembly mount of FIG. 48.
Figure 51:
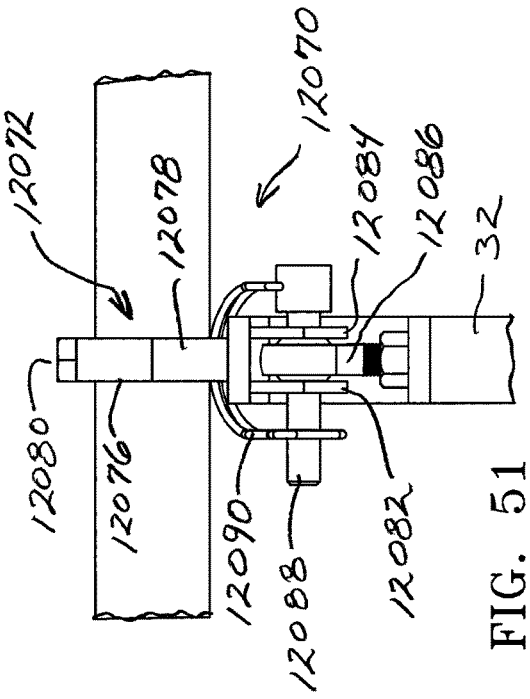
FIG. 51 is a rear elevation view of the drop assembly mount of FIG. 48.
Figure 48:
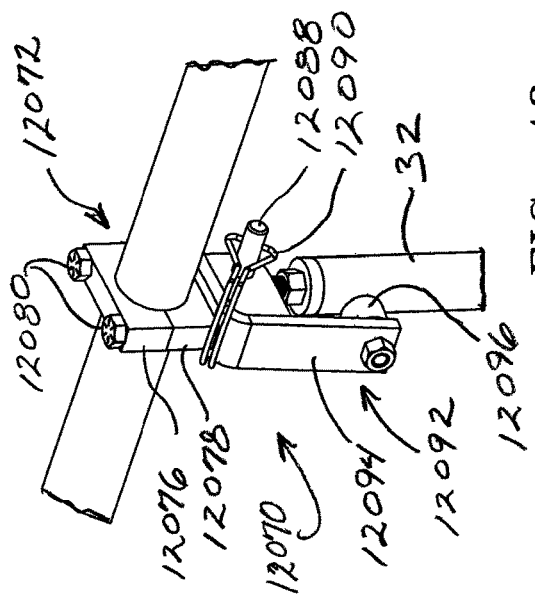
FIG. 48 is a front perspective view of an alternative embodiment of a drop assembly mount.
Figure 49:
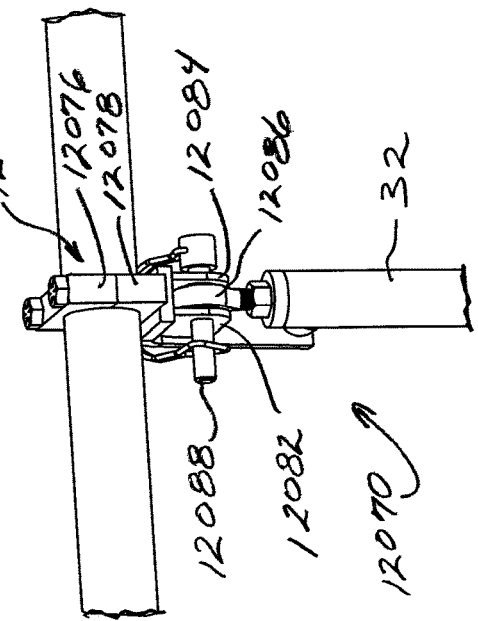
FIG. 49 is a rear perspective view of the drop assembly mount of FIG. 48.

FIG. 47 illustrates another embodiment for positioning or orienting the dribble tubes 162 with respect to the base assembly 20. In this embodiment, the base assembly 20 include positionable wing brackets 12060 mounted to the outer rearward corners of the triangular base assembly 20. The positionable wing brackets 12060 may be pivotally mounted to the base assembly 20 and secured in the desired orientation by any suitable means. For example, the wing brackets may pivot about a threaded connector extending through a circular or elongated pivot hole through in the end of the wing bracket. The threaded connector may then be tightened to lock the wing brackets in the desired position. Alternatively, the wing brackets may have predetermined pattern of mounting holes which align with mounting holes in the top member 12012 and are secured in place with mounting bolts. Other suitable means for selectively positioning the wing brackets 12060 may also be utilized as would be recognized by those of skill in the art. It should also be appreciated that a dribble tube hood 12040 may be used with the wing brackets 12060 as illustrated in FIG. 47.

FIGS. 48-51 illustrate an alternative mounting assembly 12070 for attaching the drop assembly 22 to the boom 16. The mounting assembly 12070 comprises a block clamp 12072 having a circular opening 12074 sized to frictionally engage the boom 16. The block clamp 12072 includes upper and lower block halves 12076, 12078 which are secured together at opposing ends by clamp bolts 12080 which, when tightened, will frictionally clamp the boom 16 within the circular opening 12074. Spaced flanges 12082, 12084 extend downwardly from the lower block half 12078 to receive an eyebolt 12086 therebetween. A pin 12088 extends through the aligned holes in the flanges 12082, 12084 and through the eye of the eyebolt 12086. The pin 12088 includes a quick-release retaining clip 12090 to retain the pin 12088 in position. A forward swing stop 12092 comprising a plate 12094 extends downwardly from the forward end of the lower block half 12078. A bumper 12096 is threadably secured to the plate 12094. Thus, it should be appreciated that mounting assembly 12070 permits unlimited rearward swing of the drop assembly 22 in the event the base assembly 20 encounters an obstruction in the field. However the forward swing stop 12092 prevents the drop assembly from swinging forwardly. When it is desired to remove the drop assembly 22, the retaining clip 12090 is released from the end of the pin 12088 and the pin 12088 removed from the eye of the eyebolt 12086. Additionally, when it is desired to laterally adjust the position of the drop assembly 22 along the boom 16, the clamp bolts 12080 are loosened and the block clamp 12070 is slid along the boom to the desired position and the clamp bolts 12080 retightened frictionally securing the drop assembly at the desired position.

It should be appreciated that the application of liquid product to the crop, whether using the base assembly 20 to dribble the product over the crop rhizosphere or via spraying the crops using the spray assembly 10000 or conventional spray nozzles 11000, may be responsive to field data collected from various sources. For example, one source of field date may be collected from sensed parameters from one or more sensors mounted on the boom 16, the base assembly 20, drop assembly 22, or other suitable location. Alternatively the field data may be collected from field prescription maps, yield maps, aerial maps, etc. The field data may relate to seed type, weather conditions, insect infestation, plant maturity, canopy temperature, carbon dioxide ($CO_2$), sunlight exposure, plant population, plant stand indicative of crop health, Normalized Difference Vegetation Index (NDVI), the presence of absence of plant silks or other organic matter, crop moisture, soil slope and/or various soil characteristics, including soil type, soil pH, mineralization, soil moisture, soil moisture holding capacity, soil slope, etc. The type of sensors for detecting or characterizing the various forgoing parameters are well known in the art. For example, multi-spectral and hyper-spectral camera or a video cameras may be utilized for measuring or characterizing NDVI. Sensors for determining canopy or soil temperature may include infrared, infrared imaging, laser and thermal sensors. Sensors for determine the presence and features of a plant may include visible wavelength imaging sensors, ultrasonic sensors, capacitive sensors, photoelectric sensors, luminescence sensors, contrast sensors, video cameras, color sensors (for identify a difference in color between the soil and the plant) and laser distance sensors. Sensors for determining $CO_2$ amounts around plants (for example soybeans) may include any suitable commercially available $CO_2$ sensor, such as the MG811 $CO_2$ sensor available from Futurlec Co. Ltd. 136 Broadmeadow Rd., New South Wales, AU 2292 (futurlec.com). Additionally, it may be desirable to utilize GPS position detection to tag the location of certain plants or one or more of the sensed parameters.

The signals from the sensors detecting one or more of the foregoing parameters may be received by a processor to characterize the sensed signal and to automatically actuate or vary the dispensing of one or more of the liquid products through one or more of the applicators 20, 10000, 11000, or vary the spray pattern, the nozzle positions, the flow rates, etc. Additionally, or alternatively, if cameras are utilized, the images or videos could be displayed to the operator on a visual display within the cab of the sprayer or tractor. Using the display, the operator could make adjustments as needed. Additionally, or alternatively, the processors may generate visual or audible signals to alert the operator to certain conditions. These signals may be communicated to the operator via the visual display in the cab or via a portable electronic device such as a smartphone or portable computer over the internet or other communication network.

The present invention has been described in relation to particular embodiments, which are intended in all respects to be illustrative rather than restrictive. Alternative embodiments will become apparent to those of ordinary skill in the art to which the present invention pertains without departing from its scope. From the foregoing, it will be seen that this invention is one well adapted to attain all the ends and objects set forth above, together with other advantages, which are obvious and inherent to the system and method. It will be understood that certain features and subcombinations are of utility and may be employed without reference to other features and subcombinations. This is contemplated by and is within the scope of the claims.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. A liquid dispensing apparatus for applying liquid products to the rhizospheres of adjacently spaced crop rows of a field as the liquid dispensing apparatus travels through the field in a forward direction of travel, the liquid dispensing apparatus comprising:
   a boom structure supported at a height above a soil surface, the boom structure extending laterally relative to the forward direction of travel;
   a plurality of drop assemblies supported by and laterally spaced along the boom structure, each of the plurality of drop assemblies including a drop member, the drop member having an upper end and a lower end, the upper end proximate the boom structure, the lower end extending a distance below the boom structure toward the soil surface;
   a first bracket having a forward end and a rearward end, the forward end pivotally supported at the lower end of the drop member about a first vertical axis, the rearward end of the first bracket extending rearward of the first end with respect to the forward direction of travel, the rearward end of the first bracket supporting a first dribble tube having an outlet end disposed to drag on the soil surface laterally outward and rearward of the drop member;
   a second bracket having a forward end and a rearward end, the forward end pivotally supported at the lower end of the drop member about a second vertical axis, the rearward end of the second bracket extending rearward of the first end with respect to the forward direction of travel, the rearward end of the second bracket supporting a second dribble tube having an outlet end disposed to drag on the soil surface laterally outward and rearward of the drop member;
   a spray assembly disposed on the drop member between the upper end and the lower end;
   at least one liquid delivery hose communicating a liquid product to the first dribble tube, to the second dribble tube and to the spray assembly of each of the plurality of drop assemblies;
   wherein the first bracket is selectively pivotally positionable about the first vertical axis and relative to the drop member and where in the second bracket is selectively pivotally positionable about the second vertical axis and relative to the drop member such that a lateral distance between the outlet ends of the first and second dribble hoses is selectively variable; and
   whereby, when in use, each of the plurality of drop assemblies is disposed between the adjacently spaced crop rows as the liquid dispensing apparatus travels through the field in a forward direction of travel such that the outlet end of the first dribble tube delivers the liquid product from the at least one liquid delivery hose over the rhizosphere of a first one of the adjacently spaced crop rows, and the outlet end of the second dribble tube delivers the liquid product from the at least one liquid delivery hose over the rhizosphere of a second one of the adjacently spaced crop rows and the spray assembly delivers the liquid product from the at least one liquid delivery hose between the first and second adjacently spaced crop rows.

2. The liquid dispensing apparatus of claim 1, wherein the at least one liquid delivery hose communicates one liquid product to the first dribble tube, the second dribble tube and to the spray assembly of each of the plurality of drop assemblies.

3. The liquid dispensing apparatus of claim 2, wherein the spray assembly includes spray nozzles which spray the liquid product above the soil surface laterally outward toward each of the first and second crop rows and downward toward the soil surface.

4. The liquid dispensing apparatus of claim 2, wherein the spray assembly includes spray nozzles which spray the liquid product above the soil surface laterally outward toward each of the first and second crop rows and upwardly away from the soil surface.

5. The liquid dispensing apparatus of claim 2, wherein the spray assembly includes certain spray nozzles which spray the liquid product above the soil surface laterally outward toward each of the first and second crop rows and downward toward the soil surface and wherein certain spray nozzles spray the liquid product above the soil surface laterally outward toward each of the first and second crop rows and upwardly away from the soil surface.

6. The liquid dispensing apparatus of claim 1, wherein the at least one liquid delivery hose includes a first liquid delivery hose communicating first liquid product to the first dribble tube and to the second dribble tube and a second liquid delivery hose communicating a second liquid product to the spray assembly of each of the plurality of drop assemblies.

7. The liquid dispensing apparatus of claim 6, wherein the spray assembly includes spray nozzles which spray the second liquid product above the soil surface laterally outward toward each of the first and second crop rows and downward toward the soil surface.

8. The liquid dispensing apparatus of claim 6, wherein the spray assembly includes spray nozzles which spray the second liquid product above the soil surface laterally outward toward each of the first and second crop rows and upwardly away from the soil surface.

9. The liquid dispensing apparatus of claim 6, wherein the spray assembly includes certain spray nozzles which spray the liquid product above the soil surface laterally outward toward each of the first and second crop rows and downward toward the soil surface and wherein certain spray nozzles spray the liquid product above the soil surface laterally outward toward each of the first and second crop rows and upwardly away from the soil surface.

10. The liquid dispensing apparatus of claim 1, wherein the spray assembly includes a first set of spray nozzles and a second set of spray nozzles, and wherein the at least one liquid delivery hose includes a first liquid delivery hose communicating a first liquid product to the first dribble tube and to the second dribble tube, a second liquid delivery hose communicating a second liquid product to the first set of spray nozzles of the spray assembly and a third liquid delivery hose communicating a third liquid product to the second set of spray nozzles of the spray assembly of each of the plurality of drop assemblies.

11. The liquid dispensing apparatus of claim 10, wherein the first set of spray nozzles spray the second liquid product above the soil surface laterally outward toward each of the first and second crop rows and downward toward the soil surface.

12. The liquid dispensing apparatus of claim 11, wherein the second set of spray nozzles spray the third liquid product above the soil surface laterally outward toward each of the first and second crop rows and upwardly away from the soil surface.

13. The apparatus of claim 1, further comprising a plurality of boom spray nozzles, the plurality of boom spray nozzles spaced laterally along the boom structure, and wherein the at least one liquid delivery hose communicates the liquid product to the first dribble tube, to the second dribble tube and to the spray assembly of each of the plurality of drop assemblies and to each of the plurality of boom spray nozzles.

14. The liquid dispensing apparatus of claim 13, wherein the at least one liquid delivery hose includes a first liquid delivery hose communicating a first liquid product to the first dribble tube and to the second dribble tube, a second liquid delivery hose communicating a second liquid product to the spray assembly of each of the plurality of drop assemblies and to the boom spray nozzles.

15. The liquid dispensing apparatus of claim 14, wherein the boom spray nozzles spray the second liquid product above the soil surface downwardly toward the first and second crop rows, and wherein the spray assembly includes spray nozzles which spray the second liquid product above the soil surface laterally outward toward each of the first and second crop rows.

16. The liquid dispensing apparatus of claim 13, wherein the at least one liquid delivery hose includes a first liquid delivery hose communicating a first liquid product to the first dribble tube and to the second dribble tube, a second liquid delivery hose communicating a second liquid product to the spray assembly of each of the plurality of drop assemblies and a third liquid delivery hose communicating a third liquid product to the boom spray nozzles.

17. The liquid dispensing apparatus of claim 16, wherein the boom spray nozzles spray the third liquid product above the soil surface downwardly toward the first and second crop rows wherein the spray assembly includes spray nozzles which spray the second liquid product above the soil surface laterally outward toward each of the first and second crop rows.

* * * * *